US010272959B2

(12) United States Patent
Zuchoski et al.

(10) Patent No.: US 10,272,959 B2
(45) Date of Patent: Apr. 30, 2019

(54) TRACK ASSEMBLY FOR AN OFF-ROAD VEHICLE

(71) Applicant: Camso Inc., Magog (CA)

(72) Inventors: Jeremie Zuchoski, Sherbrooke (CA);
Alain Lussier, St-Francois-Xavier-de-Brompton (CA);
Patrice Boily, St-Catherine-de-Hatley (CA); Francois Leblanc, Magog (CA)

(73) Assignee: Camso Inc., Magog, QC (CA)

( * ) Notice: Subject to any disclaimer, the term of this patent is extended or adjusted under 35 U.S.C. 154(b) by 0 days.

(21) Appl. No.: 15/454,881

(22) Filed: Mar. 9, 2017

(65) Prior Publication Data

US 2017/0174277 A1 Jun. 22, 2017

Related U.S. Application Data

(63) Continuation of application No. 14/715,048, filed on May 18, 2015, which is a continuation of application
(Continued)

(51) Int. Cl.
*B62D 55/14* (2006.01)
*B62D 55/12* (2006.01)
(Continued)

(52) U.S. Cl.
CPC ............ *B62D 55/14* (2013.01); *B62D 55/08* (2013.01); *B62D 55/12* (2013.01); *B62D 55/125* (2013.01);
(Continued)

(58) Field of Classification Search
CPC ...... B62D 55/14; B62D 55/145; B62D 55/15; B62D 55/0966; B62D 55/12; B62D 55/21; B62D 55/125; B62D 55/32
(Continued)

(56) References Cited

U.S. PATENT DOCUMENTS 2,369,130 A 2/1945 Benson
2,562,264 A 7/1951 Ford
(Continued)

FOREIGN PATENT DOCUMENTS

DE 20207342 U1 8/2002
EP 0578504 A2 1/1994
(Continued)

OTHER PUBLICATIONS

Non-Final Office Action issued by the United States Patent and Trademark Office dated Oct. 2, 2013 in connection with U.S. Appl. No. 13/170,753, 15 pages.
(Continued)

*Primary Examiner* — D Glenn Dayoan
*Assistant Examiner* — Sunsurraye Westbrook
(74) *Attorney, Agent, or Firm* — Fish & Richardson P.C.

(57) ABSTRACT

A track assembly for traction of a tracked vehicle, such as an agricultural vehicle, an industrial vehicle (e.g., a construction vehicle) or a military vehicle, is provided. The track assembly comprises a plurality of wheels which comprises a drive wheel and a plurality of roller wheels, as well as an elastomeric endless track disposed around the plurality of wheels for engaging the ground. A roller wheel may comprise a wheel body and a covering on the wheel body. The covering may comprise a lateral portion dimensioned to contact a drive/guide lug of the track. The roller wheels and the track may implement a self-alignment system of the track assembly. The track assembly may comprise a cooling system for transferring heat away from a roller wheel. The track assembly may comprise a lateral motion mechanism allowing a roller wheel to move widthwise in response to a side load.

46 Claims, 43 Drawing Sheets

Related U.S. Application Data

No. 13/326,110, filed on Dec. 14, 2011, now Pat. No. 9,033,431, which is a continuation-in-part of application No. 13/170,753, filed on Jun. 28, 2011, now Pat. No. 8,967,737.

(60) Provisional application No. 61/422,976, filed on Dec. 14, 2010, provisional application No. 61/359,938, filed on Jun. 30, 2010.

(51) Int. Cl.
*B62D 65/00* (2006.01)
*B62K 5/01* (2013.01)
*B62D 55/15* (2006.01)
*B62D 55/24* (2006.01)
*B62D 55/08* (2006.01)
*B62D 55/125* (2006.01)
*B62D 55/06* (2006.01)

(52) U.S. Cl.
CPC .......... *B62D 55/15* (2013.01); *B62D 55/244* (2013.01); *B62D 65/00* (2013.01); *B62K 5/01* (2013.01); *B62D 55/06* (2013.01); *B62D 55/145* (2013.01); *Y10T 29/49483* (2015.01)

(58) Field of Classification Search
USPC ....... 305/137, 199, 136, 194, 195, 138, 184, 305/196, 33, 9, 201
See application file for complete search history.

(56) References Cited

U.S. PATENT DOCUMENTS

| | | |
|---|---|---|
| 2,596,919 A | 5/1952 | Smith |
| 2,854,294 A | 9/1958 | Bannister |
| 3,019,061 A | 1/1962 | Schomers |
| 3,118,709 A | 1/1964 | Case |
| 3,612,626 A | 10/1971 | Fuchs |
| 3,767,275 A | 10/1973 | Russ, Sr. |
| 3,781,067 A | 12/1973 | Dodson et al. |
| 4,150,858 A | 4/1979 | Fox et al. |
| 4,279,449 A | 7/1981 | Martin et al. |
| 4,538,860 A | 9/1985 | Edwards et al. |
| 4,583,791 A | 4/1986 | Nagata et al. |
| 4,586,757 A | 5/1986 | Bloechlinger |
| 4,587,280 A | 5/1986 | Guha et al. |
| 4,607,892 A | 8/1986 | Payne et al. |
| 4,614,508 A | 9/1986 | Kerivan |
| 4,696,520 A | 9/1987 | Henke et al. |
| 4,721,498 A | 1/1988 | Grob |
| 4,843,114 A | 6/1989 | Touchet et al. |
| 4,844,561 A | 7/1989 | Savage et al. |
| 4,880,283 A | 11/1989 | Savage et al. |
| 4,953,921 A | 9/1990 | Burns |
| 5,018,591 A | 5/1991 | Price |
| 5,050,710 A | 9/1991 | Bargfrede |
| 5,145,242 A | 9/1992 | Togashi |
| 5,190,363 A | 3/1993 | Brittain et al. |
| 5,320,585 A | 6/1994 | Kato |
| 5,352,029 A | 10/1994 | Nagorcka |
| 5,362,142 A | 11/1994 | Katoh |
| 5,368,115 A | 11/1994 | Crabb |
| 5,380,076 A | 1/1995 | Hori |
| 5,447,365 A | 9/1995 | Muramatsu et al. |
| 5,482,364 A | 1/1996 | Edwards et al. |
| 5,511,869 A | 4/1996 | Edwards et al. |
| 5,513,683 A | 5/1996 | Causa et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,984,438 A | 11/1999 | Tsunoda et al. |
| 5,997,109 A | 12/1999 | Kautsch |
| 6,000,766 A | 12/1999 | Takeuchi et al. |
| 6,024,183 A | 2/2000 | Dietz et al. |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,129,426 A | 10/2000 | Tucker |
| 6,139,121 A | 10/2000 | Muramatsu |
| 6,153,686 A | 11/2000 | Granatowicz et al. |
| 6,176,557 B1 | 1/2001 | Ono |
| 6,193,335 B1 | 2/2001 | Edwards |
| 6,206,492 B1 | 3/2001 | Moser |
| 6,224,172 B1 | 5/2001 | Goodwin |
| 6,259,361 B1 | 7/2001 | Robillard et al. |
| 6,296,329 B1 | 10/2001 | Rodgers et al. |
| 6,299,264 B1 | 10/2001 | Kautsch et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,386,653 B1 * | 5/2002 | Brandenburger ...... B62D 55/30 180/9.1 |
| 6,416,142 B1 | 7/2002 | Oertley |
| 6,474,756 B2 | 11/2002 | Hori et al. |
| 6,536,852 B2 | 3/2003 | Katayama et al. |
| 6,581,449 B1 | 6/2003 | Brown et al. |
| 6,588,862 B1 | 7/2003 | Pringiers |
| 6,637,276 B2 | 10/2003 | Adderton et al. |
| 6,652,043 B2 | 11/2003 | Oertley |
| 6,671,609 B2 | 12/2003 | Nantz et al. |
| 6,698,850 B2 | 3/2004 | Ueno |
| 6,716,012 B2 | 4/2004 | Yovichin et al. |
| 6,733,093 B2 * | 5/2004 | Deland ............... B62D 55/13 305/125 |
| 6,769,746 B2 | 8/2004 | Rodgers et al. |
| 6,800,236 B1 | 10/2004 | Kurata et al. |
| 6,848,757 B2 | 2/2005 | Ueno |
| D505,136 S | 5/2005 | Brazier |
| 6,904,986 B2 | 6/2005 | Brazier |
| 6,913,329 B1 | 7/2005 | Rodgers et al. |
| 6,921,197 B2 | 7/2005 | Aubel et al. |
| 6,932,442 B2 | 8/2005 | Hori |
| 6,948,784 B2 | 9/2005 | Wodrich et al. |
| 6,964,462 B2 | 11/2005 | Katoh et al. |
| 6,974,196 B2 | 12/2005 | Gagne et al. |
| 7,001,294 B2 | 2/2006 | Fukuda |
| 7,077,216 B2 | 7/2006 | Juncker |
| 7,114,788 B2 | 10/2006 | Deland et al. |
| 7,137,675 B1 | 11/2006 | Simula et al. |
| 7,197,922 B2 | 4/2007 | Rimkus et al. |
| 7,202,777 B2 | 4/2007 | Tsuji et al. |
| 7,222,924 B2 | 5/2007 | Christianson |
| 7,229,141 B2 | 6/2007 | Dandurand et al. |
| 7,252,348 B2 | 8/2007 | Gingras |
| 7,293,844 B2 | 11/2007 | Uchiyama |
| 7,316,251 B2 | 1/2008 | Kogure et al. |
| 7,325,888 B2 | 2/2008 | Fujita et al. |
| 7,367,637 B2 | 5/2008 | Gleasman |
| 7,413,268 B2 | 8/2008 | Kato et al. |
| 7,416,266 B2 | 8/2008 | Soucy et al. |
| 7,567,171 B2 | 7/2009 | Dufournier |
| D603,880 S | 11/2009 | Brazier |
| 7,625,050 B2 | 12/2009 | Bair |
| 7,676,307 B2 | 3/2010 | Schmitt et al. |
| 7,729,823 B2 | 6/2010 | Ruoppolo |
| 7,740,094 B2 | 6/2010 | Pelletier |
| 7,798,260 B2 | 6/2010 | Albright et al. |
| 7,778,741 B2 | 8/2010 | Rao et al. |
| 7,779,947 B2 | 8/2010 | Stratton |
| 7,784,884 B2 | 8/2010 | Soucy et al. |
| D644,670 S | 9/2011 | Barrelmeyer |
| 8,327,960 B2 * | 12/2012 | Couture ............... B25J 5/005 180/9.1 |
| 8,567,876 B2 | 10/2013 | Wellman |
| D711,928 S | 8/2014 | Brazier |
| 8,985,250 B1 | 3/2015 | Lussier et al. |
| 9,855,843 B2 | 1/2018 | Vik et al. |
| 2002/0070607 A1 | 6/2002 | Edwards |

(56) References Cited

U.S. PATENT DOCUMENTS

| | | |
|---|---|---|
| 2002/0140288 A1 | 10/2002 | Herberger et al. |
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0080618 A1 | 5/2003 | Krishnan et al. |
| 2003/0089534 A1 | 5/2003 | Kanzler et al. |
| 2004/0004395 A1 | 1/2004 | Soucy et al. |
| 2004/0070273 A1 | 4/2004 | Safe et al. |
| 2004/0130212 A1 | 7/2004 | Ishibashi |
| 2004/0135433 A1 | 7/2004 | Inaoka et al. |
| 2005/0035654 A1 | 2/2005 | Tamaru et al. |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0090558 A1 | 5/2006 | Raskas |
| 2006/0103236 A1 | 5/2006 | Soucy et al. |
| 2006/0175108 A1 | 8/2006 | Kubota |
| 2006/0220456 A1 | 10/2006 | Sugahara |
| 2006/0273660 A1 | 12/2006 | Dandurand |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0251621 A1 | 11/2007 | Prost |
| 2007/0252433 A1 | 11/2007 | Fujita |
| 2008/0007118 A1 | 1/2008 | Fujita |
| 2008/0073971 A1 | 3/2008 | Paradis et al. |
| 2008/0084111 A1* | 4/2008 | Rainer ............... B62D 55/112 305/124 |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0179124 A1 | 7/2008 | Stratton |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0102283 A1 | 4/2009 | Choi |
| 2009/0195062 A1 | 8/2009 | Uchida |
| 2009/0302676 A1 | 12/2009 | Brazier |
| 2009/0302677 A1 | 12/2009 | Sugihara |
| 2009/0309415 A1 | 12/2009 | Shimozono |
| 2010/0033010 A1 | 2/2010 | Shimozono |
| 2010/0095506 A1 | 4/2010 | Bair |
| 2010/0096915 A1 | 4/2010 | Hagio |
| 2010/0096917 A1 | 4/2010 | Bair |
| 2010/0133019 A1* | 6/2010 | Muemken ............ B62D 21/12 180/9.21 |
| 2010/0139994 A1* | 6/2010 | Hansen ............... B62D 55/04 180/9.26 |
| 2010/0191417 A1* | 7/2010 | Murahashi ........... B60B 11/06 701/36 |
| 2010/0194553 A1* | 8/2010 | Mizutani ............. B60K 6/365 340/438 |
| 2010/0256946 A1 | 10/2010 | Carresjö et al. |
| 2010/0283317 A1 | 11/2010 | Soucy et al. |
| 2011/0121644 A1 | 5/2011 | Wellman |
| 2011/0301825 A1 | 12/2011 | Grajkowski et al. |
| 2012/0056473 A1 | 3/2012 | Hashimoto et al. |
| 2012/0242142 A1 | 9/2012 | Kautsch et al. |
| 2013/0073157 A1 | 3/2013 | Person et al. |
| 2013/0245911 A1 | 9/2013 | Nakajima et al. |
| 2013/0325266 A1 | 12/2013 | Padilla et al. |
| 2014/0125117 A1* | 5/2014 | Weeks ................ B62D 55/15 305/100 |
| 2014/0180534 A1 | 6/2014 | Son |
| 2014/0288763 A1* | 9/2014 | Bennett ............... B62D 11/18 701/31.6 |
| 2014/0324301 A1 | 10/2014 | Rebinsky |
| 2015/0042152 A1 | 2/2015 | Lussier et al. |
| 2016/0121945 A1* | 5/2016 | Rust ................... H05K 999/99 701/34.4 |
| 2017/0087987 A1 | 3/2017 | Vik et al. |
| 2017/0177011 A1 | 6/2017 | Garvin et al. |

FOREIGN PATENT DOCUMENTS

| | | |
|---|---|---|
| EP | 1260429 A2 | 11/2002 |
| EP | 1273504 A1 | 1/2003 |
| EP | 1283152 A1 | 2/2003 |
| EP | 1325820 B1 | 9/2004 |
| EP | 1882627 A1 | 1/2008 |
| JP | 02074476 A | 3/1990 |
| JP | 11129946 A | 5/1999 |
| JP | 2000053037 A | 2/2000 |
| JP | 2003011860 A | 1/2003 |
| SU | 01446017 A2 | 12/1988 |
| WO | 2008108439 A1 | 9/2008 |
| WO | 2009105892 A1 | 9/2009 |
| WO | 2009106617 A1 | 9/2009 |

OTHER PUBLICATIONS

Final Office Action issued by the United States Patent and Trademark Office dated Mar. 27, 2014 in connection with U.S. Appl. No. 13/170,753, 16 pages.

Notice of Allowance issued by the United States Patent and Trademark Office dated Oct. 24, 2014 in connection with U.S. Appl. No. 13/170,753, 5 pages.

Non-Final Office Action issued by the United States Patent and Trademark Office dated Jul. 10, 2014 in connection with U.S. Appl. No. 13/326,110, 16 pages.

Notice of Allowance issued by the United States Patent and Trademark Office dated Jan. 21, 2015 in connection with U.S. Appl. No. 13/326,110, 6 pages.

Non-Final Office Action issued by the United States Patent and Trademark Office dated Jun. 9, 2014 in connection with U.S. Appl. No. 13/326,132, 15 pages.

Final Office Action issued by the United States Patent and Trademark Office dated Dec. 23, 2014 in connection with U.S. Appl. No. 13/326,132, 15 pages.

Non-Final Office Action issued by the United States Patent and Trademark Office dated Jun. 24, 2015 in connection with U.S. Appl. No. 13/326,132, 17 pages.

Final Office Action issued by the United States Patent and Trademark Office dated Dec. 31, 2015 in connection with U.S. Appl. No. 13/326,132, 15 pages.

International Search Report & Written Opinion dated Sep. 29, 2016 in connection with PCT/CA2016/050760 8 pages.

Restriction Requirement dated Jan. 27, 2014 in connection with U.S. Appl. No. 13/326,010, 5 pages.

Non-Final Office Action dated Jun. 2, 2014 in connection with U.S. Appl. No. 13/326,010, 6 pages.

Notice of Allowance dated Nov. 14, 2014 in connection with U.S. Appl. No. 13/326,010, 7 pages.

Non-Final Office Action dated Apr. 5, 2016 in connection with U.S. Appl. No. 14/665,075, 5 pages.

Final Office Action dated Jan. 12, 2017 in connection with U.S. Appl. No. 14/665,075, 11 pages.

Non-Final Office Action dated Jun. 12, 2017 in connection with U.S. Appl. No. 14/665,075, 9 pages.

Non-Final Office Action dated Oct. 11, 2017 in connection with U.S. Appl. No. 14/665,075, 6 pages.

Restriction Requirement dated Jun. 9, 2014 in connection with U.S Appl. No. 13/326,278, 7 pages.

Non-Final Office Action dated Mar. 6, 2015 in connection with U.S. Appl. No. 13/326,278, 16 pages.

Final Office Action issued on Jun. 26, 2015 in connection with U.S. Appl. No. 13/326,278, 15 pages.

Notice of Allowance dated Jan. 11, 2016 in connection with U.S. Appl. No. 13/326,278, 7 pages.

Examiner's Report dated Jan. 11, 2018 in connection with Canadian Patent Application No. 2,978,482, 3 pages.

(56) References Cited

OTHER PUBLICATIONS

Examiner's Report dated Feb. 1, 2018 in connection with Canadian Patent Application No. 2,991,072, 3 pages.
Non-Final Office Action dated Dec. 1, 2016 in connection with U.S. Appl. No. 15/139,572, 5 pages.
Final Office Action dated Sep. 8, 2017 in connection with U.S. Appl. No. 15/139,572, 14 pages.
Non-Final Office Action dated Mar. 20, 2018 in connection with U.S. Appl. No. 15/139,572, 7 pages.

* cited by examiner

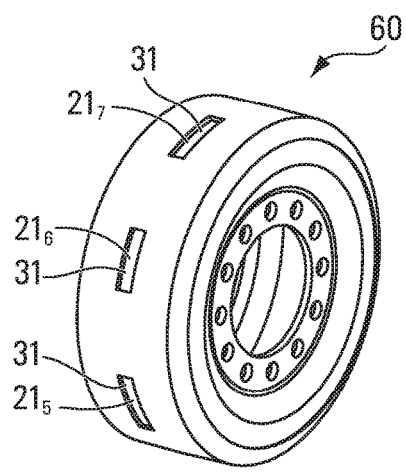
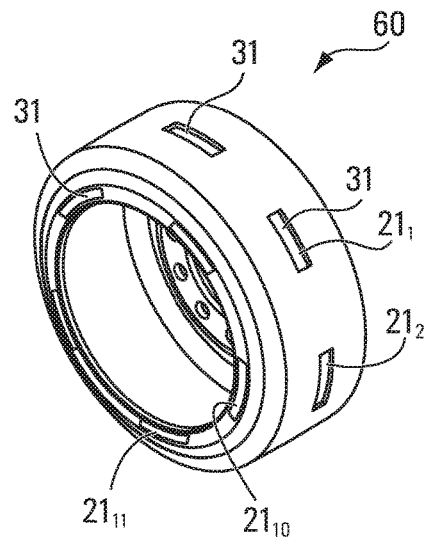
FIG. 19      FIG. 20
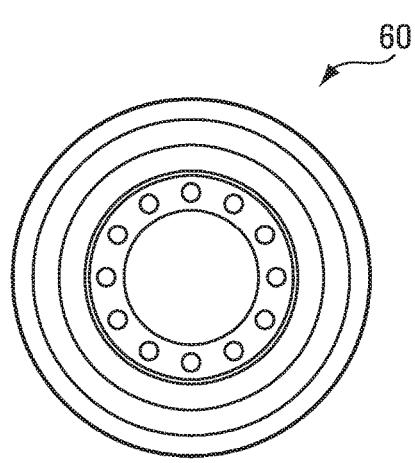
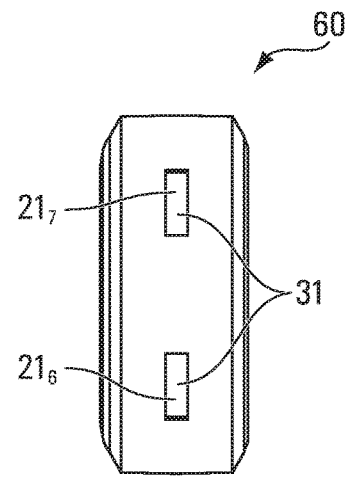
FIG. 21      FIG. 22

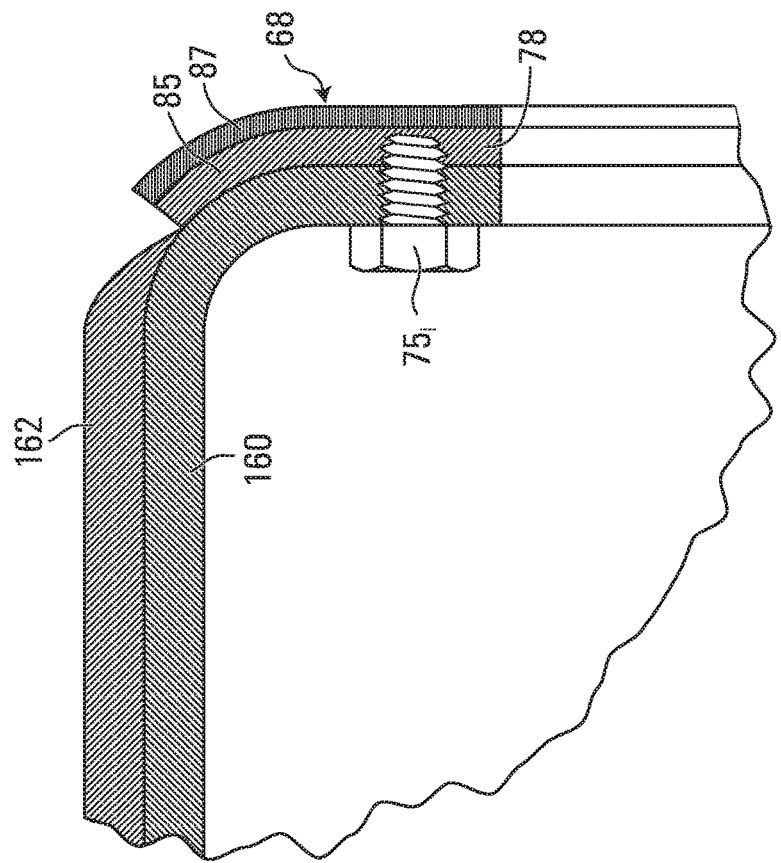
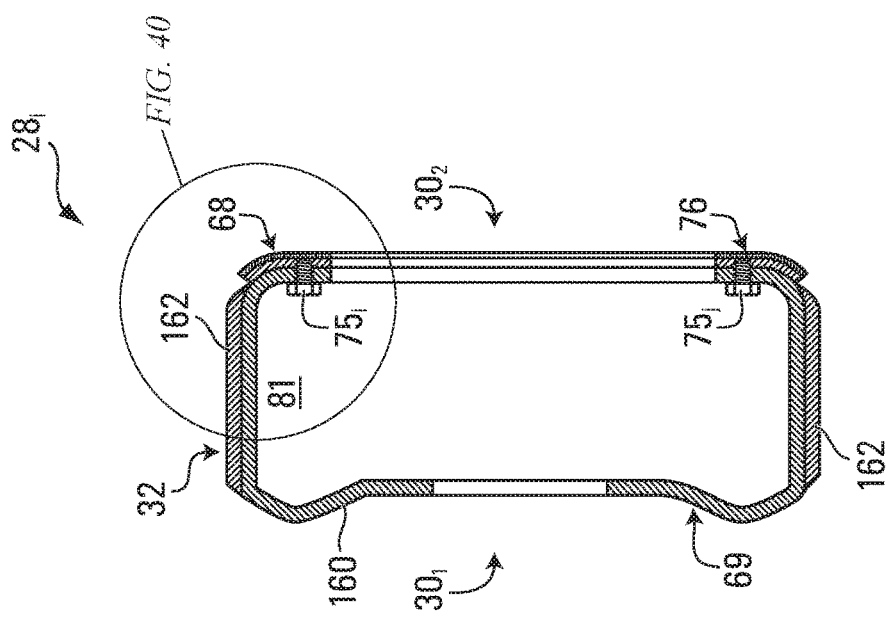
FIG. 40
FIG. 39

TRACK ASSEMBLY FOR AN OFF-ROAD VEHICLE

CROSS-REFERENCE TO RELATED APPLICATIONS

This application claims the benefit under 35 USC 120, and is a continuation of U.S. patent application Ser. No. 14/715,048, filed on May 18, 2015; which is a continuation of U.S. patent application Ser. No. 13/326,110, filed on Dec. 14, 2011, (now U.S. Pat. No. 9,033,431); which is a continuation-in-part of U.S. patent application Ser. No. 13/170,753, filed on Jun. 28, 2011 (now U.S. Pat. No. 8,967,737); which claims the benefit under 35 USC 119(e) of U.S. Provisional Patent Application No. 61/359,938, filed on Jun. 30, 2010 and U.S. Provisional Patent Application No. 61/422,976, filed on Dec. 14, 2010. All of these patent applications are hereby incorporated by reference herein.

FIELD OF THE INVENTION

The invention relates generally to off-road vehicles and, more particularly, to track assemblies for off-road vehicles.

BACKGROUND

Certain off-road vehicles, such as agricultural vehicles (e.g., harvesters, combines, tractors, etc.), industrial vehicles such as construction vehicles (e.g., loaders, bulldozers, excavators, etc.) and forestry vehicles (e.g., feller-bunchers, tree chippers, knuckleboom loaders, etc.), and military vehicles (e.g., combat engineering vehicles (CEVs), etc.) to name a few, may be equipped with elastomeric endless tracks which enhance their traction and floatation on soft, slippery and/or irregular grounds (e.g., soil, mud, sand, ice, snow, etc.) on which they operate.

Typically, a track assembly of a tracked vehicle comprises a plurality of wheels and an endless track disposed around these wheels. The wheels include a drive wheel to impart motion to the endless track and one or more idler wheels to support part of the vehicle's weight on the ground via the track, guide the track as it is driven by the drive wheel, and/or tension the track.

The wheels of a track assembly are often subject to friction, impacts and/or other loads that can affect their performance, the performance of the endless track, and/or the performance of the track assembly as a whole.

For example, an idler wheel of the track assembly may be a roller wheel that rolls on an inner side of the track along a bottom run of the track to apply it on the ground. The roller wheel is often located between frontmost and rearmost ones of the wheels of the track assembly. In certain types of work vehicles such as agricultural or construction vehicles, the roller wheel is sometimes referred to as a "mid-roller". Contact between the roller wheel and a rolling path of the track's inner side may create friction that generates some rolling resistance. Also, in some cases, the track's inner side may comprise a plurality of inner projections, referred to as inner "lugs", which are used to drive and/or guide the track and which may contact the roller wheel as the track is in motion. Contact between the roller wheel and a drive/guide lug creates friction that may be undesirable. For example, in some situations, such friction, if too great, may lead to wear of the drive/guide lug and/or the roller wheel at an unacceptable rate. In some circumstances, the roller wheel may also be exposed to hard objects (e.g., rocks, metal pieces, etc.) lying on the ground which may impact and/or get stuck against the roller wheel and inflict abrasive damage.

For these and other reasons, there is a need for improving track assemblies of off-road vehicles.

SUMMARY OF THE INVENTION

According to an aspect of the invention, there is provided a wheel for a track assembly of a tracked vehicle. The wheel in use is one of a plurality of wheels of the track assembly. The plurality of wheels comprises a drive wheel and a plurality of roller wheels. The track assembly comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. The wheel comprises a wheel body comprising a hub portion, a rim portion, and a radially-extending portion between the hub portion and the rim portion. The wheel body has a first lateral side and a second lateral side opposite one another and a peripheral side between the first lateral side and the second lateral side. The wheel also comprises a covering on the wheel body for contacting the inner side of the elastomeric endless track. A material of the covering is different from a material of the wheel body. The covering comprises a peripheral portion covering at least part of the peripheral side of the wheel body and a lateral portion covering at least part of the first lateral side of the wheel body. The lateral portion of the covering is dimensioned to contact a drive/guide lug of the plurality of drive/guide lugs when the wheel contacts the drive/guide lug.

According to another aspect of the invention, there is provided a track assembly for traction of a tracked vehicle. The track assembly comprises a plurality of wheels which comprises a drive wheel and a plurality of roller wheels. The track assembly also comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. A wheel of the plurality of wheels comprises a wheel body comprising a hub portion, a rim portion, and a radially-extending portion between the hub portion and the rim portion. The wheel body has a first lateral side and a second lateral side opposite one another and a peripheral side between the first lateral side and the second lateral side. The wheel also comprises a covering on the wheel body for contacting the inner side of the elastomeric endless track. A material of the covering is different from a material of the wheel body. The covering comprises a peripheral portion covering at least part of the peripheral side of the wheel body and a lateral portion covering at least part of the first lateral side of the wheel body. The lateral portion of the covering is dimensioned to contact a drive/guide lug of the plurality of drive/guide lugs when the wheel contacts the drive/guide lug.

According to another aspect of the invention, there is provided a method of manufacturing a wheel for a track assembly of a tracked vehicle. The wheel in use is one of a plurality of wheels of the track assembly. The plurality of wheels comprises a drive wheel and a plurality of roller wheels. The track assembly comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. The method comprises providing a wheel body comprising a hub portion, a rim portion, and a radially-extending portion between the hub portion and the rim portion. The wheel body has a first lateral side and a second lateral side opposite one another and a peripheral side between the first lateral side and the second lateral side. The method also comprises putting a covering on the wheel body for contacting the inner side of the elastomeric endless track. A material of the covering is different from a material of the wheel body. The covering comprises a peripheral portion covering at least part of the peripheral side of the wheel body and a lateral portion covering at least part of the first lateral side of the wheel body. The lateral portion of the covering is dimensioned to contact a drive/guide lug of the plurality of drive/guide lugs when the wheel contacts the drive/guide lug.

According to another aspect of the invention, there is provided a wheel for a track assembly of a tracked vehicle. The wheel in use is one of a plurality of wheels of the track assembly. The track assembly comprises an endless track disposed around the plurality of wheels. The endless track comprises an inner side for facing the plurality of wheels and a ground-engaging outer side for engaging the ground. The inner side of the endless track comprises a plurality of drive/guide lugs. The wheel comprises a wheel body comprising a hub portion, a rim portion, and a radially-extending portion between the hub portion and the rim portion. The wheel body has a first lateral side and a second lateral side opposite one another and a peripheral side between the first lateral side and the second lateral side. The wheel also comprises a covering on the wheel body for contacting the inner side of the endless track. A material of the covering is different from a material of the wheel body. The covering comprises a peripheral portion covering at least part of the peripheral side of the wheel body. A ratio of a thickness of the peripheral portion of the covering to a radius of the wheel is no more than 0.12.

According to another aspect of the invention, there is provided a track assembly for traction of a tracked vehicle. The track assembly comprises a plurality of wheels which comprises a drive wheel and a plurality of roller wheels. The track assembly also comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. A wheel of the plurality of wheels comprises a wheel body comprising a hub portion, a rim portion, and a radially-extending portion between the hub portion and the rim portion. The wheel body has a first lateral side and a second lateral side opposite one another and a peripheral side between the first lateral side and the second lateral side. The wheel also comprises a covering on the wheel body for contacting the inner side of the elastomeric endless track. A material of the covering is different from a material of the wheel body. The covering comprises a peripheral portion covering at least part of the peripheral side of the wheel body. A ratio of a thickness of the peripheral portion of the covering to a radius of the wheel is no more than 0.12.

According to another aspect of the invention, there is provided a method of manufacturing a wheel for a track assembly of a tracked vehicle. The wheel in use is one of a plurality of wheels of the track assembly. The plurality of wheels comprises a drive wheel and a plurality of roller wheels. The track assembly comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. The method comprises providing a wheel body comprising a hub portion, a rim portion, and a radially-extending portion between the hub portion and the rim portion. The wheel body has a first lateral side and a second lateral side opposite one another and a peripheral side between the first lateral side and the second lateral side. The method also comprises putting a covering on the wheel body for contacting the inner side of the elastomeric endless track. A material of the covering is different from a material of the wheel body. The covering comprises a peripheral portion covering at least part of the peripheral side of the wheel body. A ratio of a thickness of the peripheral portion of the covering to a radius of the wheel is no more than 0.12.

According to another aspect of the invention, there is provided a wheel for a track assembly of a tracked vehicle. The wheel in use is one of a plurality of wheels of the track assembly. The track assembly comprises an endless track disposed around the plurality of wheels. The endless track comprises an inner side for facing the plurality of wheels and a ground-engaging outer side for engaging the ground. The inner side of the endless track comprises a plurality of drive/guide lugs. The wheel comprises a wheel body comprising a hub portion, a rim portion, and a radially-extending portion between the hub portion and the rim portion. The wheel body has a first lateral side and a second lateral side opposite one another and a peripheral side between the first lateral side and the second lateral side. The wheel also comprises a covering on the wheel body for contacting the inner side of the endless track. The covering is made of a plurality of materials different from one another. Each of the materials of the covering is different from a material of the wheel body. The covering comprises a peripheral portion covering at least part of the peripheral side of the wheel body.

According to another aspect of the invention, there is provided a track assembly for traction of a tracked vehicle. The track assembly comprises a plurality of wheels which comprises a drive wheel and a plurality of roller wheels. The track assembly also comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. A wheel of the plurality of wheels comprises a wheel body comprising a hub portion, a rim portion, and a radially-extending portion between the hub portion and the rim portion. The wheel body has a first lateral side and a second lateral side opposite one another and a peripheral side between the first lateral side and the second lateral side. The wheel also comprises a covering on the wheel body for contacting the inner side of the elastomeric endless track. The covering is made of a plurality of materials different from one another. Each of the materials of the covering is different from a material of the wheel body. The covering comprises a peripheral portion covering at least part of the peripheral side of the wheel body.

According to another aspect of the invention, there is provided a method of manufacturing a wheel for a track assembly of a tracked vehicle. The wheel in use is one of a plurality of wheels of the track assembly. The plurality of wheels comprises a drive wheel and a plurality of roller wheels. The track assembly comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. The method comprises providing a wheel body comprising a hub portion, a rim portion, and a radially-extending portion between the hub portion and the rim portion. The wheel body has a first lateral side and a second lateral side opposite one another and a peripheral side between the first lateral side and the second lateral side. The method also comprises putting a covering on the wheel body for contacting the inner side of the elastomeric endless track. The covering is made of a plurality of materials different from one another. Each of the materials of the covering is different from a material of the wheel body. The covering comprises a peripheral portion covering at least part of the peripheral side of the wheel body.

According to another aspect of the invention, there is provided a track assembly for traction of a tracked vehicle. The track assembly comprises a plurality of wheels which comprises a drive wheel and a plurality of roller wheels. The track assembly also comprises an elastomeric endless track disposed around the plurality of wheels for engaging the ground. The elastomeric endless track comprises an inner side for facing the plurality of wheels and a ground-engaging outer side for engaging the ground. The drive wheel is rotatable to drive the elastomeric endless track. The roller wheels are mounted to roll on a bottom run of the elastomeric endless track. When the roller wheels roll on the bottom run of the elastomeric endless track, the roller wheels exert opposite lateral force components on the elastomeric endless track in a widthwise direction of the elastomeric endless track which tend to align the elastomeric endless track within the track assembly.

According to another aspect of the invention, there is provided a roller wheel for a track assembly of a tracked vehicle. The roller wheel in use is one of a plurality of roller wheels of the track assembly. The track assembly comprises a drive wheel. The track assembly comprises an elastomeric endless track disposed around the drive wheel and the roller wheels for engaging the ground. The elastomeric endless track comprises an inner side for facing the drive wheel and the roller wheels and a ground-engaging outer side for engaging the ground. The drive wheel is rotatable to drive the elastomeric endless track. The roller wheels are mounted to roll on a bottom run of the elastomeric endless track. The roller wheel comprises a first lateral side and a second lateral side opposite one another a peripheral side between the first lateral side and the second lateral side. When the roller wheels roll on the bottom run of the elastomeric endless track, the roller wheel and another one of the roller wheels exert opposite lateral force components on the elastomeric endless track in a widthwise direction of the elastomeric endless track which tend to align the elastomeric endless track within the track assembly.

According to another aspect of the invention, there is provided an elastomeric endless track for a track assembly of a tracked vehicle. The track assembly comprises a plurality of wheels which comprises a drive wheel and a plurality of roller wheels. The elastomeric endless track is mountable around the plurality of wheels for engaging the ground. The drive wheel is rotatable to drive the elastomeric endless track. The roller wheels are mounted to roll on a bottom run of the elastomeric endless track. The elastomeric endless track comprises an inner side for facing the plurality of wheels and a ground-engaging outer side for engaging the ground. The elastomeric endless track is configured such that, when the roller wheels roll on the bottom run of the elastomeric endless track, the roller wheels exert opposite lateral force components on the elastomeric endless track in a widthwise direction of the elastomeric endless track which tend to align the elastomeric endless track within the track assembly.

According to an aspect of the invention, there is provided a roller wheel for a track assembly of a tracked vehicle. The roller wheel in use is one of a plurality of roller wheels of the track assembly. The track assembly comprises a drive wheel. The track assembly comprises an elastomeric endless track disposed around the drive wheel and the roller wheels for engaging the ground. The elastomeric endless track comprises an inner side for facing the drive wheel and the roller wheels and a ground-engaging outer side for engaging the ground. The drive wheel is rotatable to drive the elastomeric endless track. The roller wheels are mounted to roll on a bottom run of the elastomeric endless track. A roller wheel of the plurality of roller wheels has a first lateral side and a second lateral side opposite one another and a peripheral side between the first lateral side and the second lateral side. The roller wheel comprises a removable track-contacting member forming at least part of at least one of the peripheral side, the first lateral side and the second lateral side of the roller wheel and positioned to contact the endless track in use. The removable track-contacting member is removably mounted to a remainder of the roller wheel.

According to another aspect of the invention, there is provided a removable track-contacting member for a roller wheel of a plurality of roller wheels of a track assembly of a tracked vehicle. The track assembly comprises a drive wheel. The track assembly comprises an elastomeric endless track disposed around the drive wheel and the roller wheels for engaging the ground. The elastomeric endless track comprises an inner side for facing the drive wheel and the roller wheels and a ground-engaging outer side for engaging the ground. The drive wheel is rotatable to drive the elastomeric endless track. The roller wheels are mounted to roll on a bottom run of the elastomeric endless track. The removable track-contacting member is configured to form at least part of at least one of the peripheral side, the first lateral side and the second lateral side of the roller wheel and be positioned to contact the endless track in use. The removable track-contacting member is removably mountable to a remainder of the roller wheel.

According to an aspect of the invention, there is provided a roller wheel for a track assembly of a tracked vehicle. The roller wheel in use is one of a plurality of roller wheels of the track assembly. The track assembly comprises a drive wheel. The track assembly comprises an elastomeric endless track disposed around the drive wheel and the roller wheels for engaging the ground. The elastomeric endless track comprises an inner side for facing the drive wheel and the roller wheels and a ground-engaging outer side for engaging the ground. The drive wheel is rotatable to drive the elastomeric endless track. The roller wheels are mounted to roll on a bottom run of the elastomeric endless track. The roller wheel comprises a wheel core comprising a hub portion, a rim portion, and a radially-extending portion between the hub portion and the rim portion. The roller wheel also comprises a removable track-contacting interface detachably fastened to the wheel core. The removable track-contacting interface forms at least part of a lateral side of the roller wheel such that, when the roller wheel contacts a drive/guide lug of the plurality of drive/guide lugs, the removable track-contacting interface contacts the drive/guide lug.

According to another aspect of the invention, there is provided a removable track-contacting interface for a roller wheel of a plurality of roller wheels of a track assembly of a tracked vehicle. The track assembly comprises a drive wheel. The track assembly comprises an elastomeric endless track disposed around the drive wheel and the roller wheels for engaging the ground. The elastomeric endless track comprises an inner side for facing the drive wheel and the roller wheels and a ground-engaging outer side for engaging the ground. The drive wheel is rotatable to drive the elastomeric endless track. The roller wheels are mounted to roll on a bottom run of the elastomeric endless track. The roller wheel comprises a wheel core comprising a hub portion, a rim portion, and a radially-extending portion between the hub portion and the rim portion. The removable track-contacting interface comprises a core-facing side for facing the wheel core and a lug-facing side for facing a drive/guide lug of the plurality of drive/guide lugs when the roller wheel contacts the drive/guide lug. The removable track-contacting interface is detachably fastenable to the wheel core. The removable track-contacting interface forms at least part of a lateral side of the roller wheel when fastened to the wheel core such that, when the roller wheel contacts the drive/guide lug, the removable track-contacting interface contacts the drive/guide lug.

According to another aspect of the invention, there is provided a method of assembling a roller wheel for a track assembly of a tracked vehicle. The roller wheel in use is one of a plurality of roller wheels of the track assembly. The track assembly comprises a drive wheel. The track assembly comprises an elastomeric endless track disposed around the drive wheel and the roller wheels for engaging the ground. The elastomeric endless track comprises an inner side for facing the drive wheel and the roller wheels and a ground-engaging outer side for engaging the ground. The drive wheel is rotatable to drive the elastomeric endless track. The roller wheels are mounted to roll on a bottom run of the elastomeric endless track. The method comprises providing a wheel core comprising a hub portion, a rim portion, and a radially-extending portion between the hub portion and the rim portion. The method also comprises detachably fastening a removable track-contacting interface to the wheel core. The removable track-contacting interface forms at least part of a lateral side of the roller wheel such that, when the roller wheel contacts a drive/guide lug of the plurality of drive/guide lugs, the removable track-contacting interface contacts the drive/guide lug.

According to another aspect of the invention, there is provided a wheel for a track assembly of a tracked vehicle. The wheel in use is one of a plurality of wheels of the track assembly. The track assembly comprises an endless track disposed around the plurality of wheels. The endless track comprises an inner side for facing the plurality of wheels and a ground-engaging outer side for engaging the ground. The inner side of the endless track comprises a plurality of drive/guide lugs. The wheel comprises a hub portion, a rim portion, and a radially-extending portion between the hub portion and the rim portion. The wheel has a first lateral side and a second lateral side opposite one another and a peripheral side between the first lateral side and the second lateral side. The first lateral side of the wheel comprises a lug-contacting portion for contacting a drive/guide lug of the plurality of drive/guide lugs. The lug-contacting portion defines a plurality of oblique angles relative to a vertical axis.

According to another aspect of the invention, there is provided a track assembly for traction of a tracked vehicle. The track assembly comprises a plurality of wheels which comprises a drive wheel and a plurality of roller wheels. The track assembly also comprises an elastomeric endless track disposed around the plurality of wheels for engaging the ground. The elastomeric endless track comprises an inner side for facing the plurality of wheels and a ground-engaging outer side for engaging the ground. The inner side of the elastomeric endless track comprises a plurality of drive/guide lugs. The drive wheel is rotatable to drive the elastomeric endless track. The roller wheels are mounted to roll on a bottom run of the elastomeric endless track. A wheel of the plurality of wheels comprises a hub portion, a rim portion, and a radially-extending portion between the hub portion and the rim portion. The wheel has a first lateral side and a second lateral side opposite one another and a peripheral side between the first lateral side and the second lateral side. The first lateral side of the wheel comprises a lug-contacting portion for contacting a drive/guide lug of the plurality of drive/guide lugs. The lug-contacting portion defines a plurality of oblique angles relative to a vertical axis.

According to another aspect of the invention, there is provided a roller wheel for a track assembly of a tracked vehicle. The roller wheel in use is one of a plurality of roller wheels of the track assembly. The track assembly comprises a drive wheel. The track assembly comprises an endless track disposed around the drive wheel and the roller wheels for engaging the ground. The endless track comprises an inner side for facing the drive wheel and the roller wheels and a ground-engaging outer side for engaging the ground. The drive wheel is rotatable to drive the endless track. The roller wheels are mounted to roll on a bottom run of the endless track. The roller wheel has a first lateral side and a second lateral side opposite one another and a peripheral side between the first lateral side and the second lateral side. The roller wheel comprises a movable lug-contacting surface for contacting a drive/guide lug of the plurality of drive/guide lugs. The movable lug-contacting surface is configured to move relative to a remainder of the roller wheel when the roller wheel contacts the drive/guide lug to reduce a speed difference between the roller wheel and the drive/guide lug.

According to another aspect of the invention, there is provided a track assembly for traction of a tracked vehicle.

The track assembly comprises a plurality of wheels which comprises a drive wheel and a plurality of roller wheels. The track assembly also comprises an endless track disposed around the plurality of wheels for engaging the ground. The endless track comprises an inner side for facing the plurality of wheels and a ground-engaging outer side for engaging the ground. The drive wheel is rotatable to drive the endless track. The roller wheels are mounted to roll on a bottom run of the endless track. The track assembly comprises a cooling system for transferring heat away from a roller wheel of the plurality of roller wheels.

According to another aspect of the invention, there is provided a track assembly for traction of a tracked vehicle. The track assembly comprises a frame and a plurality of wheels which comprises a drive wheel and a plurality of roller wheels. The track assembly also comprises an endless track disposed around the plurality of wheels for engaging the ground. The endless track comprises an inner side for facing the plurality of wheels and a ground-engaging outer side for engaging the ground. The drive wheel is rotatable to drive the endless track. The roller wheels are mounted to roll on a bottom run of the endless track. The track assembly comprises a lateral motion mechanism allowing a roller wheel of the plurality of roller wheels to move in a widthwise direction of the track assembly in response to a side load.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 11 to 35 show different examples of wheels of the track assembly in accordance with various embodiments of the invention, each wheel comprising a wheel body and a covering on the wheel body;

FIGS. 37 to 47 show different examples of wheels of the track assembly in accordance with various embodiments of the invention, each wheel comprising one or more removable track-contacting members;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
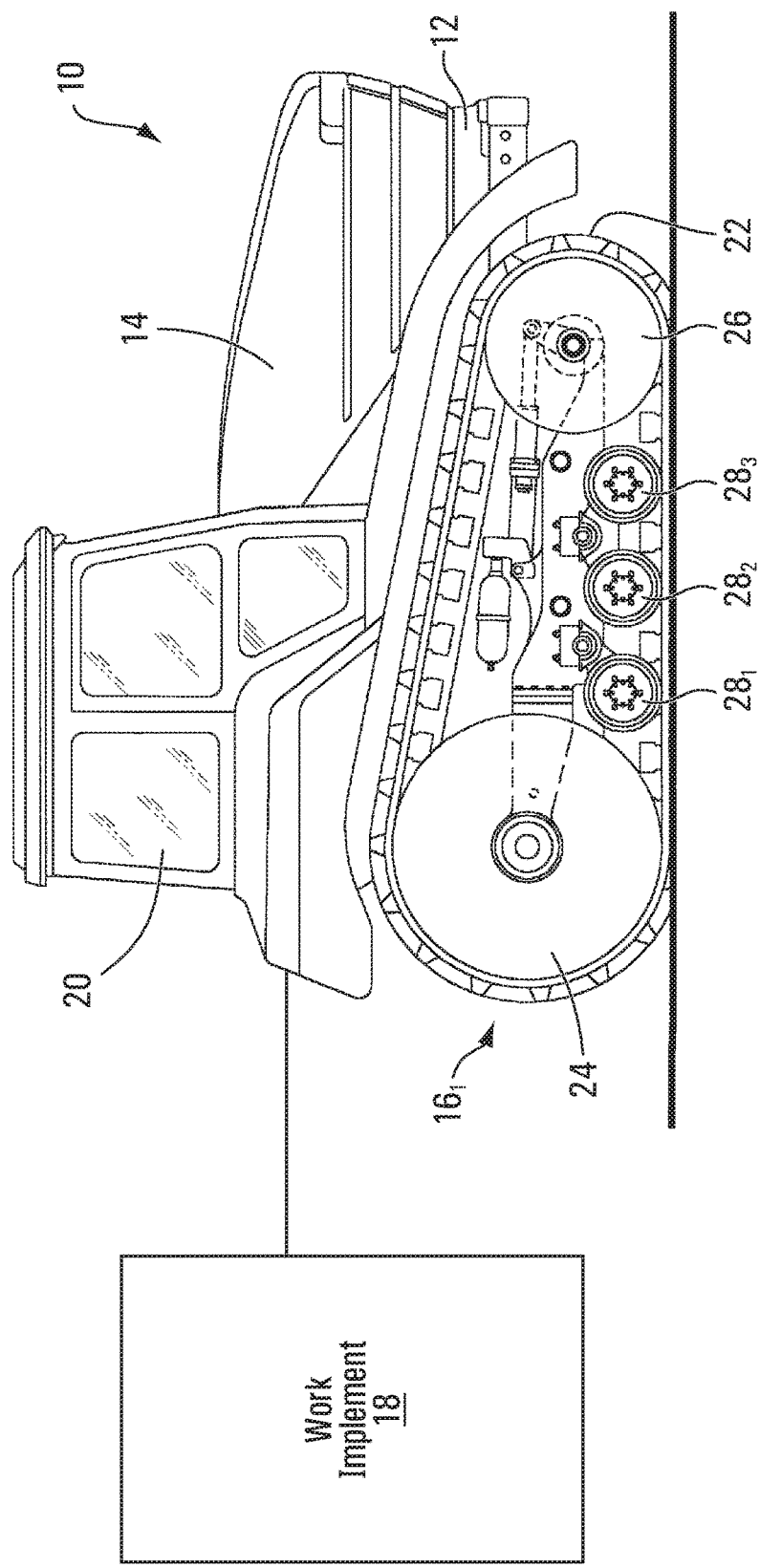
FIG. 1 shows an example of a tracked vehicle in accordance with an embodiment of the invention.
Figure 3:
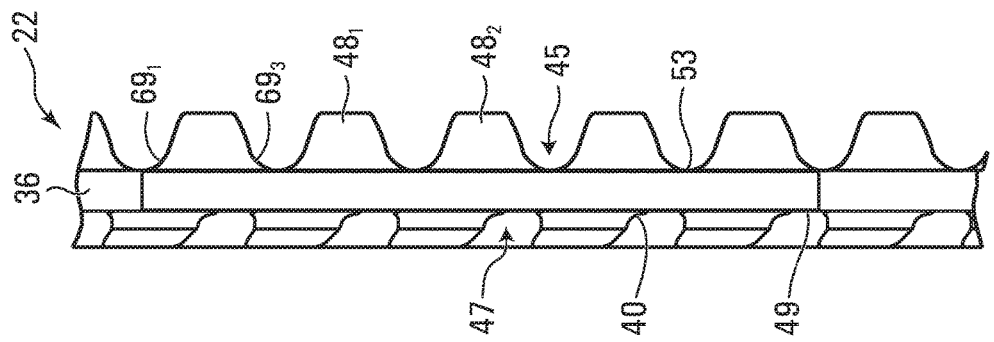
FIGS. 2 to 5 respectively show a top view, a side view, a bottom view and a cross-sectional view of an example of a track of a track assembly of the tracked vehicle.
Figure 2:
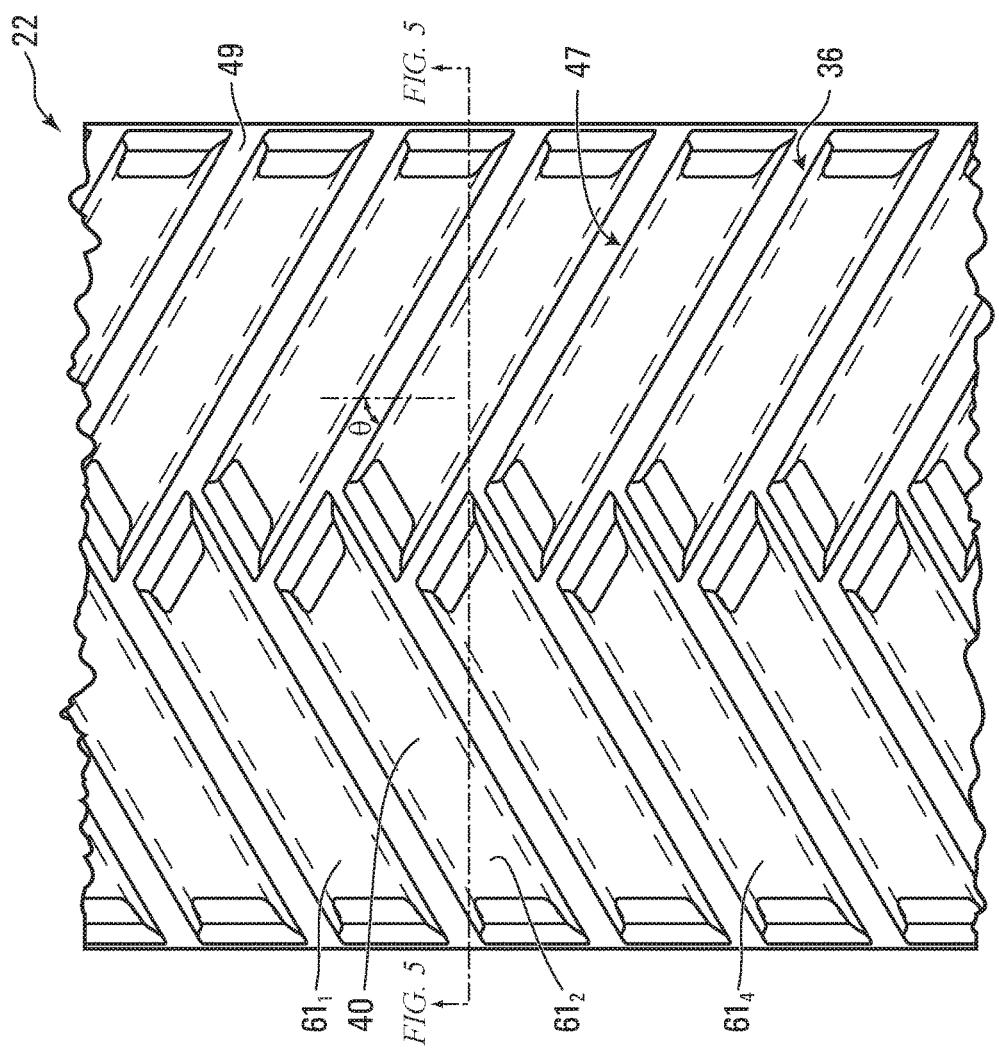
Figure 4:
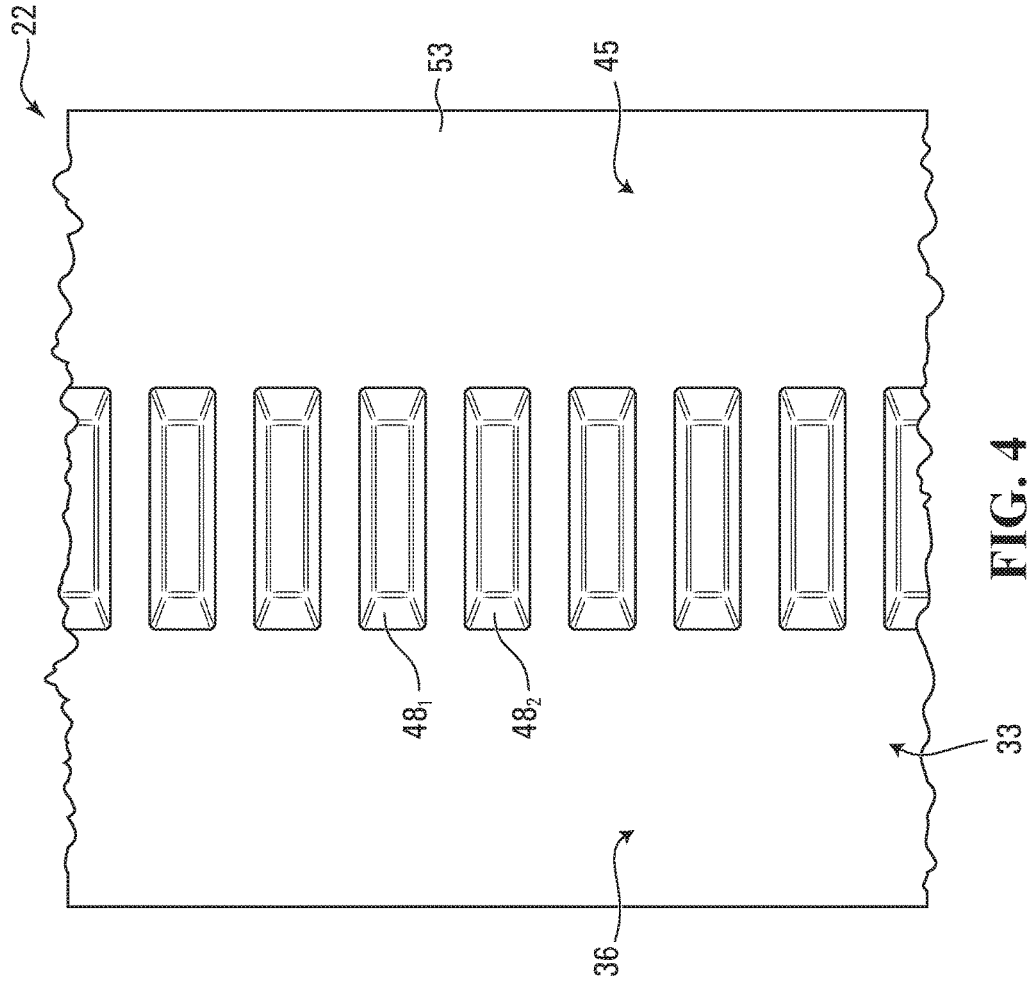
Figure 5:
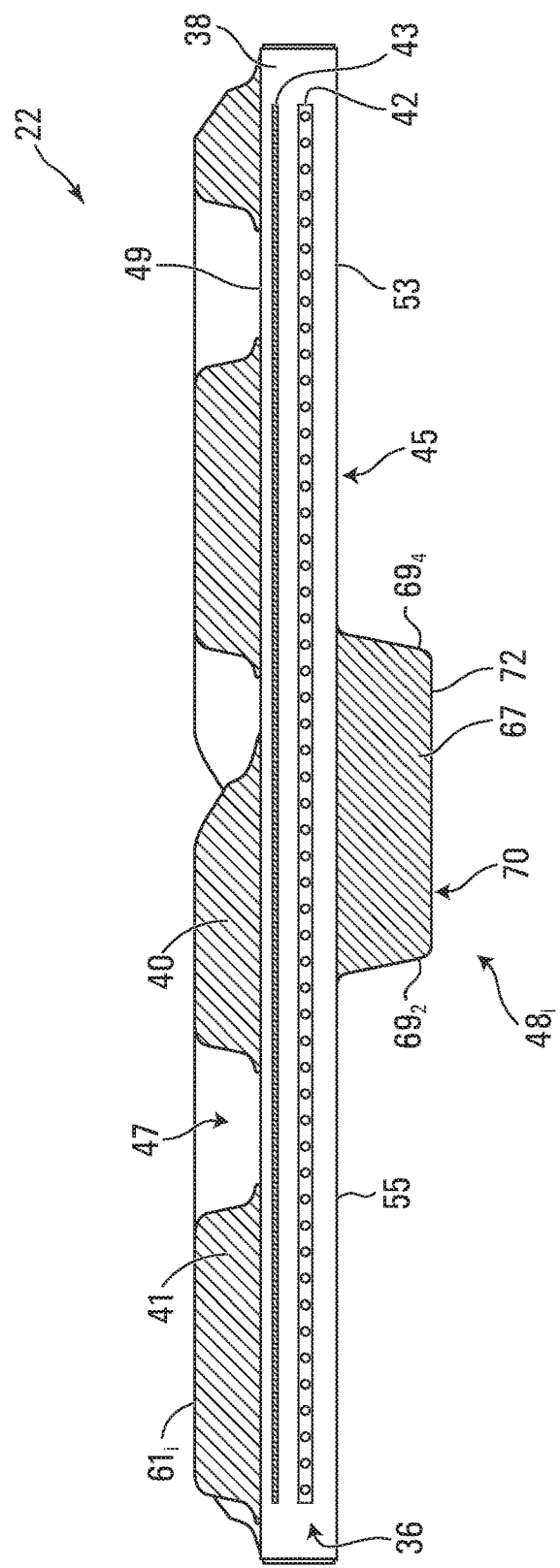
Figure 6:
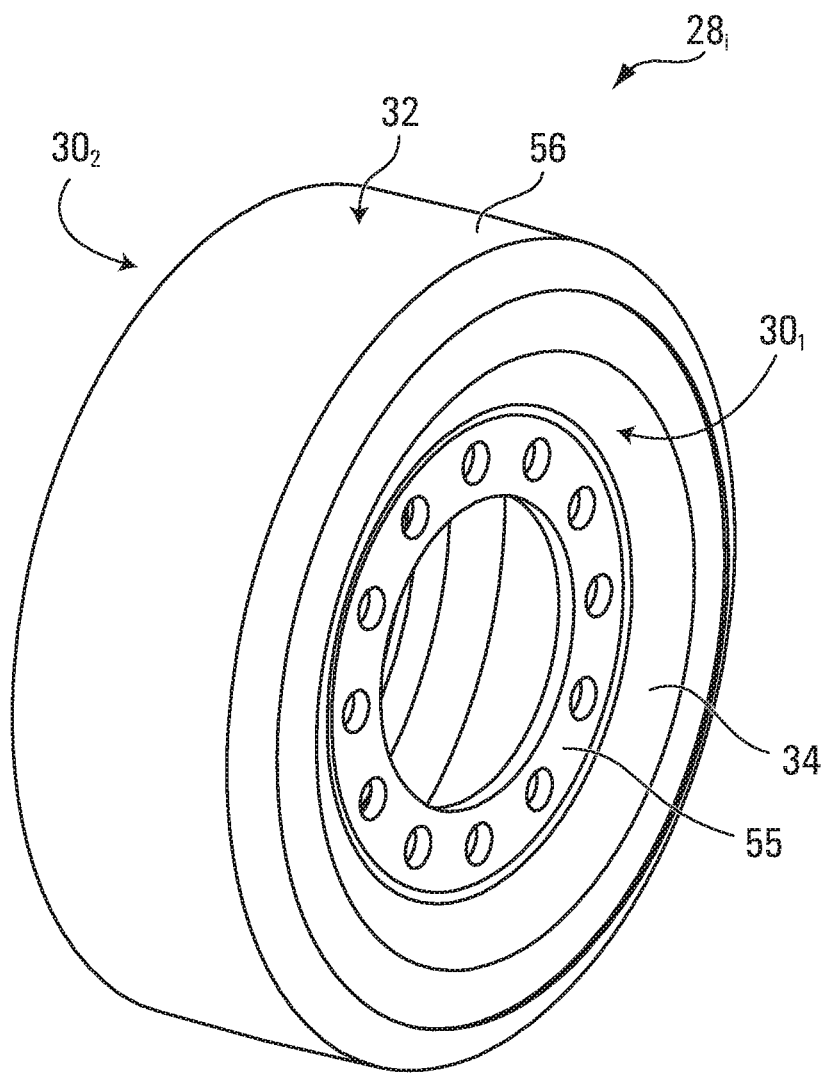
FIGS. 6 to 9 respectively show a first perspective view, a second perspective view, a side view and a front view of an example of a wheel of the track assembly.
Figure 7:
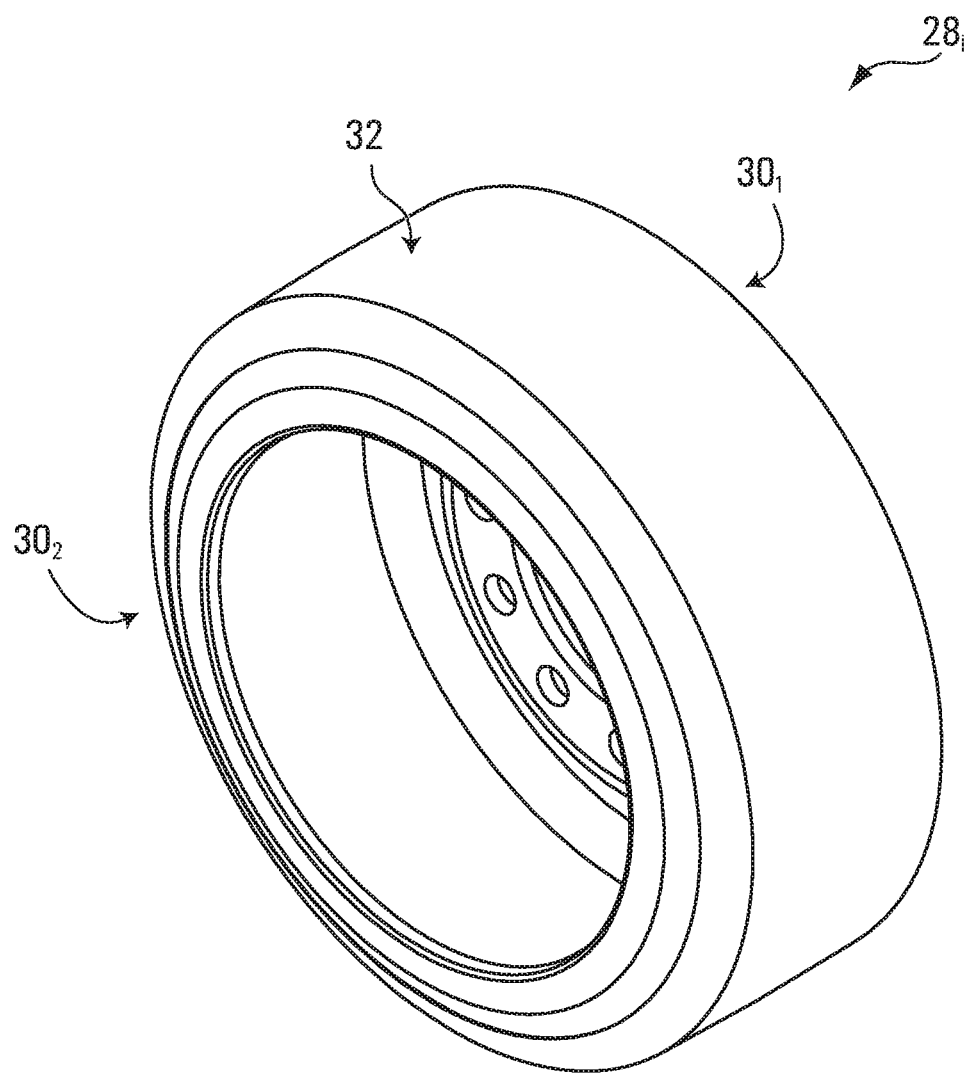
Figure 8:
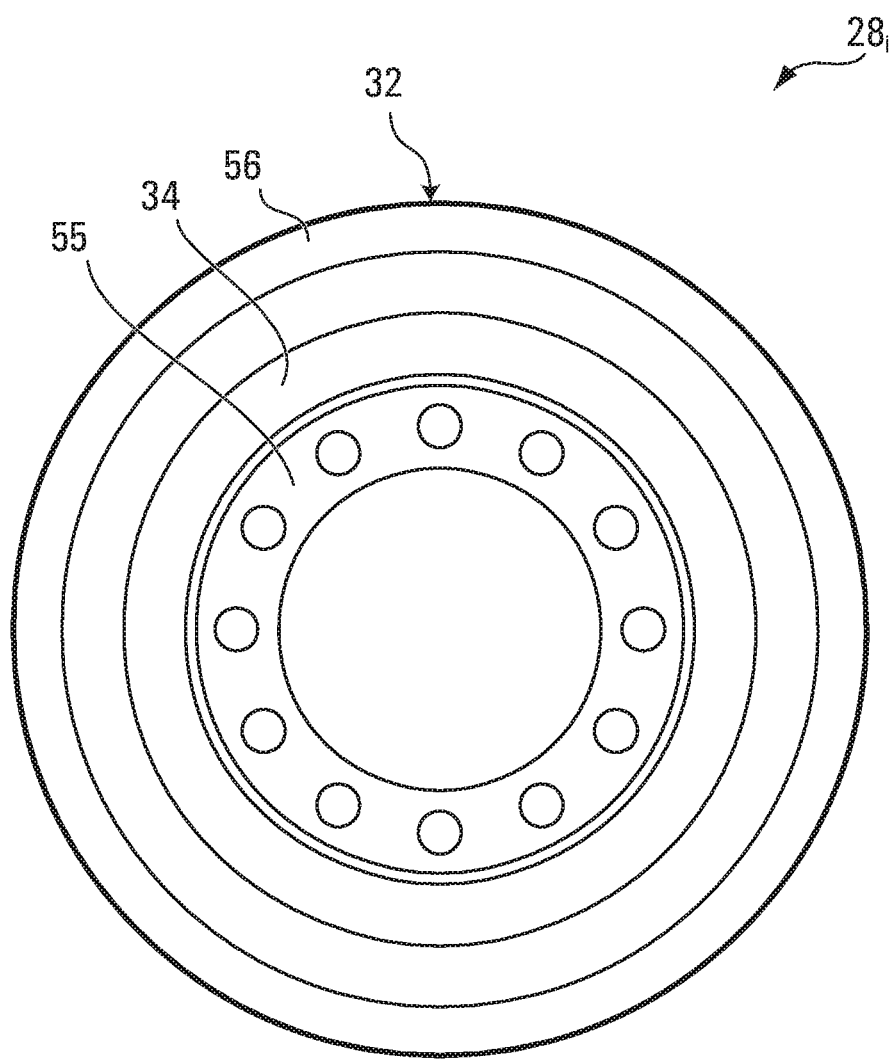
Figure 9:
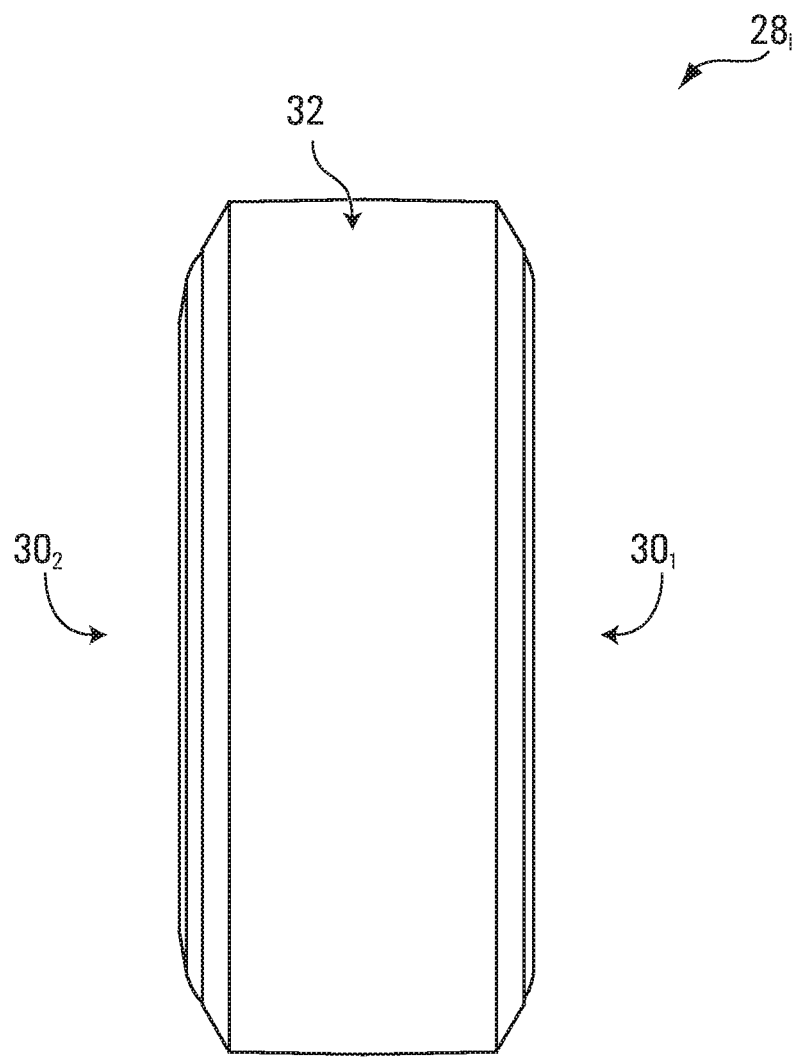
Figure 10:
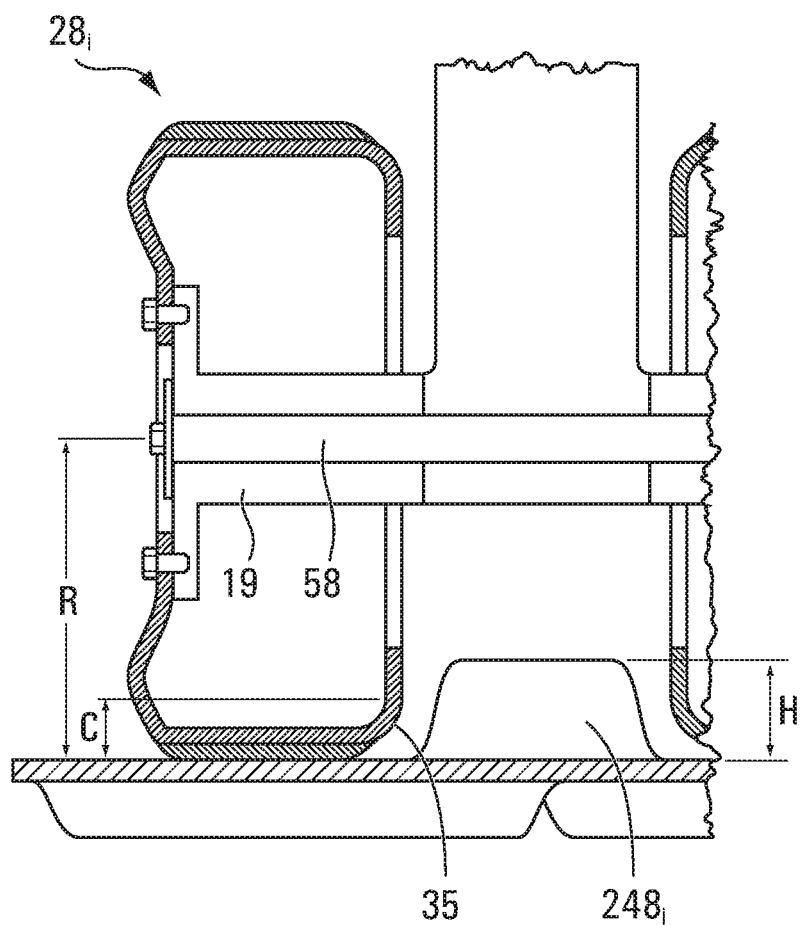
FIG. 10 shows a cross-sectional view of the wheel in its environment.
Figure 11:
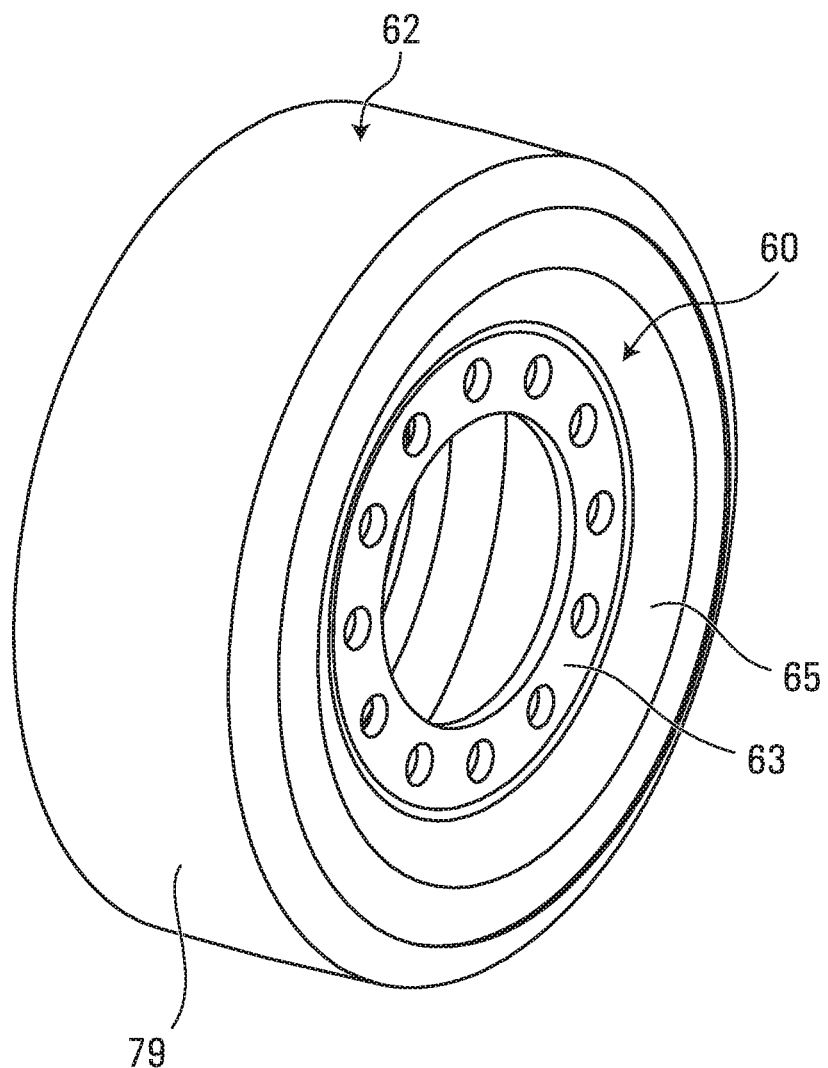
Figure 12:
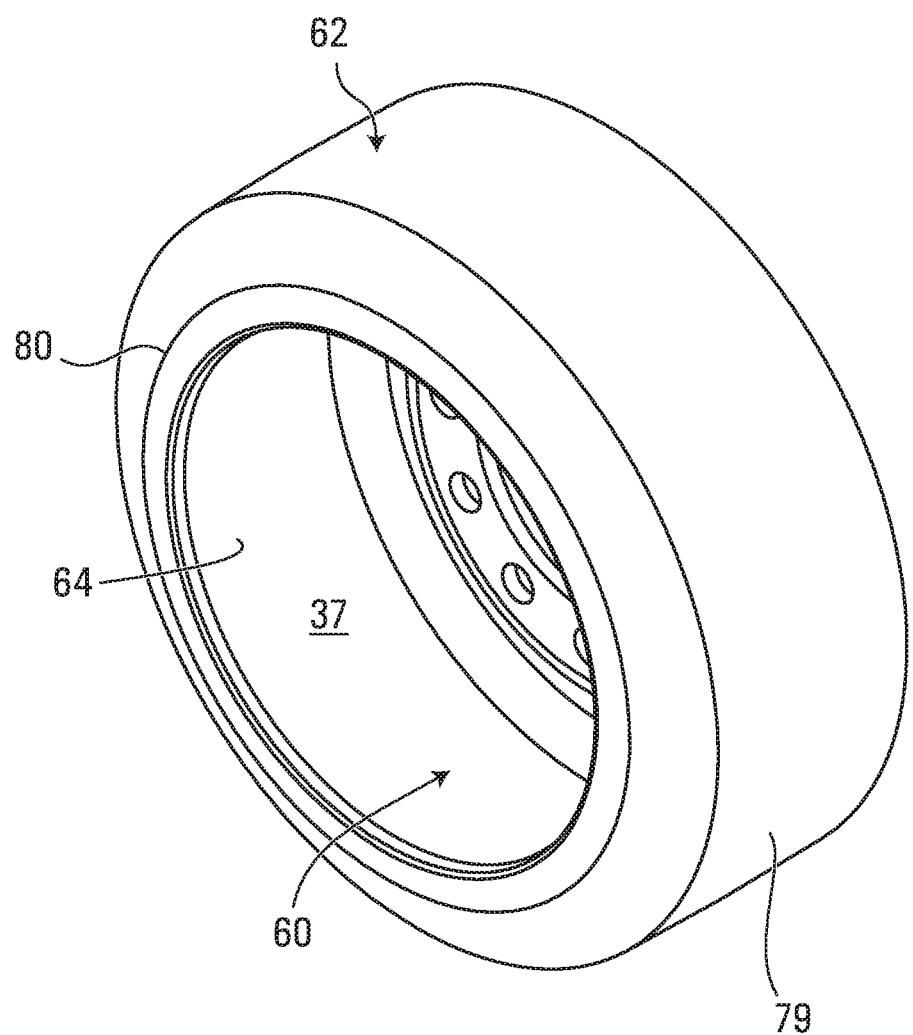
Figure 13:
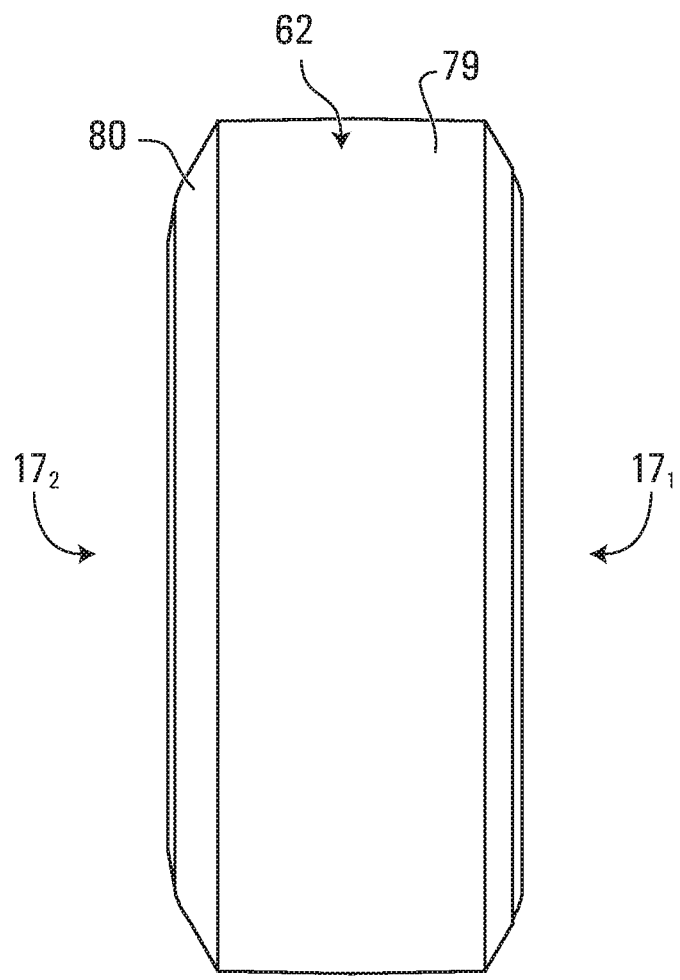
Figure 14A:
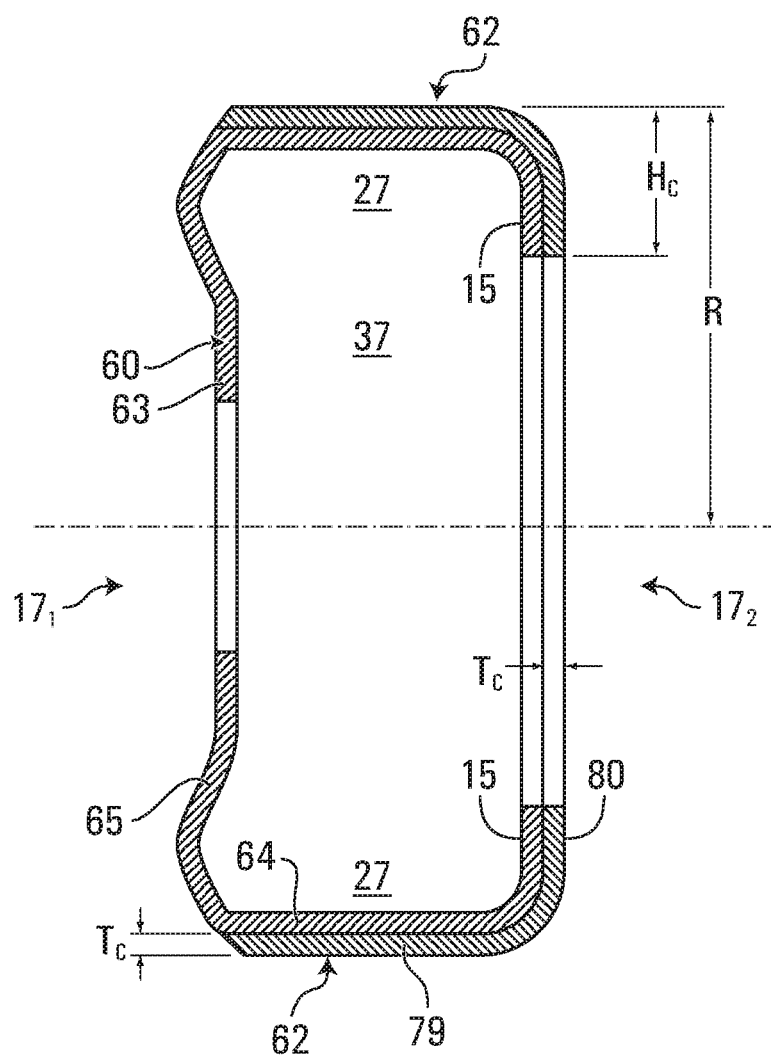
Figure 14B:
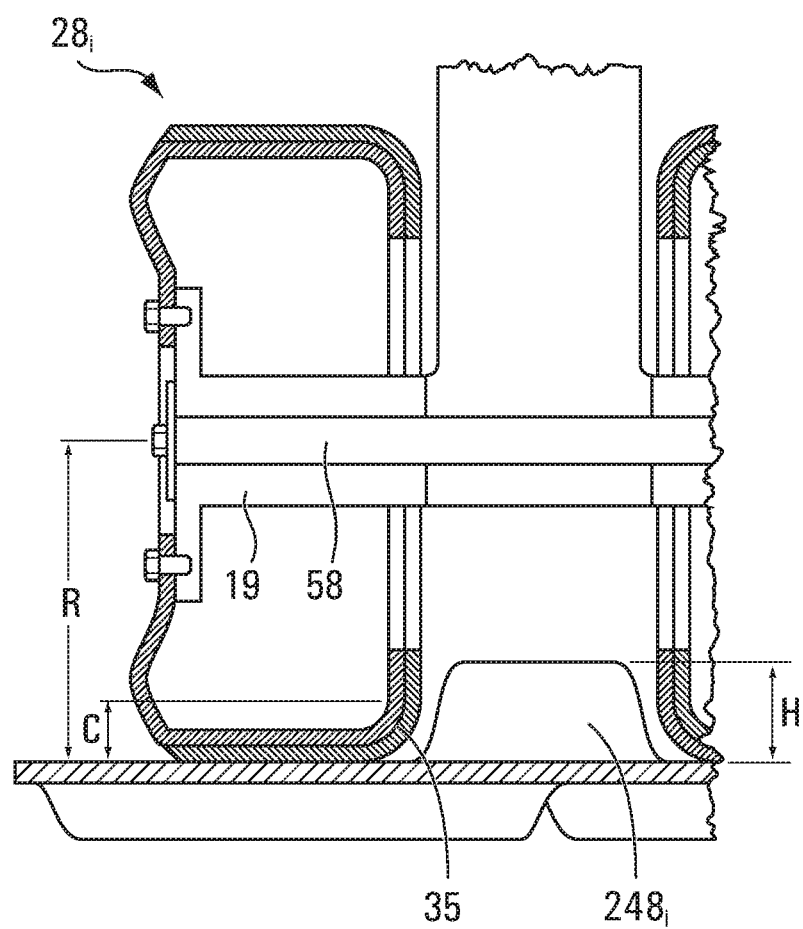

FIG. 1 shows an example of an off-road tracked vehicle 10 in accordance with an embodiment of the invention. In this embodiment, the vehicle 10 is a heavy-duty work vehicle for performing agricultural, construction, industrial, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12 supporting a prime mover 14, a pair of track assemblies $16_1$, $16_2$ (which can be referred to as "undercarriages"), and an operator cabin 20, which enable an operator to move the agricultural vehicle 10 on the ground to perform agricultural work possibly using a work implement 18.

The prime mover 14 provides motive power to move the agricultural vehicle 10. For example, the prime mover 14 may comprise an internal combustion engine and/or one or more other types of motors (e.g., electric motors, etc.) for generating motive power to move the agricultural vehicle 10. The prime mover 14 is in a driving relationship with each of the track assemblies $16_1$, $16_2$. That is, power derived from the prime mover 14 is transmitted to the track assemblies $16_1$, $16_2$ via a powertrain of the agricultural vehicle 10.

The work implement 18 is used to perform agricultural work. For example, in some embodiments, the work implement 18 may be a combine head, a cutter, a scraper, a tiller, or any other type of agricultural work implement.

The operator cabin 20 is where the operator sits and controls the agricultural vehicle 10. More particularly, the operator cabin 20 comprises a user interface 46 including a set of controls that allow the operator to steer the agricultural vehicle 10 on the ground, operate the work implement 18, and control other aspects of the vehicle 10.

The track assemblies $16_1$, $16_2$ engage the ground to propel the agricultural vehicle 10. More particularly, in this embodiment, each track assembly $16_i$ comprises an elastomeric endless track 22 disposed around a plurality of wheels, which includes a drive wheel 24 and a plurality of idler wheels, which includes a front (leading) idler wheel 26 and a plurality of roller wheels $28_1$-$28_6$. The track assembly $16_i$ has a first longitudinal end 57 and a second longitudinal end 59 that define a length of the track assembly $16_i$. A width of the track assembly $16_i$ is defined by a width of the endless track 22. The track assembly $16_i$ has a longitudinal direction, a widthwise direction, and a height direction.

The elastomeric endless track 22 engages the ground to provide traction to the agricultural vehicle 10. With additional reference to FIGS. 2 to 5, the track 22 has an inner side 45 facing the wheels 24, 26, $28_1$-$28_6$ and defining an inner area of the track 22 in which these wheels are located. The track 22 also has a ground-engaging outer side 47 opposite the inner side 45 and engaging the ground on which the agricultural vehicle 10 travels. The track 22 has a top run 65 which extends between the longitudinal ends 57, 59 of the track assembly 16$_i$ and over the wheels 24, 26, 28$_1$-28$_6$ and a bottom run 66 which extends between the longitudinal ends 57, 59 of the track assembly 16$_i$ and under the wheels 24, 26, 28$_1$-28$_6$. The track 22 has a longitudinal direction, a widthwise direction, and a thickness direction.

The elastomeric endless track 22 is elastomeric in that it comprises elastomeric material allowing it to elastically change in shape as it is in motion around the wheels 24, 26, 28$_1$-28$_6$. More particularly, the track 22 comprises an elastomeric belt-shaped body 36 underlying its inner side 45 and its ground-engaging outer side 47. In view of its underlying nature, the body 36 can be referred to as a "carcass". The carcass 36 is elastomeric in that it comprises elastomeric material 38 which allows the track 22 to elastically change in shape as it is in motion around the wheels 24, 26, 28$_1$-28$_6$. The elastomeric material 38 can be any polymeric material with suitable elasticity. In this embodiment, the elastomeric material includes rubber. Various rubber compounds may be used and, in some cases, different rubber compounds may be present in different areas of the track 22. In other embodiments, the elastomeric material 38 may include another elastomer in addition to or instead of rubber (e.g., polyurethane elastomer).

In this embodiment, the carcass 36 comprises a plurality of reinforcements 42, 43 embedded in its elastomeric material 38. In this example, the reinforcement 42 is a layer of reinforcing cables that are adjacent to one another and that extend in the longitudinal direction of the track 22 to enhance strength in tension of the track 22 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). The reinforcement 43 is a layer of reinforcing fabric. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The inner side 45 of the endless track 22 comprises an inner surface 53 of the carcass 36 and, in this embodiment, a plurality of inner wheel-contacting projections 48$_1$-48$_N$ that project from the inner surface 53 and are positioned to contact at least some of the wheels 24, 26, 28$_1$-28$_6$ to do at least one of driving (i.e., imparting motion to) the track 22 and guiding the track 22. The wheel-contacting projections 48$_1$-48$_N$ can be referred to as "wheel-contacting lugs". Furthermore, since each of them is used to do at least one of driving the track 22 and guiding the track 22, the wheel-contacting lugs 48$_1$-48$_N$ can be referred to as "drive/guide projections" or "drive/guide lugs". In some examples of implementation, a drive/guide lug 48$_i$ may interact with the drive wheel 24 to drive the track 22, in which case the drive/guide lug 48$_i$ is a drive lug. In other examples of implementation, a drive/guide lug 48$_i$ may interact with the idler wheel 26 and/or the roller wheels 28$_1$-28$_6$ to guide the track 22 to maintain proper track alignment and prevent de-tracking without being used to drive the track 22, in which case the drive/guide lug 48$_i$ is a guide lug. In yet other examples of implementation, a drive/guide lug 48$_i$ may both (i) interact with the drive wheel 24 to drive the track and (ii) interact with the idler wheel 26 and/or the roller wheels 28$_1$-28$_6$ to guide the track 22 to maintain proper track alignment and prevent de-tracking, in which case the drive/guide lug 48$_i$ is both a drive lug and a guide lug.

In this embodiment, the drive/guide lugs 48$_1$-48$_N$ interact with the drive wheel 24 in order to cause the track 22 to be driven, and also interact with the idler wheel 26 and the roller wheels 28$_1$-28$_6$ in order to guide the track 22 as it is driven by the drive wheel 24. The drive/guide lugs 48$_1$-48$_N$ are thus used to both drive the track 22 and guide the track 22 in this embodiment.

The drive/guide lugs 48$_1$-48$_N$ are spaced apart along the longitudinal direction of the endless track 22. In this case, the drive/guide lugs 48$_1$-48$_N$ are arranged in a single row. The drive/guide lugs 48$_1$-48$_N$ may be arranged in other manners in other embodiments (e.g., in a plurality of rows that are spaced apart along a widthwise direction of the track 22).

In this case, each of the drive/guide lugs 48$_1$-48$_N$ is an elastomeric drive/guide lug in that it comprises elastomeric material 67. The elastomeric material 67 can be any polymeric material with suitable elasticity. More particularly, in this case, the elastomeric material 67 includes rubber. Various rubber compounds may be used and, in some cases, different rubber compounds may be present in different areas of each of the drive/guide lugs 48$_1$-48$_N$. In other cases, the elastomeric material 67 may include another elastomer in addition to or instead of rubber.

The ground-engaging outer side 47 comprises a ground-engaging outer surface 49 of the carcass 36 and a tread pattern 40 to enhance traction on the ground. The tread pattern 40 comprises a plurality of traction projections 61$_1$-61$_M$ (sometimes referred to as "traction lugs", "tread members" or "tread bars") that project from the ground-engaging outer surface 49, are spaced apart along the longitudinal direction of the endless track 22, and engage the ground to enhance traction. In this embodiment, each of the traction projections 61$_1$-61$_M$ has an elongated shape and is angled (i.e., defines an acute angle θ) relative to the longitudinal direction of the endless track 22. The traction projections 61$_1$-61$_M$ may have various other shapes in other examples (e.g., curved shapes, shapes with straight parts and curved parts, etc.).

In this case, each of the traction projections 61$_1$-61$_M$ is an elastomeric traction projection in that it comprises elastomeric material 41. The elastomeric material 41 can be any polymeric material with suitable elasticity. More particularly, in this case, the elastomeric material 41 includes rubber. Various rubber compounds may be used and, in some cases, different rubber compounds may be present in different areas of each of the traction projections 61$_1$-61$_M$. In other embodiments, the elastomeric material 41 may include another elastomer in addition to or instead of rubber.

The endless track 22 may be constructed in various other manners in other embodiments. For example, in some embodiments, the track 22 may comprise a plurality of elastomeric sections (e.g., rubber sections) interconnected to form the elastomeric belt-shaped body 36, the track 22 may have recesses or holes that interact with the drive wheel 24 in order to cause the track 22 to be driven (e.g., in which case the drive/guide lugs 48$_1$-48$_N$ may be used only to guide the track 22 without being used to drive the track 22), and/or the ground-engaging outer side 47 of the track 22 may comprise various patterns of traction projections.

The drive wheel 24 is rotatable about an axle for driving the track 22. That is, power generated by the prime mover 14 and delivered over the powertrain of the agricultural vehicle 10 can rotate the axle that rotates the drive wheel 24, which in turn imparts motion of the track 22.

In this embodiment, the drive wheel 24 comprises a drive sprocket engaging the drive/guide lugs $48_1$-$48_N$ of the inner side 45 of the track 22 in order to drive the track 22. The drive wheel 24 and the track 22 thus implement a "positive drive" system. In other embodiments, the drive wheel 24 may be configured in various other ways. For example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" system).

The front idler wheel 26 and the roller wheels $28_1$-$28_6$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22.

More particularly, in this embodiment, the front idler wheel 26 maintains the track 22 in tension and helps to support part of the weight of the agricultural vehicle 10 on the ground via the track 22. The roller wheels $28_1$-$28_6$ roll on the inner side 45 of the track 22 along the bottom run 66 of the track 22 to apply the bottom run 66 on the ground. In this case, as they are located between frontmost and rearmost ones of the wheels of the track assembly $16_i$, the roller wheels $28_1$-$28_6$ will be referred to as "mid-rollers".

With additional reference to FIGS. 6 to 10, each mid-roller $28_i$ comprises a hub portion 55, a rim portion 56, and a radially-extending portion 34 between the hub portion 55 and the rim portion 56. The hub portion 55 is an inner portion of the mid-roller $50_i$ which is associated with a hub 19 receiving an axle 58 for the mid-roller $28_i$. The rim portion 56 is an outer portion of the mid-roller $28_i$ which contacts the inner side 45 of the endless track 22. The radially-extending portion 34 is an intermediate portion of the mid-roller $28_i$ which extends radially between the hub portion 55 and the rim portion 56.

The mid-roller $28_i$ comprises a pair of lateral sides $30_1$, $30_2$ opposite one another and a peripheral side 32 between the lateral sides $30_1$, $30_2$. The peripheral side 32 rolls on the inner side 45 of the track 22 to apply the bottom run 66 of track 22 on the ground. More particularly, in this embodiment, the inner side 45 of the track 22 comprises a rolling path 33 on which the mid-roller $28_i$ rolls. The rolling path 33 is delimited by some of the drive/guide lugs $48_1$-$48_N$ such that, as the mid-roller $28_i$ rolls, these drive/guide lugs pass next to the mid-roller $28_i$.

The mid-roller $28_i$ may contact a drive/guide lug $48_i$ of the endless track 22 adjacent to it during motion of the track 22. More particularly, in this embodiment, the lateral side $30_2$ of the mid-roller $28_i$, which faces the drive/guide lug $48_i$, comprises a projection-contacting portion 35 that can contact the drive/guide lug $48_i$ when the mid-roller $28_i$ contacts the drive/guide lug $48_i$ as the drive/guide lug $48_i$ passes next to the mid-roller $28_i$. The projection-contacting portion 35, which will be referred to as a "lug-contacting portion", has a shape that depends on respective shapes of the mid-roller $28_i$ and the drive/guide lug $48_i$, but generally has a radial dimension C in a direction parallel to a radius R of the mid-roller $28_i$ no greater than a height H of the drive/guide lug $48_i$.

In use, the mid-rollers $28_1$-$28_6$ are subjected to friction, impacts and/or other loads that can affect their performance, the performance of the endless track 22, and/or the performance of the track assembly $16_i$ as a whole. The mid-rollers $28_1$-$28_6$ may thus be designed to improve their performance, the performance of the endless track 22, and/or the performance of the track assembly $16_i$ as a whole. This may be achieved in various ways in various embodiments, examples of which are discussed below.

A. Mid-Roller with a Covering on a Wheel Body

In some embodiments, as shown in FIGS. 11 to 14, a mid-roller $28_i$ may comprise a wheel body 60 and a covering 62 on the wheel body 60. The covering 62 may improve the performance of the mid-roller $28_i$, for example, by reducing friction between the mid-roller $28_i$ and the inner side 45 of the endless track 22, by enhancing an abrasion resistance of the mid-roller $28_i$, and/or by absorbing vibrations.

The wheel body 60 is a core of the mid-roller $28_i$ that imparts structural integrity to the mid-roller $28_i$. The wheel body 60 has a pair of lateral sides $17_1$, $17_2$ opposite one another and a peripheral side 72 between the lateral sides $17_1$, $17_2$. In this case, the lateral sides $17_1$, $17_2$ of the wheel body 60 form part of the lateral sides $30_1$, $30_2$ of the mid-roller $28_i$, while the peripheral side 72 of the wheel body 60 is covered by the covering 62. The wheel body 60 comprises a hub portion 63, a rim portion 64, and a radially-extending portion 65 between the hub portion 63 and the rim portion 64.

In this embodiment, the hub portion 63, the rim portion 64, and the radially-extending portion 65 of the wheel body 60 define an internal space 37 delimited by internal surfaces $39_1$-$39_3$ of the wheel body 60. The internal space 37 includes an internal circumferential channel 27 which is defined by a shoulder 15 of the wheel body 60.

The hub portion 63 of the wheel body 60 constitutes the hub portion 55 of the mid-roller $28_i$. The hub portion 63 of the wheel body 60 is thus associated with the hub 19. In this case, the hub 19 is removably mounted to the wheel body 60. More particularly, in this case, the hub portion 63 of the wheel body 60 comprises a plurality of openings in which are received a plurality of fasteners that interconnect the wheel body 60 to the hub 19. The hub portion 63 of the wheel body 60 may be configured in various other ways in other embodiments (e.g., the hub 19 may be integrally formed (e.g., cast) with or permanently affixed (e.g., welded) to the hub portion 63 of the wheel body 60).

The rim portion 64 of the wheel body 60 is part of the rim portion 56 of the mid-roller $28_i$. The rim portion 64 comprises the peripheral side 72 and outer parts of the lateral sides $17_1$, $17_2$ of the wheel body 60. Also, in this case, the rim portion 64 defines the internal circumferential channel 27 of the wheel body 60. The rim portion 64 may be configured in various other ways in other embodiments (e.g., the rim portion 64 may not comprise any shoulder such as the shoulder 15).

The radially-extending portion 65 of the wheel body 60 constitutes the radially-extending portion 34 of the mid-roller $28_i$. The radially-extending portion 65 interconnects the hub portion 63 and the rim portion 64. In this embodiment, the radially-extending portion 65 extends at an angle relative to the hub portion 63 and the rim portion 64 such that it has a truncated cone configuration. The radially-extending portion 65 may be configured in various other ways in other embodiments.

The wheel body 60 is made of at least one material, referred to as "wheel body material". That is, the wheel body 60 comprises one or more wheel body materials making up the wheel body 60. In some cases, the wheel body 60 may comprise a single wheel body material making up an entirety of the wheel body 60. In other cases, the wheel body 60 may comprise two or more wheel body materials that make up different parts of the wheel body 60.

In this embodiment, the wheel body 60 is a metallic wheel body. The wheel body 60 is metallic in that it is at least mainly (i.e., it is mostly or entirely) made of a metallic material. The metallic material is selected to provide strength and rigidity to the mid-roller $28_i$. For example, in this case, the metallic material comprises steel. In other cases, the metallic material may comprise another metal instead of steel. In other embodiments, the wheel body 60 may be at least mainly made of another type of material (e.g., composite material, polymeric material, or ceramic material). Also, in other embodiments, different parts of the wheel body 60 may be made of two or more wheel body materials (e.g., two types of steel).

The covering 62 contacts the inner side 45 of the endless track 22 as the mid-roller $28_i$ rolls on the inner side 45 of the track 22. In this embodiment, the covering 62 forms at least part of the peripheral side 32 and at least part of at least one of the lateral sides $30_1$, $30_2$ of the mid-roller $28_i$. More particularly, in this embodiment, the covering 62 comprises a peripheral portion 79 that forms the peripheral side 32 of the mid-roller $28_i$ and a lateral portion 80 that forms part of the lateral side $30_2$ of the mid-roller $28_i$ which faces a drive/guide lug $48_i$.

The covering 62 covers at least part of the wheel body 60 of the mid-roller $28_i$. In this embodiment, the covering 62 covers part of the rim portion 64 of the wheel body 60. More particularly, in this embodiment, the covering 62 covers the peripheral side 72 and part of the lateral side $17_2$ of the wheel body 60 that is in the rim portion 64 of the wheel body 60. Notably, the covering 62 covers at least part, in this case all, of an external surface of the shoulder 15 of the rim portion 64 of the wheel body 60.

The covering 62 is made of at least one material, referred to as "covering material". That is, the covering 62 comprises one or more covering materials making up the covering 62. In some cases, the covering 62 may comprise a single covering material making up an entirety of the covering 62. In other cases, the covering 62 may comprise two or more covering materials that make up different parts of the covering 62.

A covering material of the covering 62 is different from a wheel body material of the wheel body 60. That is, the covering material and the wheel body material may belong to different classes of materials (i.e., metals, polymers, ceramics and composites) and/or may substantially differ in terms of one or more properties, such as strength, elasticity, hardness, friction coefficient, etc. For instance, in some cases: a strength (e.g., yield strength) of the wheel body material may be different from (e.g., greater than) a strength of the covering material; a modulus of elasticity of the covering material may be different from (e.g., less than) a modulus of elasticity of the wheel body material; an abrasion resistance of the covering material may be different from (e.g., greater than) an abrasion resistance of the wheel body material; a coefficient of friction of the covering material with the track 22 may be different from (e.g., less than) a coefficient of friction of the wheel body material with the track 22; etc.

A covering material of the covering 62 can be selected to provide desired properties to the covering 62. For example, the covering 62 may be less hard (i.e., have a lower hardness) and/or be more elastic (i.e., have a lower modulus of elasticity) than the wheel body 60. As another example, in order to reduce friction and heat generation, the covering 62 have a low coefficient of friction with the track 22 and a high thermal conductivity. The coefficient of friction of the covering 62 with the track 22 may thus be lower than the coefficient of friction of the wheel body 60 with the track 22. Taking into account convective heat transfer associated with the shape of the covering 62, the thermal conductivity of the covering material may provide the covering 62 with a high thermal transmittance.

In this embodiment, the covering 62 is a polymeric covering. The covering 62 is polymeric in that it is at least mainly (i.e., it is mostly or entirely) made of a polymeric material. The polymeric material may be selected, for instance, to create a low-friction interface between the mid-roller $28_i$ and the inner side 45 of the endless track 22, to enhance an abrasion resistance of the mid-roller $28_i$, and/or to enhance a vibration absorption capacity of the mid-roller $28_i$. In some examples of implementation, the polymeric material may be elastomeric material such that the covering 62 is an elastomeric covering. In other examples of implementation, the polymeric material may be nonelastomeric material such that the covering 62 is a nonelastomeric covering. For example, in this case, the polymeric material comprises polyurethane (e.g., polyurethane elastomer). In other cases, the polymeric material may comprise another polymer instead of polyurethane (e.g., polytetrafluoroethylene (PTFE) (Teflon™), ultra-high-molecular-weight polyethylene (UHMW), thermoplastic polyolefin (TPO), etc.). In other embodiments, the covering 62 may be at least mainly made of another type of material (e.g., metallic material, ceramic material or composite material). Also, in other embodiments, different parts of the covering 62 may be made of two or more covering materials (e.g., two types of polymers).

In this example, the covering material has a coefficient of friction $\mu_C$ with the inner side 45 of the endless track 22 which can reduce friction between the mid-roller $28_i$ and the inner side 45 of the track 22. The peripheral portion 79 of the covering 62 thus reduces the rolling resistance of the mid-roller $28_i$ on the rolling path 33 of the inner side 45 of the track 22. Also, the lateral portion 80 of the covering 62 reduces friction between the mid-roller $28_i$ and a drive/guide lug $48_i$ which may be contacted by the lug-contacting portion 35 as the drive/guide lug $48_i$ passes next to the mid-roller $28_i$. This may reduce wear of the mid-roller $28_i$ and/or the drive/guide lug $48_i$. This may also reduce a tendency of the mid-roller $28_i$ to "climb" on the drive/guide lug $48_i$.

A height $H_C$ of the lateral portion 80 of the covering 62 in a radial direction of the mid-roller $28_i$ may be selected to provide an adequate shielding effect when a drive/guide lug $48_i$ passes next to the mid-roller $28_i$. This may help to provide a large low-friction area and/or a large heat transfer area. For example, in some embodiments, a ratio of the height $H_C$ of the lateral portion 80 of the covering 62 to the height H of the drive/guide lug $48_i$ may be at least 0.2, in some cases at least 0.3, in some cases at least 0.4, in some cases at least 0.5, in some cases at least 0.6, and in some cases even more (e.g., at least 0.8, 1, or more than 1). As another example, in some embodiments, a ratio of the height $H_C$ of the lateral portion 80 of the covering 62 to the radius R of the mid-roller $28_i$ may be at least 0.05, in some cases at least 0.1, in some cases 0.15, in some cases at least 0.2, in some cases at least 0.3, in some cases at least 0.4, in some cases at least 0.5, and in some cases even more. For instance, in some embodiments, the height $H_C$ of the lateral portion 80 of the covering 62 may be at least 25 mm, in some cases at least 50 mm, in some cases at least 75 mm, in some cases at least 100 mm, in some cases at least 125 mm, and in some cases even more. The height $H_C$ of the lateral portion 80 of the covering 62 may have any other suitable value in other embodiments.

A thickness $T_C$ of the covering 62 can have any desired value. For example, in some embodiments, a ratio of the thickness $T_C$ of the covering 62 to the radius R of the mid-roller $28_i$ may be no more than 0.12, in some cases no more than 0.10, in some cases no more than 0.08, in some cases no more than 0.06, in some cases no more than 0.04, in some cases no more than 0.02, and in some cases even less (e.g., 0.006). For instance, in some embodiments, the thickness $T_C$ of the covering 62 may be less than 12 mm, in some cases no more than 10 mm, in some cases no more than 8 mm, in some cases no more than 6 mm, and in some cases no more than 4 mm (e.g., 3 mm or less in some cases). Larger thickness values may not improve performance and may thus unnecessarily add material cost to the mid-roller $28_i$. This may apply to embodiments in which the covering 62 is a polyurethane covering. This may also apply in embodiments in which the covering 62 is made of another material. The thickness $T_C$ of the covering 62 may take on various other values in other embodiments.

In this embodiment, the thickness $T_C$ of the covering 62 is substantially constant over an entirety of the covering 62.

Figure 15A:
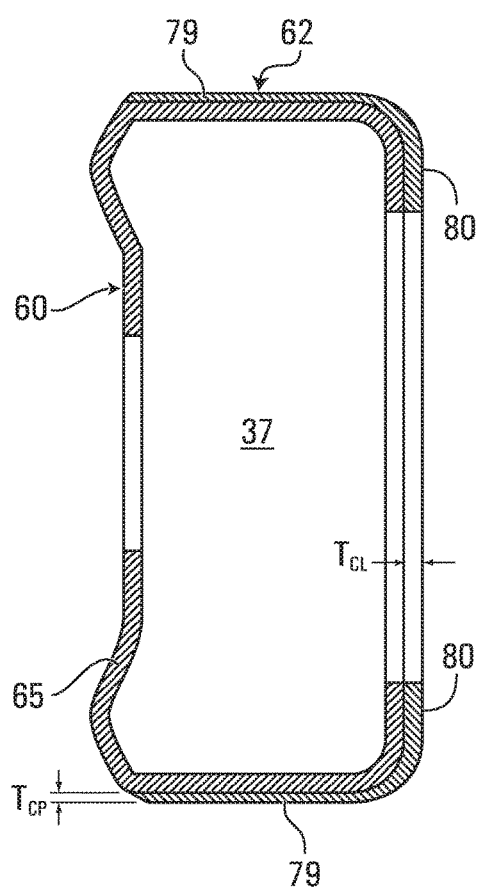
Figure 15B:
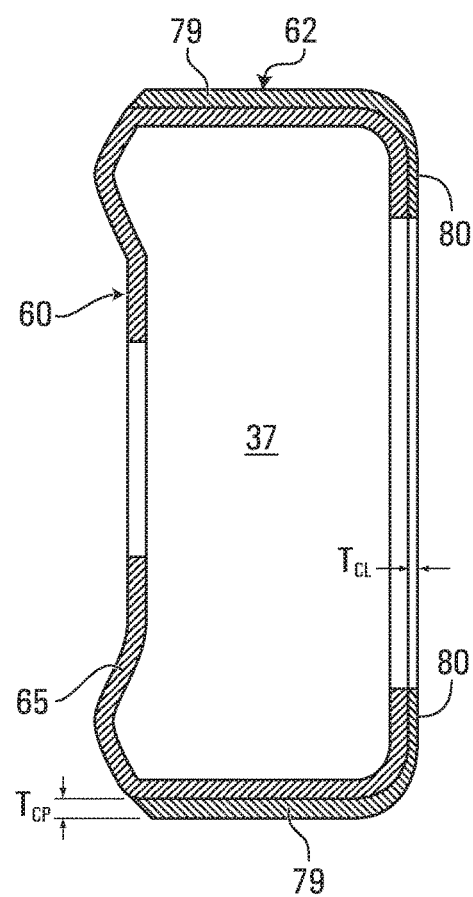

In other embodiments, as shown in FIGS. 15A and 15B, different parts of the covering 62 may have substantially different thicknesses. For example, in some embodiments, a thickness $T_{CL}$ of the lateral portion 80 of the covering 62 is substantially different from a thickness $T_{CP}$ of the peripheral portion 79 of the covering 62. As shown in FIG. 15A, in some embodiments, the thickness $T_{CL}$ of the lateral portion 80 of the covering 62 may be substantially greater than the thickness $T_{CP}$ of the peripheral portion 79 of the covering 62. This may enhance wear resistance where the mid-roller $28_i$ may contact a drive/guide lug $48_i$ of the endless track 22. For instance, in some examples of implementation, a ratio of the thickness $T_{CL}$ of the lateral portion 80 of the covering 62 to the thickness $T_{CP}$ of the peripheral portion 79 of the covering 62 may be at least 1.1, in some cases at least 1.2, in some cases at least 1.5, in some cases at least 2, in some cases at least 3, in some cases at least 4, and in some cases even more. As shown in FIG. 15B, in other embodiments, the thickness $T_{CL}$ of the lateral portion 80 of the covering 62 may be substantially less than the thickness $T_{CP}$ of the peripheral portion 79 of the covering 62. For instance, in some examples of implementation, a ratio of the thickness $T_{CL}$ of the lateral portion 80 of the covering 62 to the thickness $T_{CP}$ of the peripheral portion 79 of the covering 62 may be no more than 0.9, in some cases no more than 0.8, in some cases no more than 0.7, in some cases no more than 0.6, in some cases no more than 0.5, in some cases no more than 0.4, and in some cases no more than 0.3.

The covering 62 may be provided on the wheel body 60 in various ways. For example, in some embodiments, the covering 62 may be a molded covering that is molded onto the wheel body 60 during manufacturing of the mid-roller $28_i$. The covering 62 may be provided on the wheel body 60 in other manners in other embodiments (e.g., adhesively bonded to the wheel body 60, coated on the wheel body 60, mechanically fastened to the wheel body 60 with bolts or other fasteners, etc.).

Although it is configured in a certain way in this embodiment, the covering 62 may be configured in various other ways in other embodiments.

For example, in some embodiments, the covering 62 may include two or more different covering materials that make up different parts of the covering 62.

Figure 16A:
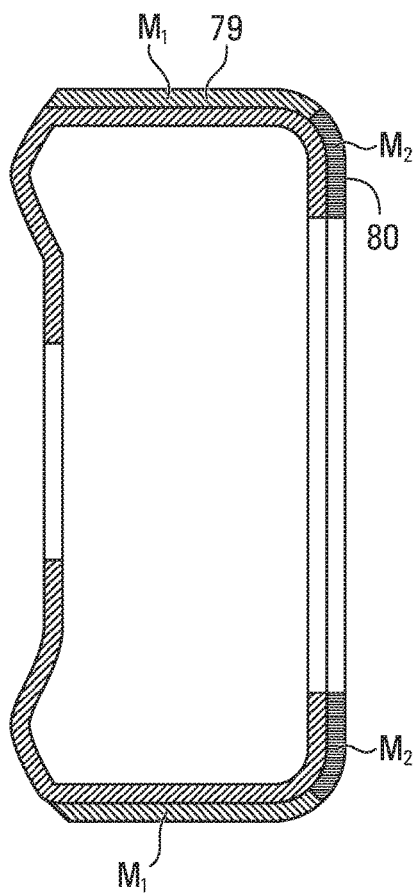
Figure 16B:
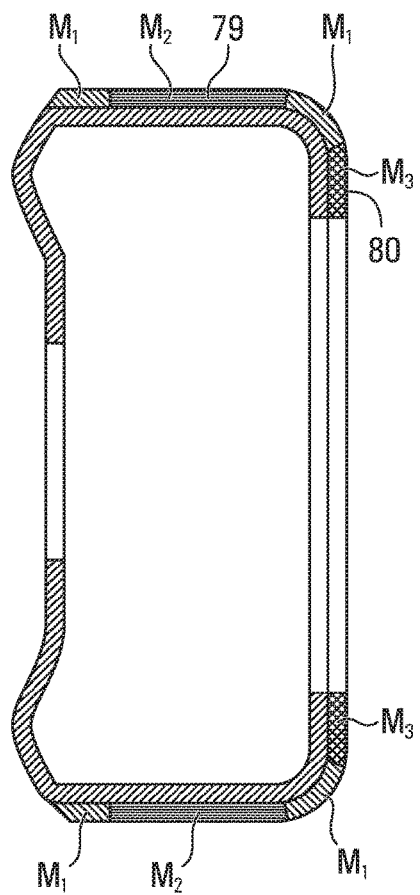

As shown in FIGS. 16A and 16B, in some embodiments, the covering 62 may include two or more different covering materials that make up different parts of the covering 62 which cover different parts of the wheel body 60. For instance, FIG. 16A shows an embodiment in which the covering 62 includes a peripheral covering material $M_1$ making up the peripheral portion 79 of the covering 62 and a lateral covering material $M_2$ making up the lateral portion 80 of the covering 62, the peripheral covering material $M_1$ being different from the lateral covering material $M_2$. In some cases, the peripheral covering material $M_1$ may include a first polymer and the lateral covering material $M_2$ may include a second polymer different from the first elastomer. As an example, the first polymer may be rubber and the second polymer may be polyurethane, or vice versa. As another example, the first polymer and the second polymer may be different types of polyurethane. FIG. 16B shows an embodiment in which the covering 62 includes a first covering material $M_I$ making up an end part of the peripheral portion 79 of the covering 62 proximate the lateral side $17_1$ of the wheel body 60 and a corner part of the covering 62, a second covering material $M_{II}$ making up a central part of the peripheral portion 79 of the covering 62, and a third covering material $M_{III}$ making up the lateral portion 80 of the covering 62, the covering materials $M_I$, $M_{II}$, $M_{III}$ being different from one another.

Figure 17:
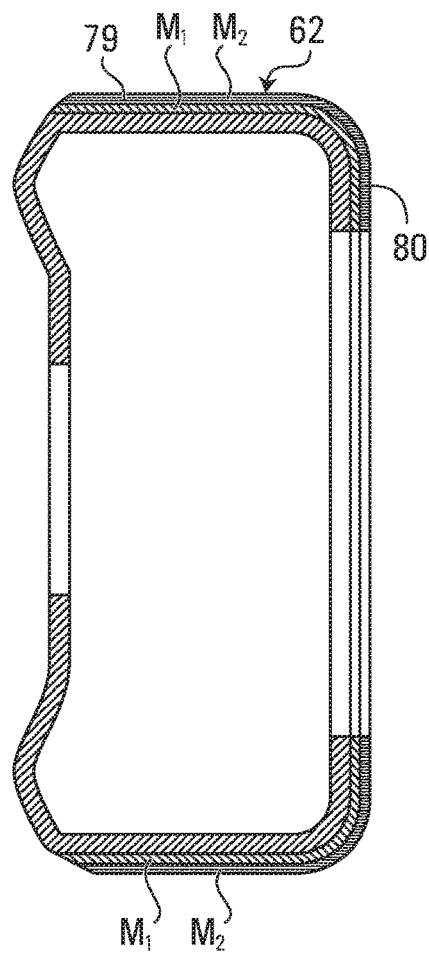

As shown in FIG. 17, in some embodiments, the covering 62 may include two or more layers of different covering materials that are stacked and cover a common part of the wheel body 60. For example, in this embodiment, the covering 62 includes a base layer of material $M_1$ and an outer layer of material $M_2$ over the base layer of material $M_1$, where the materials $M_1$, $M_2$ are different. For instance, the base layer of material $M_1$ may be more elastic than the outer layer of material $M_2$ (e.g., to reduce heat generation), and/or the outer layer of material $M_2$ may have greater abrasion resistance or chunking resistance than the base layer of material $M_1$. The base layer of material $M_1$ and the outer layer of material $M_2$ may be chemically or adhesively bonded to one another.

As another example, in some embodiments, the covering 62 may form a different part of the peripheral side 32, of the lateral side $30_1$, and/or of the lateral side $30_2$ of the mid-roller $28_i$. For instance, in some embodiments, the covering 62 may form less than all of the peripheral side 32 of the mid-roller $28_i$; may form a smaller or larger part of one or both of the lateral sides $30_1$, $30_2$ of the mid-roller $28_i$; or may form an entirety of the peripheral side 32 and the lateral sides $30_1$, $30_2$ of the mid-roller $28_i$.

Figure 18:
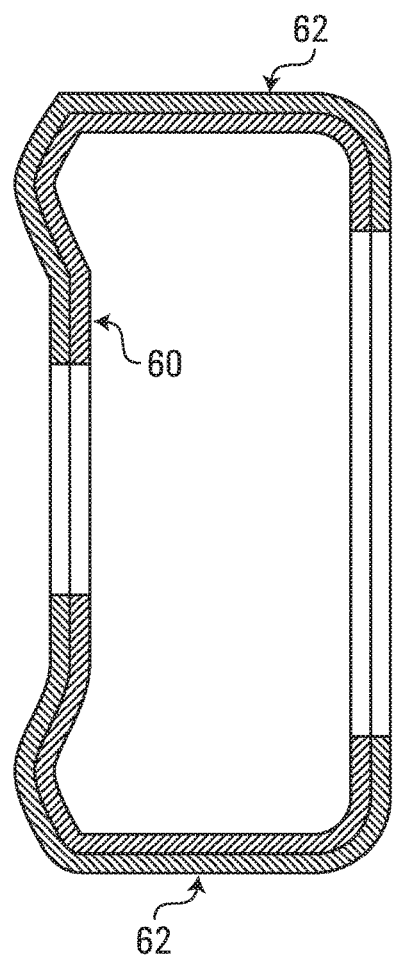
Figure 24:
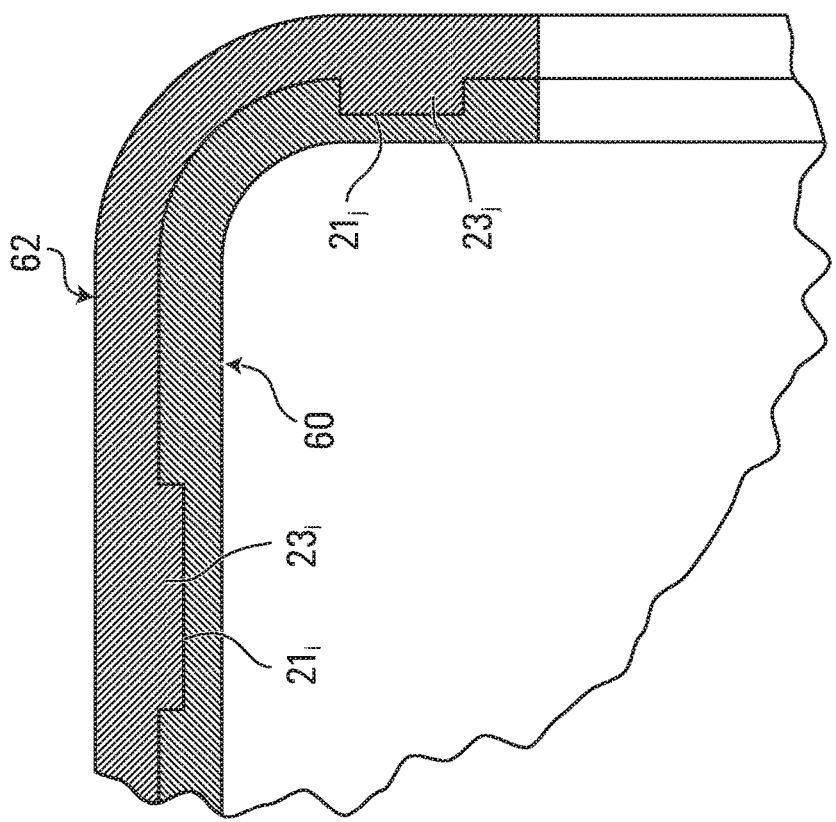
Figure 23:
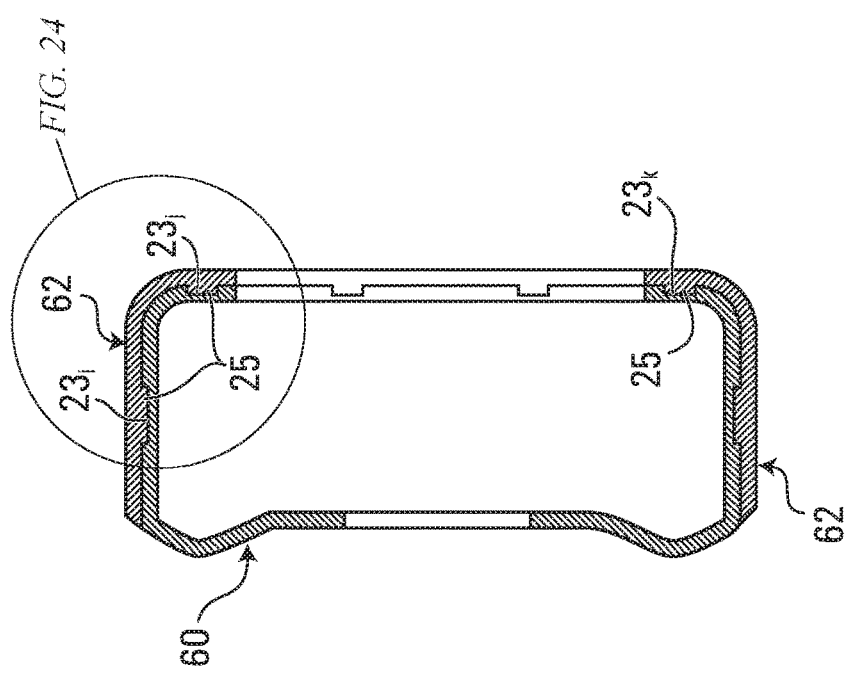
Figure 25:
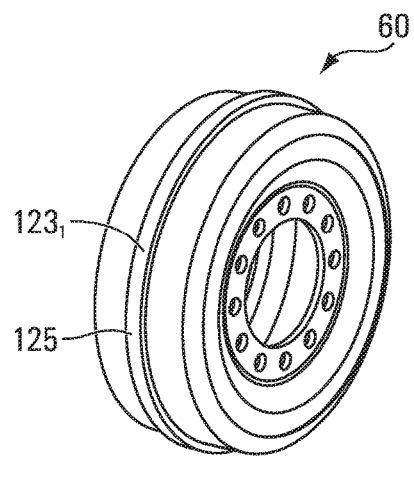
Figure 26:
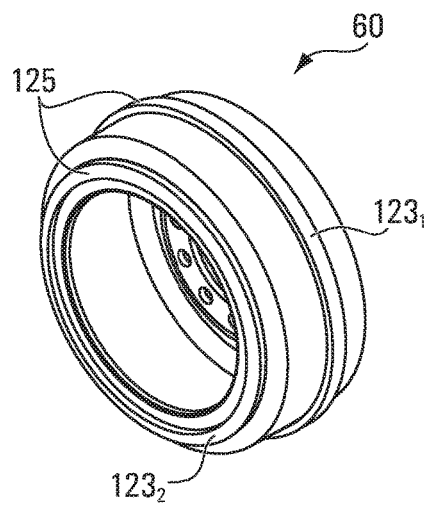
Figure 27:
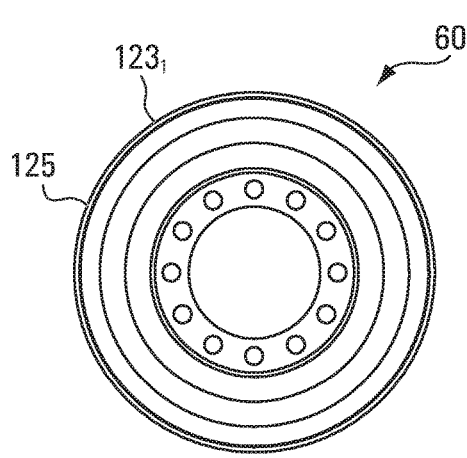
Figure 28:
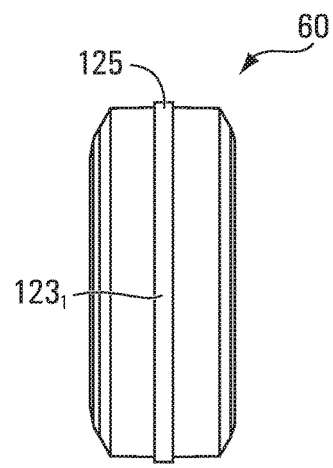
Figure 30:
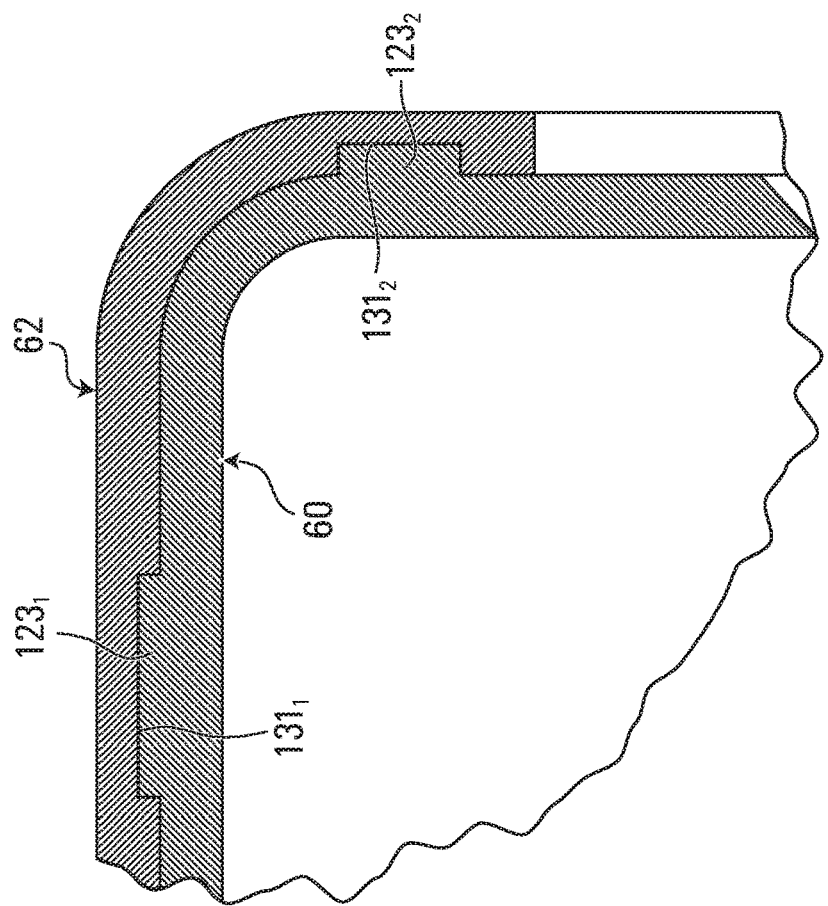
Figure 29:
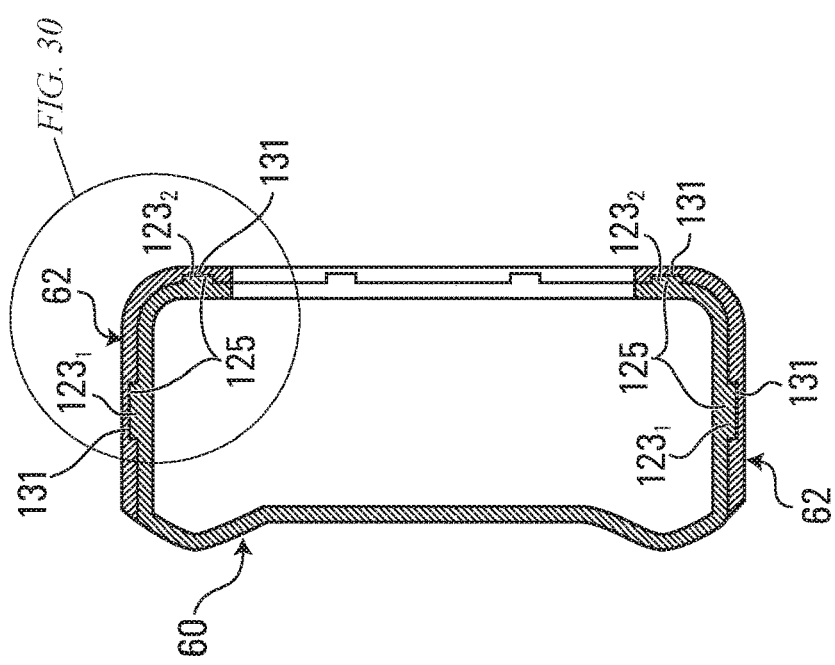
Figure 31:
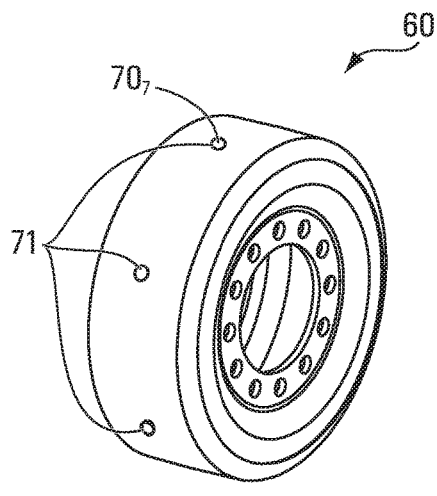
Figure 32:
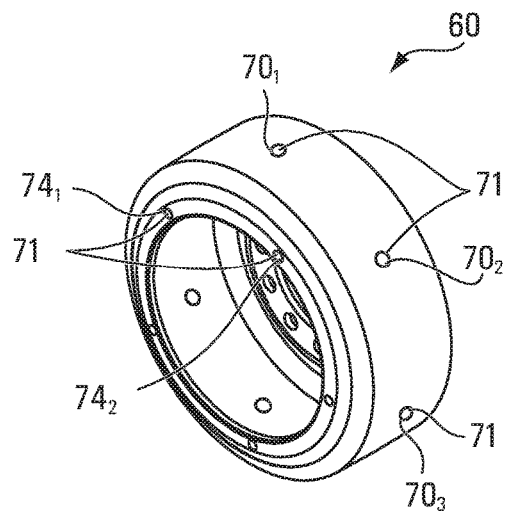
Figure 33:
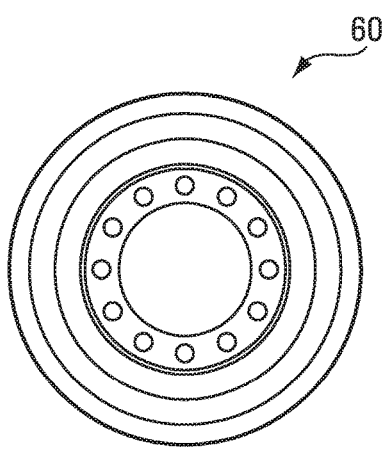
Figure 34:
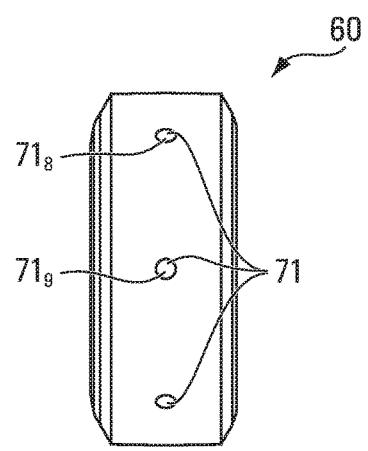
Figure 35:
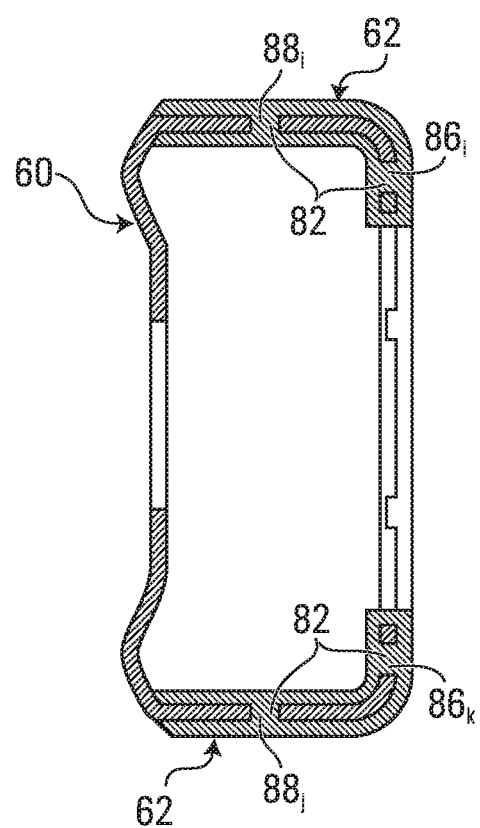

Similarly, in some embodiments, the covering 62 may cover more or less of the wheel body 60 of the mid-roller $28_i$. For instance, in some embodiments, the covering 62 may cover at least part of the radially-extending portion 65 and/or at least part of the hub portion 63 of the wheel body 60 (e.g., in some cases, the covering 62 may cover an entirety of the wheel body 60). FIG. 18 shows an example of an embodiment in which the covering 62 covers a majority (i.e., more than 50%) of an external surface of the wheel body 60. In this case, the covering 62 covers an entirety of the external surface of the wheel body 60.

The covering 62 is affixed to the wheel body 60. The covering 62 and the wheel body 60 of the mid-roller $28_i$ may be interconnected in various ways.

For example, in some embodiments, the covering 62 and the wheel body 60 may be bonded to one another. For instance, in some cases, the covering 62 and the wheel body 60 may be adhesively bonded to one another by an adhesive provided between the covering 62 and the wheel body 60. Various types of adhesives may be used in various embodiments (e.g., Chemlock™ adhesives or other suitable commercially-available elastomer-to-substrate adhesives). Alternatively or additionally, in some cases, the covering 62 and the wheel body 60 may be chemically bonded to one another. That is, a chemical bond may be formed between the covering 62 and the wheel body 60 during manufacturing of the mid-roller $28_i$. For instance, in some embodiments, a brass plating may be applied on the wheel body 60 and the covering 62 may include a rubber having sulfur which reacts with the brass plating during curing to form an adhesion interphase between the covering 62 and the wheel body 60. This may be used to complement an adhesive bond between the covering 62 and the wheel body 60.

As another example, in some embodiments, the covering 62 and the wheel body 60 may be mechanically interlocked. That is, the covering 62 and the wheel body 60 may be in a mechanical interlock relationship in which they are interconnected via a given one of the wheel body 60 and the covering 62 extending into the other one of the wheel body 60 and the covering 62. More specifically, a first one of the wheel body 60 and the covering 62 comprises an interlocking space into which extends an interlocking portion of a second one of the wheel body 60 and the covering 62. The interlocking space may comprise one or more holes, one or more recesses, and/or one or more other hollow areas. This mechanical interlock relationship restrains movement of the covering 62 relative to the wheel body 60.

In some cases, the mechanical interlock relationship restrains all degrees of freedom of movement of the covering 62 relative to the wheel body 60. In other cases, the mechanical interlock relationship restrains at least one but not all degrees of freedom of movement of the covering 62 relative to the wheel body 60.

For instance, FIGS. 19 to 24 show an embodiment in which the wheel body 60 comprises an interlocking space 31 and the covering 62 comprises an interlocking portion 25 which extends into the interlocking space 31. In this embodiment, the interlocking space 31 comprises a plurality of recesses $21_1$-$21_S$ distributed on the peripheral side 72 and the lateral side $17_2$ of the wheel body 60, while the interlocking portion 25 comprises a plurality of projections $23_1$-$23_S$ that extend into respective ones of the recesses $21_1$-$21_3$. This type of mechanical interconnection can enhance retention of the covering 62 on the wheel body 60, for instance, by providing an increased surface area of these components, and may be used with these components being adhesively or chemically bonded to one another.

The interlocking space 31 of the wheel body 60 and the interlocking portion 25 of the covering 62 may be configured in various other ways in other embodiments. For example, in other embodiments, the recesses $21_1$-$21_S$ and the projections $23_1$-$23_S$ may have various other shapes, the interlocking space 31 may comprise any other number of recesses (e.g., a single recess or two or more recesses) such as the recesses $21_1$-$21_3$ and the interlocking portion 25 may similarly comprise any other number of projections such as the projections $23_1$-$23_3$, etc.

FIGS. 25 to 30 show another embodiment in which the covering 62 comprises an interlocking space 131 and the wheel body 60 comprises an interlocking portion 125 which extends into the interlocking space 131. In this embodiment, the interlocking space 131 comprises a plurality of recesses $121_1$, $121_2$, while the interlocking portion 125 comprises a plurality of projections $123_1$, $123_2$ that extend into respective ones of the recesses $121_1$, $121_2$. Here again, various other configurations of the interlocking space 131 and the interlocking portion 125 may be used in other embodiments (e.g., the recesses $121_1$, $121_2$ and the projections $123_2$, $123_2$ may have various other shapes, the interlocking space 131 may comprise any other number of recesses such as the recesses $121_1$, $121_2$ and the interlocking portion 125 may similarly comprise any other number of projections such as the projections $123_1$, $123_2$, etc).

FIGS. 31 to 35 show another embodiment in which the wheel body 60 comprises an interlocking space 71 and the covering 62 comprises an interlocking portion 82 that extends into the interlocking space 71. In this embodiment, the interlocking space 71 comprises a plurality of holes $70_1$-$70_R$ distributed circumferentially along the peripheral side 32 of the wheel body 60, and a plurality of holes $74_1$-$74_P$ distributed circumferentially along the lateral side $17_2$ of the wheel body 60. The interlocking portion 82 of the covering 62 occupies the holes $70_1$-$70_R$, $74_1$-$74_P$ of the interlocking space 71 of the wheel body 60. More specifically, in this case, the interlocking portion 82 of the covering 62 comprises a plurality of hole-occupying portions $88_1$-$88_R$ which occupy the holes $70_1$-$70_R$ of the wheel body 60 and a plurality of hole-occupying portions $86_1$-$86_P$ which occupy the holes $74_1$-$74_P$ of the wheel body 60

The mechanical interlock relationship is created during manufacturing of the mid-roller $28_i$. For example, in the embodiments considered above, the mechanical interlock relationship is created during molding of the mid-roller $28_i$. More particularly, in these embodiments, the covering 62 is overmolded on the wheel body 60. During overmolding of the covering 62, the covering material flows into the interlocking space 71 of the wheel body 60 where it is captured so as to create the mechanical interlock relationship. In particular, in the embodiment shown in FIGS. 31 to 35, the covering material flows through the holes $70_1$-$70_R$, $74_1$-$74_P$ of the wheel body 60.

In some embodiments, such as those shown in FIGS. 19 to 30, the mechanical interlock relationship can enhance retention of the covering 62 on the wheel body 60 by providing an increased surface area of these components, and may be used with these components being adhesively or chemically bonded to one another.

In other embodiments, such as that shown in FIGS. 31 to 35, the mechanical interlock relationship may be such that the covering 62 and the wheel body 60 are interconnected without requiring a chemical bond nor an adhesive between the covering 62 and the wheel body 60. Indeed, in some cases, there is no chemical bond and no adhesive bond between the covering 62 and the wheel body 60.

Such interconnection of the covering 62 and the wheel body 60 without requiring an adhesive nor a chemical bond between the covering 62 and the wheel body 60 allows more freedom in selecting the covering material and the wheel body material. For example, in some embodiments, the covering material and the wheel body material may be incompatible such that they cannot be chemically or adhesively bonded. Of course, in some embodiments, the covering material and the wheel body material may be compatible such that they can be chemically and/or adhesively bonded to one another. In fact, in some embodiments, there may be an adhesive and/or a chemical bond between the covering 62 and the wheel body 60 in addition to the mechanical interlock relationship.

Although in embodiments discussed above the covering 62 is a molded covering, the covering 62 may be provided on the wheel body 60 during manufacturing of the mid-roller $28_i$ in various other ways in other embodiments. For example, in some embodiments, the covering 62 may be a coated covering that is coated onto the wheel body 60. As another example, in some embodiments, the covering 62 may comprise a molded covering material and a coated covering material under or over the molded covering material. For instance, in some embodiments, the covering 62 may comprise a molded rubber layer and a coated layer of polymeric material over the molded rubber layer to better preserve the rubber layer's properties and/or increase the covering's abrasion resistance.

B. Mid-Roller with a Particular Shape/Geometry

A mid-roller $28_i$ may have a structural shape that enhances its performance, the performance of the endless track 22, and/or the performance of the track assembly $16_i$ as a whole.

For example, in some embodiments, the lug-contacting portion 35 of the lateral side $30_2$ of the mid-roller $28_i$, which can contact a drive/guide lug $48_i$ of the endless track 22 adjacent to it during motion of the track 22, may have a particular shape.

Figure 36A:
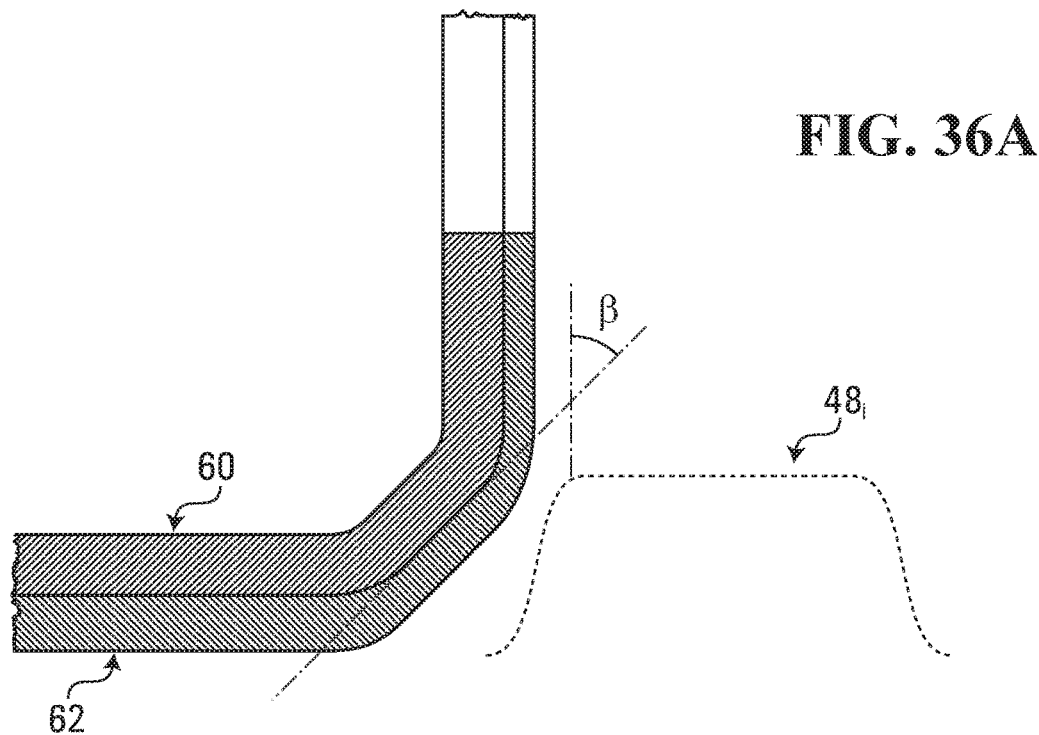
FIGS. 36A and 36B show close-up views of a certain portion of an example of a wheel in accordance with an embodiment of the invention.

For instance, in some embodiments, as shown in FIG. 36A, the lug-contacting portion 35 of the lateral side $30_2$ of the mid-roller $28_i$ may define an oblique angle (i.e., an angle that is not a right angle or a multiple of a right angle) $\beta$ relative to a vertical axis. This angle $\beta$ may take on various values in various embodiments. For example, in some embodiments, the angle $\beta$ may be between 5° and 20°.

Figure 36B:
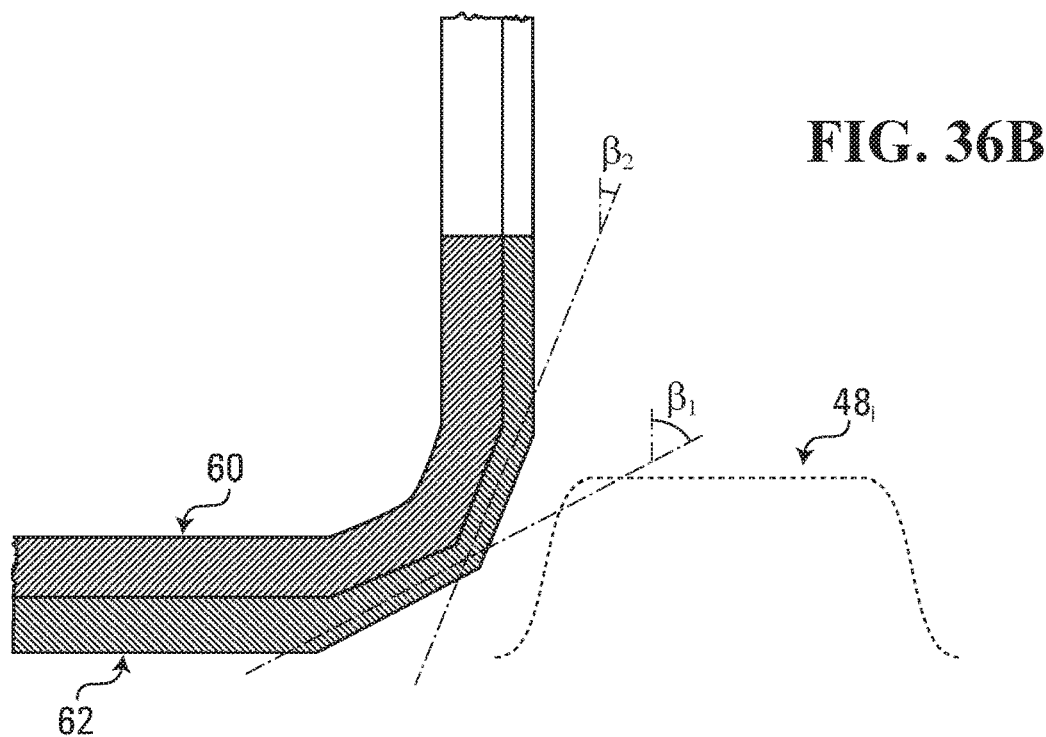
Figure 37:
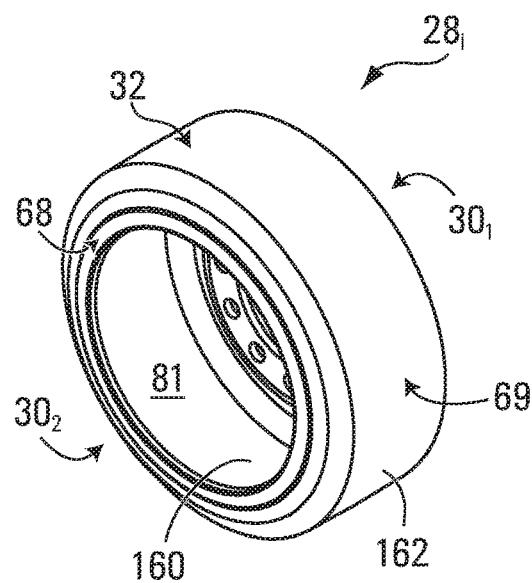
Figure 38:
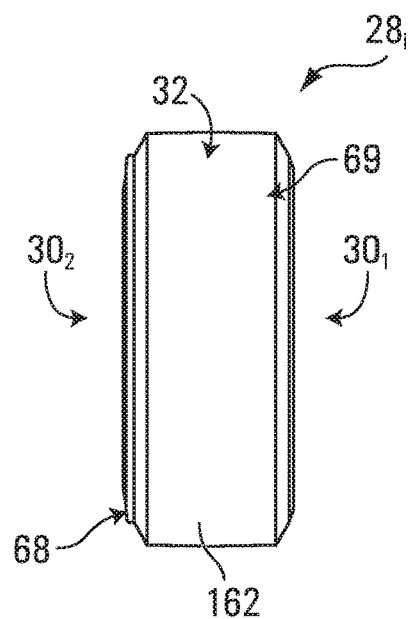
Figure 41:
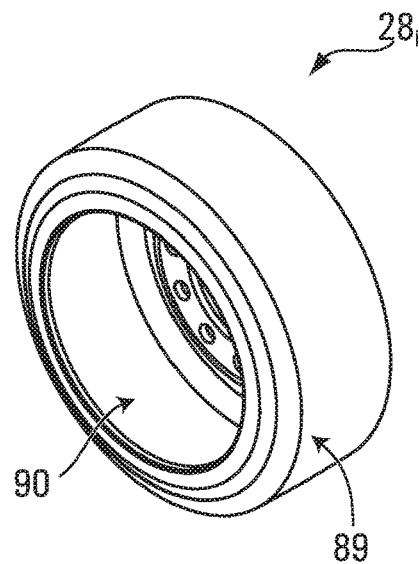
Figure 42:
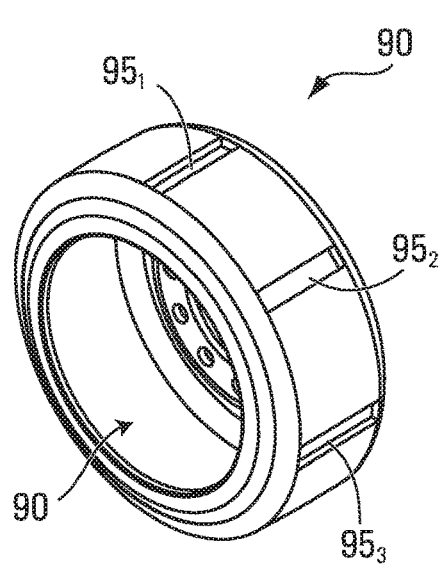
Figure 43:
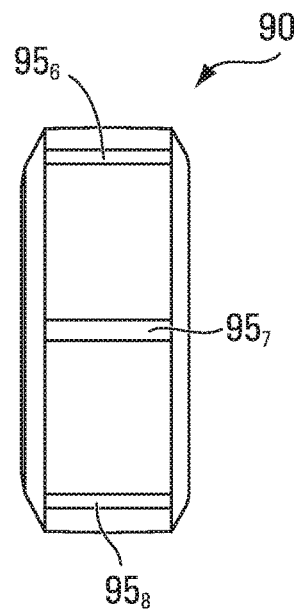
Figure 44:
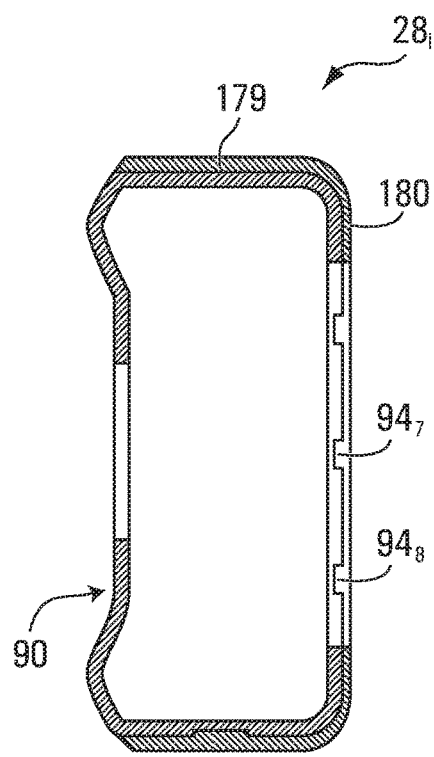
Figure 45:
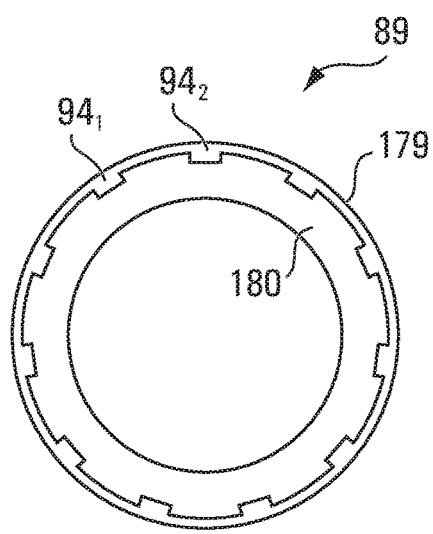

In other embodiments, as shown in FIG. 36B, the lug-contacting portion 35 of the lateral side $30_2$ of the mid-roller $28_i$ may define two (2) or more oblique angles $\beta_1$-$\beta_M$ relative to a vertical axis. The angles $\beta_1$-$\beta_M$ may take on various values in various embodiments. For instance, in some embodiments, the angles $\beta_1$-$\beta_M$ may progressively decrease towards the drive/guide lug $48_i$ such that the angle $\beta_i$ closest to the drive/guide lug $48_i$ is between 5° and 20°.

As another example, in some embodiments, one or more of the mid-rollers $28_1$-$28_6$ and/or the endless track 22 may be configured to facilitate alignment of the endless track 22.

Figure 61:
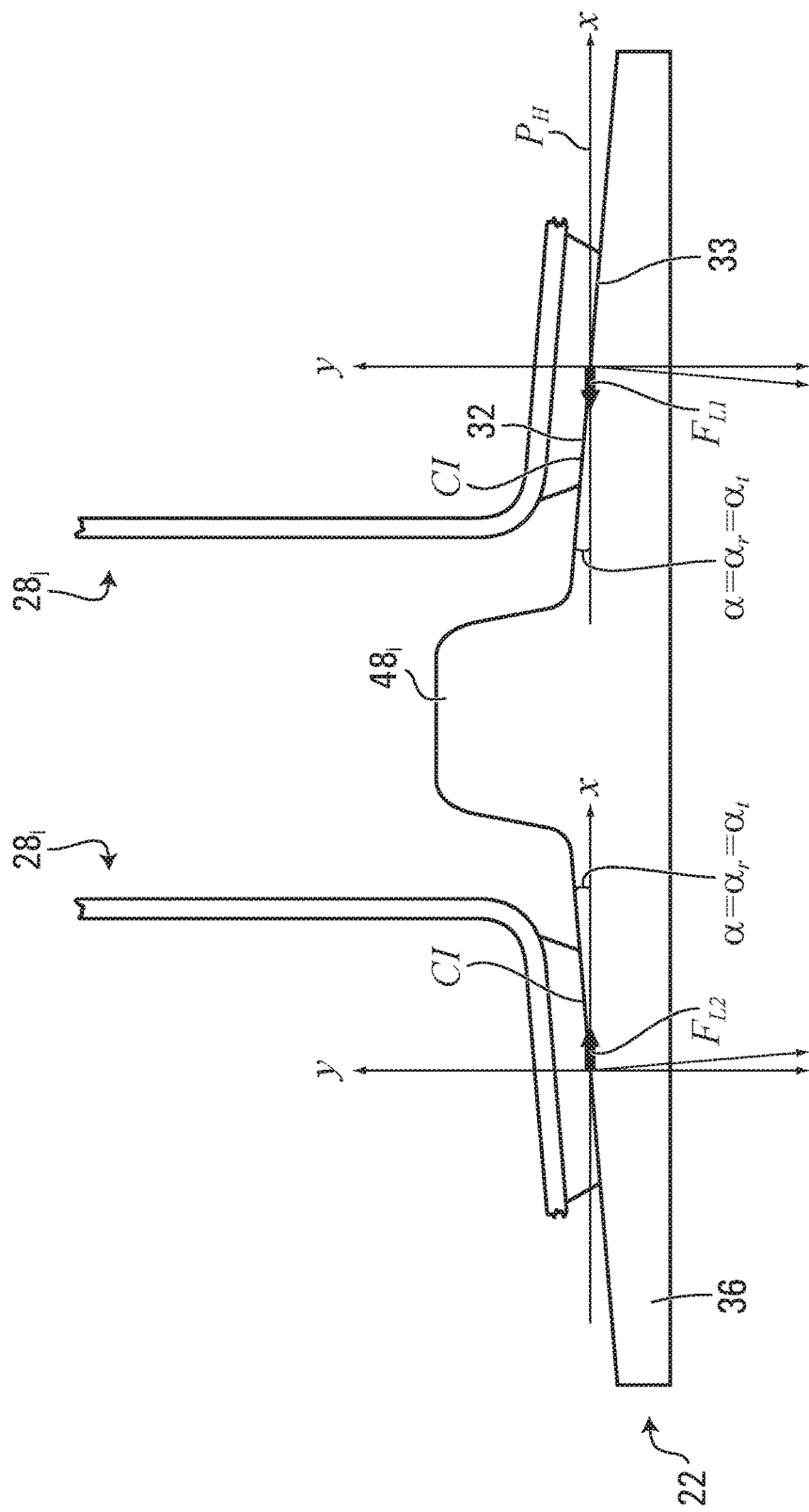
FIG. 61 shows an example of a self-alignment system for an endless track of the track assembly in accordance with an embodiment of the invention.

For instance, FIG. 61 shows an embodiment in which the mid-rollers $28_1$-$28_6$ and the endless track 22 implement a self-alignment system to facilitate alignment of the endless track 22. In this embodiment, the mid-rollers $28_1$-$28_6$ and the endless track 22 are configured such that the mid-rollers $28_1$-$28_6$ exert lateral force components $F_{L1}$, $F_{L2}$ on the endless track 22 which tend to align the endless track 22 within the track assembly $16_i$. The lateral force components $F_{L1}$, $F_{L2}$ act in the widthwise direction of the endless track 22 and are oriented opposite one another to maintain the track 22 centered within the track assembly $16_i$.

The lateral force components $F_{L1}$, $F_{L2}$ can be generated in various ways. For example, in this embodiment, each of the mid-rollers $28_1$-$28_6$ tapers in a direction generally parallel to its axis of rotation, and the carcass 36 of the endless track 22 tapers in the widthwise direction of the endless track 22. These tapered shapes of the mid-rollers $28_1$-$28_6$ and the endless track 22 results in generation of the lateral force components $F_{L1}$, $F_{L2}$.

More particularly, in this embodiment, a rolling contact interface CI between the peripheral side 32 of each mid-roller $28_i$ and the rolling path 33 of the inner side 45 of the endless track 22 defines an oblique angle $\alpha$ relative to a horizontal plane $P_H$. More specifically, in this example, the peripheral side 32 of the mid-rollers $28_i$ defines an oblique angle $\alpha_r$ relative to the horizontal plane $P_H$ and the rolling path 33 of the inner side 45 of the endless track 22 also defines an oblique angle $\alpha_t$ with the horizontal plane $P_H$. In this case, the angle $\alpha_t$ corresponds to the angle $\alpha_r$ such that the angle $\alpha$ of the rolling contact interface CI corresponds to the angles $\alpha_t$, $\alpha_r$ (i.e., $\alpha_t = \alpha_r = \alpha$). In other cases, the angle $\alpha_t$ defined by the rolling path 33 of the endless track 22 may be different from the angle $\alpha_r$ defined by the mid-roller $28_i$. For example, in some embodiments, a ratio of the angle $\alpha_r$ to the angle $\alpha_t$ may be between 0.8 and 1.2, in some cases between 0.9 and 1.1, and in some cases between 0.95 and 1.05. In cases where the angles $\alpha_t$, $\alpha_r$ are different, the angle $\alpha$ of the rolling contact interface CI corresponds to an average of the angles $\alpha_t$, $\alpha_r$.

The angle $\alpha$ may take on various values in various embodiments. For example, in some embodiments, the angle $\alpha$ may be at least 0.5°, in some cases at least 1°, in some cases at least 1.5°, in some cases at least 2°, in some cases at least 3°, in some cases at least 5°, in some cases at least 7.5°, in some cases at least 10°, in some cases at least 12.5°, in some cases at least 15°, and in some cases even more (e.g., 20°).

Magnitudes of the lateral force components $F_{L1}$, $F_{L2}$ depend on various factors. For instance, in this example, the magnitudes of the lateral force components $F_{L2}$ depend on a load borne by the mid-rollers $28_1$-$28_6$, the tension in the endless track 22, and the angle $\alpha$. For example, for simplicity and purposes of illustration only, without wishing to be bound by this theory, in this case, the magnitude of each of lateral force components $F_{L1}$, $F_{L2}$ may be evaluated as $F_{L1} = (mg/4 + T)\sin(\alpha)$ and $F_{L2} = (mg/4 + T)\sin(\alpha)$, where m is the mass of the agricultural vehicle 10, g is the gravitational acceleration (e.g., 9.80665 m/s$^2$) and T is the tension in the track 22. The weight mg is divided by four (4) since the track assembly $16_i$ supports half of the weight of the agricultural vehicle 10 and half of the mid-rollers $28_1$-$28_6$ contribute to exerting the lateral force component $F_{L1}$. The magnitudes of the lateral force components $F_{L1}$, $F_{L2}$ may be measured in various other ways in other cases.

The lateral force components $F_{L1}$, $F_{L2}$ thus act to maintain the endless track 22 aligned. This helps to limit friction between the drive/guide lugs $48_1$-$48_N$ and the mid-rollers $28_1$-$28_6$ and, therefore, can help to reduce wear of these lugs and mid-rollers. In addition, this may help to clean the inner side 45 of the endless track 22 since the angle $\alpha$ would facilitate side evacuation of debris. Again, this may help to reduce wear of the endless track 22 and the mid-rollers $28_1$-$28_6$. The lateral force components $F_{L1}$, $F_{L2}$ may be generated in various other ways in other embodiments.

C. Mid-Roller with One or More Removable Track-Contacting Members

In some embodiments, a mid-roller $28_i$ may comprise one or more removable track-contacting members. A removable track-contacting member forms at least part of at least one of the peripheral side 32, the lateral side $30_1$ and the lateral side $30_2$ of the mid-roller $28_i$ and is positioned to contact the endless track 22 in use. The removable track-contacting member is removably mounted to a remainder of the mid-roller $28_i$. In this way, the removable track-contacting member can be removed from the mid-roller $28_i$, for instance, when it is worn, damaged or otherwise no longer to be used, and possibly replaced with another track-contacting portion. In that sense, the removable track-contacting member may be a replaceable track-contacting member in some cases.

For example, FIGS. 37 to 40 show a mid-roller $28_i$ comprising a removable track-contacting member 68. In this embodiment, the removable track-contacting member 68 forms the lateral side $30_2$ of the mid-roller $28_i$ and is positioned to come into contact with a drive/guide lug $48_i$ of the endless track 22 in use.

More particularly, in this embodiment, the removable track-contacting member 68 is a removable track-contacting interface mounted to a wheel core 69 of the mid-roller $28_i$ such that it is interposed between the wheel core 69 and a drive/guide lug $48_i$ of the endless track 22 in use. In this case, the removable track-contacting interface 68 has an annular configuration. The removable track-contacting interface 68 may have various other shapes in other cases.

The removable track-contacting interface 68 is detachably fastened to the wheel core 69 of the mid-roller $28_i$. That is, the removable track-contacting interface 68 is designed to enable it to be fastened to and unfastened from the wheel core 69 without damaging the mid-roller $28_i$. To that end, the removable track-contacting interface 68 is fastened to the wheel core 69 via at least one mechanical fastener.

More particularly, in this embodiment, the removable track-contacting interface 68 is mounted to the wheel core 69 via a plurality of mechanical fasteners $75_1$-$75_F$. A mechanical fastener $75_i$ may comprise any device or group of devices capable of being used to fasten the removable track-contacting interface 68 to the wheel core 69. For example, a mechanical fastener $75_i$ may comprise a threaded fastener (e.g., a bolt or stud with a nut, a screw, etc.), a clip, or any other hardware capable of being used to fasten the removable track-contacting interface 68 to the wheel core 69. In this case, the fasteners $75_1$-$75_F$ are threaded fasteners (e.g., bolts, screws or other threaded fasteners). The wheel core 69 comprises a plurality of holes to receive the fasteners $75_1$-$75_F$. Similarly, the removable track-contacting interface 68 comprises a plurality of holes to receive the fasteners $75_1$-$75_F$.

In this example, the fasteners $75_1$-$75_F$ are not exposed on a lug-facing side 76 of the removable track-contacting interface 68. Rather, the fasteners $75_1$-$75_F$ are inserted through a core-facing side 78 of the removable track-contacting interface 68 via an internal space 81 defined by the wheel core 69. The holes of the removable track-contacting interface 68 which receive the fasteners $75_1$-$75_F$ are threaded holes into which the fasteners $75_1$-$75_F$ can be screwed. This seamless nature of the lug-facing side 76 can reduce friction and other forces on a drive/guide lug $48_i$ and the mid-roller $28_i$ when the mid-roller $28_i$ contacts the drive/guide lug $48_i$. In other examples, the fasteners $75_1$-$75_F$ may be exposed on the lug-facing side 76 of the removable track-contacting interface 68 (e.g., the holes of the removable track-contacting interface 68 which receive the fasteners $75_1$-$75_F$ may be countersink holes or counterbore holes that extend inwardly from the lug-facing side 76 of the removable track-contacting interface 68 such that heads of the fasteners $75_1$-$75_F$ do not extend beyond the lug-facing side 76).

In this embodiment, the wheel core 69 comprises a wheel body 160 and a covering 162 on a peripheral side 172 of the wheel body 160. In some embodiments, the wheel body 160 and the covering 162 may be configured in a manner similar to that described in section A above in respect of the wheel body 60 and the covering 62.

Also, in this embodiment, the removable track-contacting interface 68 comprises a base 85 and a covering 87 on the base 85 for contacting a drive/guide lug $48_i$.

The base 85 is made of at least one material, referred to as "base material". That is, the base 85 comprises one or more base materials making up the base 85. In this embodiment, the base 85 is made of a single material making up an entirety of the base 85. In this case, the base 85 is a metallic base. The base 85 is metallic in that it is at least mainly (i.e., it is mostly or entirely) made of a metallic material. For instance, in this example, the metallic material includes steel. In other cases, the metallic material may include another metal instead of steel. In other embodiments, the base 85 may be at least mainly made of another type of material (e.g., composite material, polymeric material, or ceramic material). Also, in other embodiments, the base 85 may include two or more base materials that make up different parts of the base 85.

The covering 87 is made of at least one material, referred to as "covering material". That is, the covering 87 comprises one or more covering materials making up the covering 87. In this embodiment, the covering 87 is made of a single material making up an entirety of the covering 87. In other embodiments, the covering 87 may include two or more covering materials that make up different parts of the covering 87. A covering material of the covering 87 is different from a base material of the base 85. The covering material of the covering 87 may be selected, distributed or otherwise configured in a manner similar to that discussed above in section A in respect of the covering material of the covering 62. For example, in some embodiments, the covering 87 may be a polymeric covering. The covering 87 is polymeric in that it is at least mainly (i.e., mostly or entirely) made of a polymeric material.

The covering 87 and the base 85 of the removable track-contacting interface 68 may be interconnected in various ways. For example, in some embodiments, the covering 87 and the base 85 may be chemically bonded or adhesively bonded to one another and/or may be mechanically interlocked via a given one of the base 85 and the covering 87 extending into the other one of the base 85 and the covering 87, in a manner similar to that discussed above in section A in respect of the covering 62 and the wheel body 60. In other embodiments, the base 85 may be encapsulated in the covering 87.

The removable track-contacting interface 68 may be configured in various other ways in other embodiments. For example, in some embodiments, the removable track-contacting interface 68 may not comprise a base and a covering, but may rather be a monolithic one-piece interface made of a single material (e.g., polyurethane or other polymeric material). As another example, in some embodiments, the removable track-contacting interface 68 may, in addition to forming the lateral side $30_2$ of the mid-roller $28_i$, also form the peripheral side 32 of the mid-roller $28_i$ such that the removable track-contacting interface 68 rolls on the rolling path 33 of the inner side 45 of the endless track 22. As yet another example, in some embodiments, the removable track-contacting interface 68 may be segmented such that it comprises a plurality of segments independently removable from the wheel core 69.

FIGS. 41 to 45 show another embodiment in which a mid-roller $28_i$ comprises a removable track-contacting interface 89 removably mounted to a wheel core 90. In this embodiment, the removable track-contacting interface 89 forms the peripheral side 32 and the lateral side $30_2$ of the mid-roller $28_i$ and is thus positioned to roll on the rolling path 33 of the inner side 45 of the endless track 22 and come into contact with a drive/guide lug $48_i$ of the endless track 22.

In this example, the removable track-contacting interface 89 is configured as a jacket or sleeve that is slidably mounted on the wheel core 90. More particularly, in this example, the removable track-contacting interface 89 comprises a plurality of projections $94_1$-$94_R$ that are slid into a plurality of recesses $95_1$-$95_R$ of the wheel core 90. In some cases, friction between the projections $94_1$-$94_R$ and the recesses $95_1$-$95_R$ may be sufficient to retain the removable track-contacting interface 89 on the wheel core 90 (e.g., the removable track-contacting interface 89 may be press fit onto the wheel core 90). In such cases, the removable track-contacting interface 89 may thus be secured to the wheel core 90 without requiring any fastener. In other cases, one or more fasteners (e.g., bolts, screws or other threaded fasteners) may also be used to secure the removable track-contacting interface 89 to the wheel core 90.

The removable track-contacting interface 89 may be made of material selected, distributed or otherwise configured in a manner similar to that discussed above in section A in respect of the covering material of the covering 62.

The removable track-contacting interface 89 may be configured in various other ways in other embodiments. For example, in some embodiments, the removable track-contacting interface 89 may comprise a base and a covering on the base, such as that described above in respect of the base 85 and the covering 87 of the removable track-contacting interface 68. As another example, in some embodiments, the removable track-contacting interface 89 may not have the projections $94_1$-$94_R$ and the wheel core 90 may not have the recesses $95_1$-$95_R$, and the removable track-contacting interface 68 may be press fit over the wheel core 90.

Figure 46:
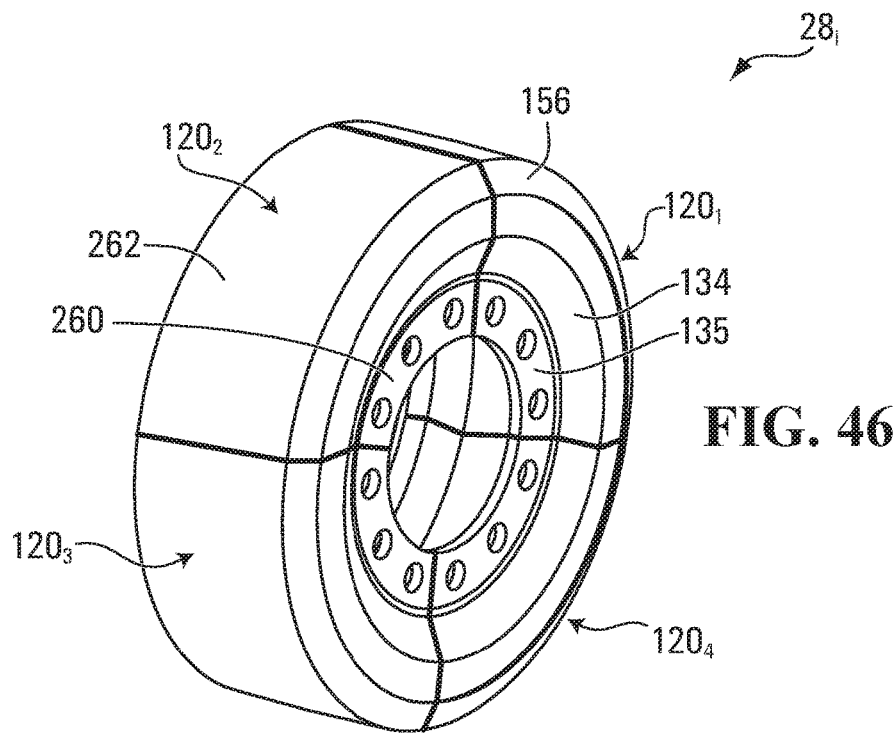
Figure 47:
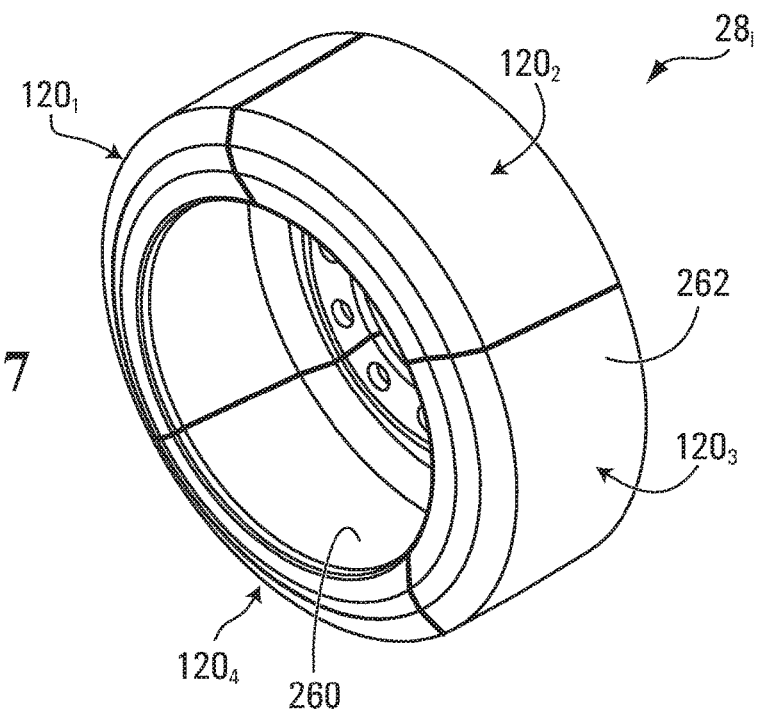

FIGS. 46 and 47 show an embodiment in which a mid-roller $28_i$ is a segmented mid-roller that comprises a plurality of wheel segments $120_1$-$120_4$. Each of the wheel segments $120_1$-$120_4$ is separate and independent from other ones of the wheel segments $120_1$-$120_4$ and forms a portion of the peripheral side 32 of the mid-roller $28_i$, a portion of the lateral side $30_1$ of the mid-roller $28_i$, and a portion of the lateral side $30_2$ of the mid-roller $28_i$. The wheel segments $120_1$-$120_4$ are removable track-contacting members of the mid-roller $28_i$.

Each wheel segment $120_1$ comprises a hub portion 155, a rim portion 156, and a radially-extending portion 134 between the hub portion 155 and the rim portion 156. The hub portion 155 is associated with the hub 19 of the mid-roller $28_i$. In this example, the hub portion 155 is secured to the hub 19 via a plurality of fasteners. To that end, the hub portion 155 comprises a plurality of holes to receive these fasteners.

In this embodiment, the wheel segment $120_1$ comprises a wheel body 260 and a covering 262 on a peripheral side 272 of the wheel body 260. In some cases, the wheel body 260 and the covering 262 may be configured in a manner similar to that described in section A above in respect of the wheel body 60 and the covering 62.

The wheel segments $120_1$-$120_4$ may be configured in various other ways in other embodiments. For example, in some embodiments, in addition to or instead of being connected to the hub 19 of the mid-roller $28_i$, two or more of the wheel segments $120_1$-$120_4$ may be directly connected to one another (e.g., via a bracket extending between them and secured to them by fasteners). As another example, although in this embodiment the wheel segments $120_1$-$120_4$ are substantially identical, in other embodiments, different ones of the wheel segments $120_1$-$120_4$ may differ in terms of shape, size, etc. As yet another example, although in this embodiment there are four wheel segments, the mid-roller $28_i$ may comprise any number of wheel segments (e.g., a single wheel segment, or two, three or more than four wheel segments) such as the wheel segments $120_1$-$120_4$ in other embodiments.

D. Mid-Roller with Movable Lug-Contacting Surface

Figure 62:
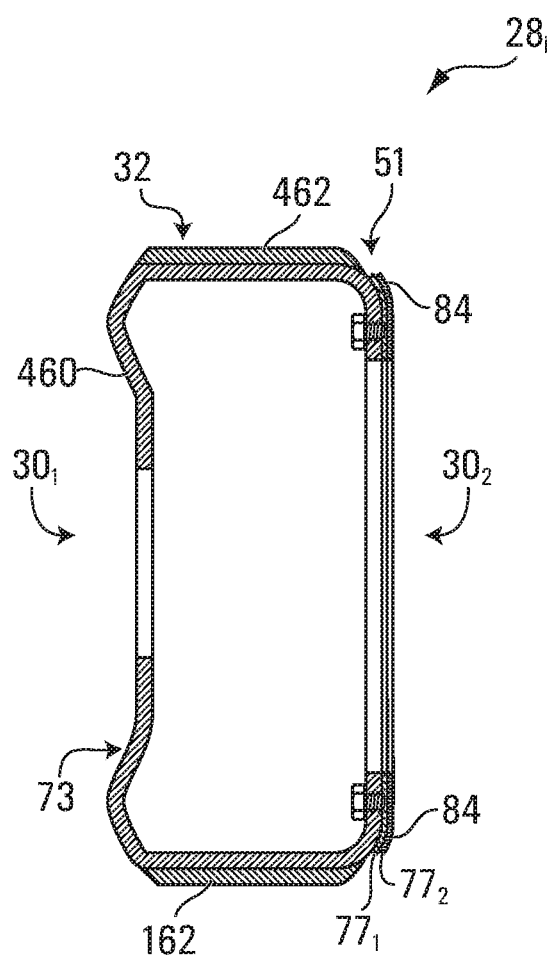
FIG. 62 shows an example of a wheel of the track assembly comprising a movable lug-contacting surface in accordance with an embodiment of the invention.

In some embodiments, as shown in FIG. 62, a mid-roller $28_i$ may comprise a movable lug-contacting surface 84 which is configured to move relative to the peripheral side 32 of the mid-roller $28_i$ when the mid-roller $28_i$ contacts a drive/guide lug $48_i$ in order to reduce a speed difference between the lug-contacting portion 84 and the drive/guide lug $48_i$.

More specifically, when the mid-roller $28_i$ turns about its axle and rolls on the inner side 45 of the endless track 22, the movable lug-contacting surface 84 reduces a difference in velocity between respective points of the drive/guide lug $48_i$ and the mid-roller $28_i$ which face one another. Indeed, since the entire drive/guide lug $48_i$ moves at approximately the same velocity and since the mid-roller $28_i$ has a tangential velocity which varies across its radius, without the movable lug-contacting surface 84, the tangential velocity of the mid-roller $28_i$ would match the velocity of the drive/guide lug $48_i$ only at the peripheral side 32 of the mid-roller $28_i$ which rolls on the rolling path 33 of the track 22. With its ability to move, when it contacts drive/guide lug $48_i$, the movable lug-contacting surface 84 can move at a speed closer to that of the drive/guide lug $48_i$ and, therefore, reduce the velocity difference and friction between the drive/guide lug $48_i$ and the mid-roller $28_i$.

The movable lug-contacting surface 84 may be implemented in various ways in various embodiments. For example, in this embodiment, the mid-roller $28_i$ comprises a wheel core 73 and a removable track-contacting interface 51 which is removably mounted to the wheel core 73 and which includes the movable lug-contacting surface 84. More particularly, in this embodiment, the removable track-contacting interface 51 comprises a fixed part $77_1$ that is fastened to the wheel core 73 and a movable part $77_2$ which is movable relative to the fixed part $77_1$. The movable part $77_2$ includes the movable lug-contacting surface 84. In this example, the movable part $77_2$ can move relative to the fixed part $77_1$ by virtue of a plurality of bearings mounted between the movable part $77_2$ and the fixed part $77_1$.

In this embodiment, the wheel core 73 comprises a wheel body 460 and a covering 462 on a peripheral side 472 of the wheel body 460. In some embodiments, the wheel body 460 and the covering 462 may be configured in a manner similar to that described in section A above in respect of the wheel body 60 and the covering 62. Also, in this embodiment, the movable part $77_2$ of the removable track-contacting interface 51, including the movable lug-contacting surface 84, may be made of material selected, distributed or otherwise configured in a manner similar to that discussed above in section A in respect of the covering material of the covering 62.

E. Mid-Roller with Enhanced Heat Management

As a mid-roller $28_i$ rolls on the inner side 45 of the endless track 22 and/or contacts some of the drive/guide lugs $48_1$-$48_N$, heat is generated. Excessive heat generation and/or inadequate heat dissipation may lead to heat build-up that may detrimentally affect the performance of the mid-roller $28_i$ and/or the endless track 22. For example, in embodiments in which the mid-roller $28_i$ comprises a covering chemically or adhesively bonded on a wheel body such as the covering 62 on the wheel body 60 discussed previously in section A, generated heat may negatively affect the chemical or adhesive bond between the covering and the wheel body. As another example, generated heat may be transferred via the hub 19 and/or axle 58 to other components, such as bearings, lubricants, etc.

Therefore, in some embodiments, a mid-roller $28_i$ may be configured to have reduced heat generation and/or improved heat dissipation.

For example, in some embodiments, less heat may be generated by reducing friction between the mid-roller $28_i$ and the endless track 22 (e.g., the drive/guide lugs $48_1$-$48_N$). This can be achieved, for instance, by providing the mid-roller $28_i$ with a low-friction material that has a low friction of coefficient with the endless track 22. An example of this is the covering 62 on the wheel body 60 discussed previously in section A, where the covering 62 includes polyurethane or other low-friction material.

As another example, in some embodiments, the track assembly $16_i$ may comprise a cooling system to transfer heat away from the mid-rollers $28_1$-$28_6$.

Figure 48:
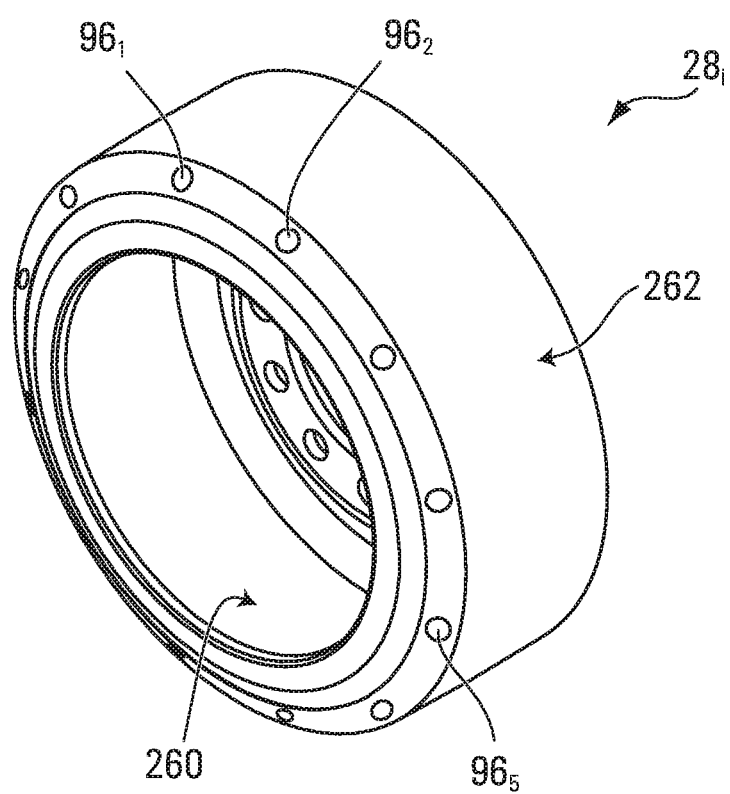
FIGS. 48 to 55 show different examples of wheels of the track assembly in accordance with various embodiments of the invention, each wheel comprising a cooling arrangement.
Figure 49:
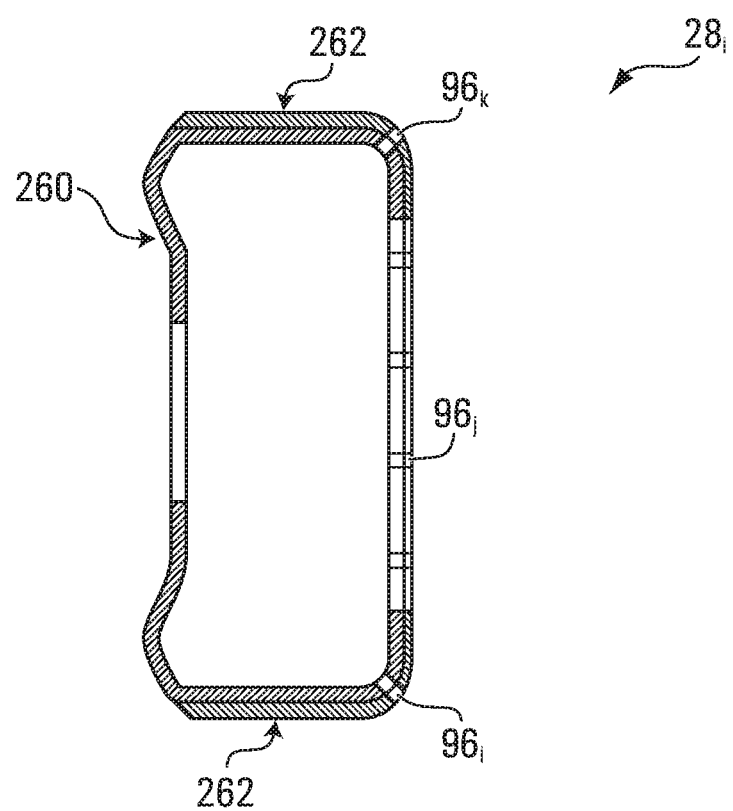

For instance, in some embodiments, as shown in FIGS. 48 and 49, the cooling system may comprise a cooling arrangement of a mid-roller $28_i$ to dissipate heat by convection. The cooling arrangement of the mid-roller $28_i$ may constitute a heat sink to dissipate heat into air by convection. More particularly, in this embodiment, the cooling arrangement of the mid-roller $28_i$ comprises a plurality of cooling passages $96_1$-$96_P$ that are distributed circumferentially on the mid-roller $28_i$ and allow air to pass therein. In this case, the cooling passages $96_1$-$96_P$ are through holes that extend through the rim portion 56 of the mid-roller $28_i$. The cooling passages $96_1$-$96_P$ may be positioned such that they cannot be obstructed by the endless track 22 during use. The cooling passages $96_1$-$96_P$ may be formed in various ways during manufacturing of the mid-roller $28_i$ (e.g., by molding them and/or by drilling or otherwise machining them).

In this embodiment, the mid-roller $28_i$ comprises a wheel body 260 and a covering 262 on a peripheral side 272 and a lateral side $217_2$ of the wheel body 160 which may be configured in a manner similar to that described in section A above in respect of the wheel body 60 and the covering 62. The cooling passages $96_1$-$96_P$ extend through the wheel body 260 and the covering 262.

Figure 50:
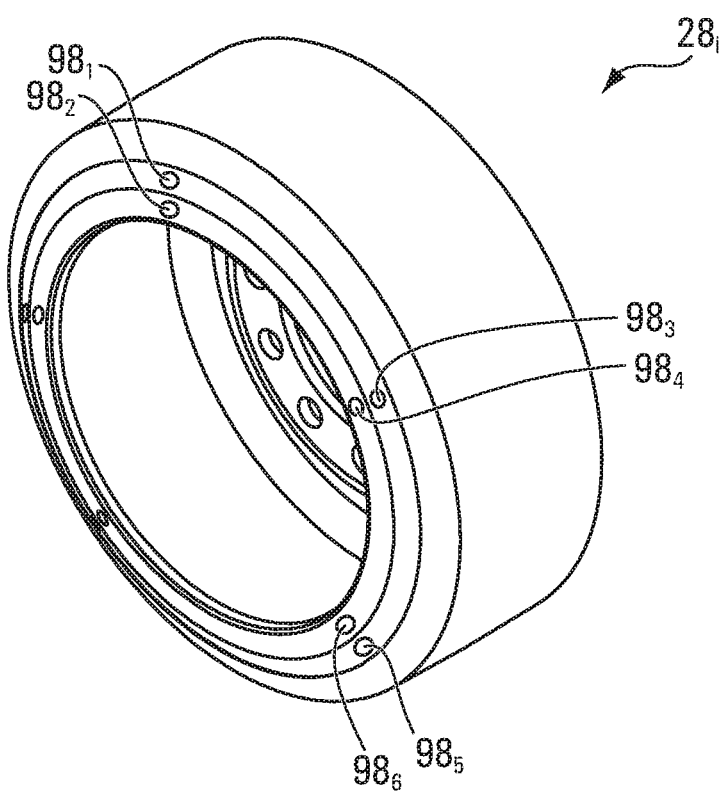
Figure 51:
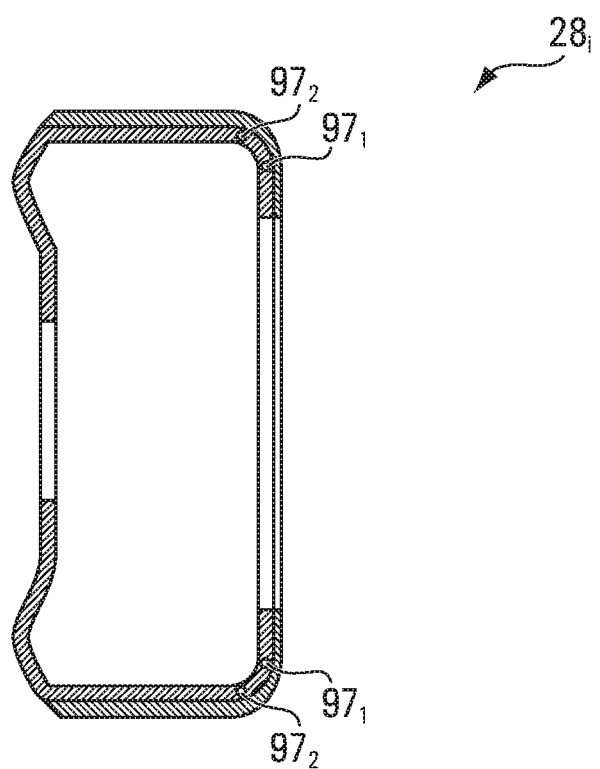

The cooling passages $96_1$-$96_P$ may be configured in various ways in other embodiments. For example, in some embodiments, the cooling passages $96_1$-$96_P$ may have different shapes (e.g., elongated shapes such as slots) and/or may be located elsewhere on the mid-roller $28_i$ (e.g., in the radially-extending portion 34 and/or the hub portion 55). For instance, in some embodiments, the cooling passages $96_1$-$96_P$ may extend through portions of the wheel body 260 which are not covered by the covering 262. As another example, in some embodiments, the cooling passages $96_1$-$96_P$ may be passages other than through holes. For instance, FIGS. 50 and 51 show an embodiment in which the mid-roller $28_i$ comprises a plurality of cooling passages $97_1$, $97_2$ which are internal cooling channels that extend circumferentially along the mid-roller $28_i$ and that open to the atmosphere at openings $98_1$-$98_R$. As yet another example, any number of cooling passages (e.g., a single passage or two or more passages) may be provided in the mid-roller $28_i$ in other embodiments.

Figure 52:
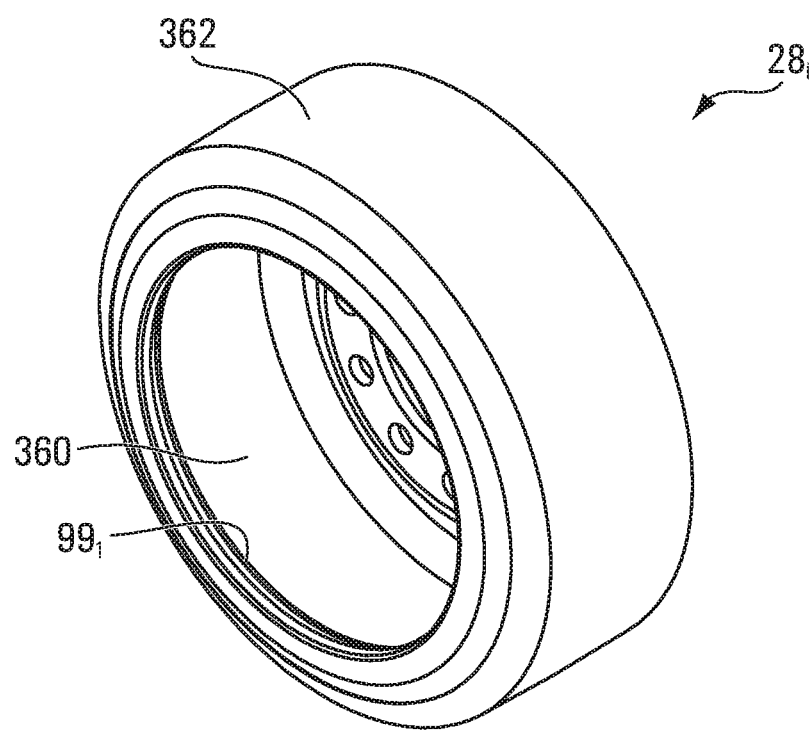
Figure 53:
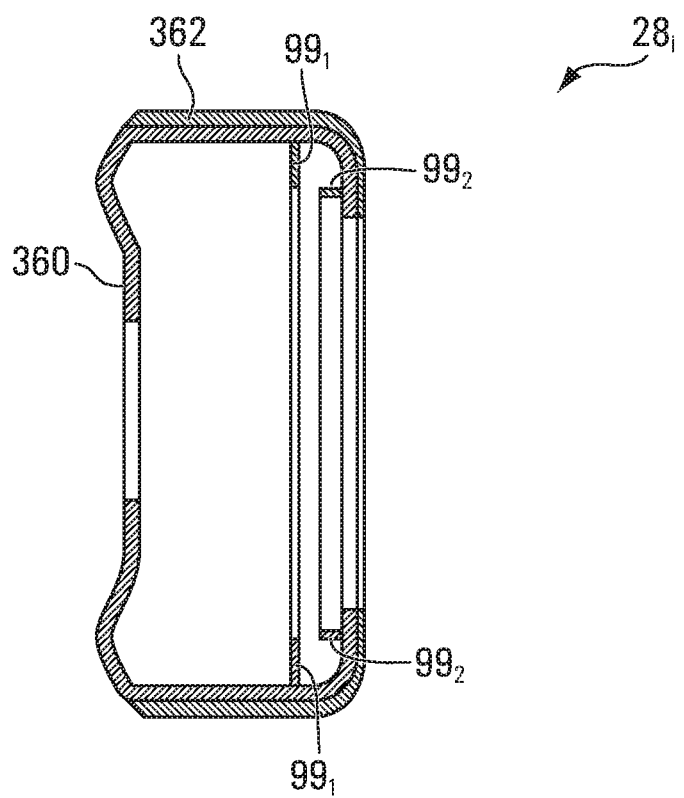

FIGS. 52 and 53 show an embodiment in which the cooling arrangement of the mid-roller $28_i$ comprises a plurality of cooling projections $99_1$, $99_2$ that extend on the mid-roller $28_i$ and allow air to pass therearound. In this case, the cooling projections $99_1$, $99_2$ are fins that extend from the rim portion 56 of the mid-roller $28_i$. The cooling projections $99_1$, $99_2$ may be made of various materials and provided in various ways during manufacturing of the mid-roller $28_i$ (e.g., by molding them, by machining them or by welding them). In this example, the cooling projections $99_1$, $99_2$ are made of the same metallic material as and cast as part of a wheel body 360 (e.g., steel) of the mid-roller $28_i$.

Figure 54:
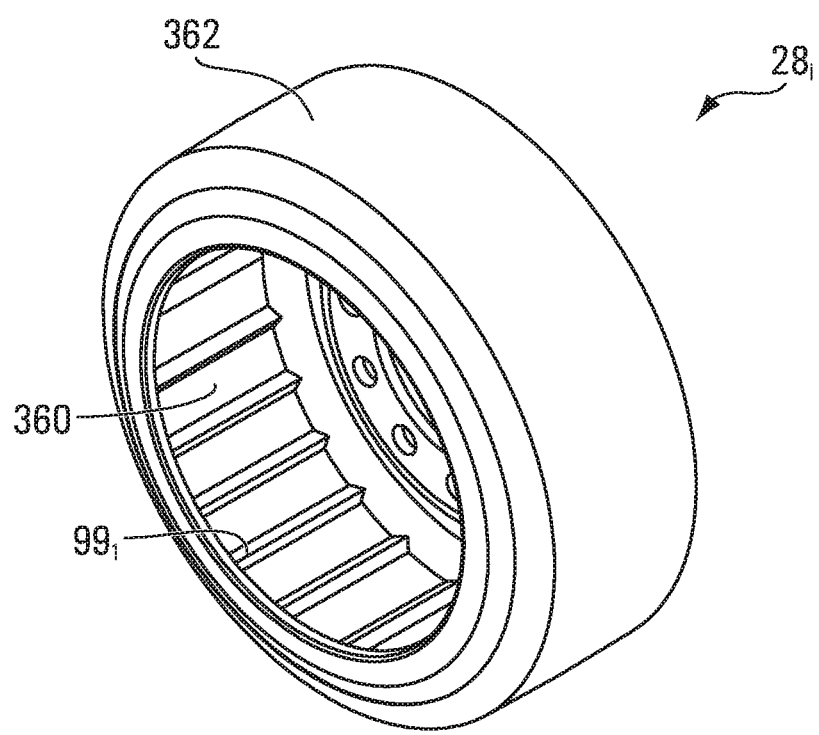
Figure 55:
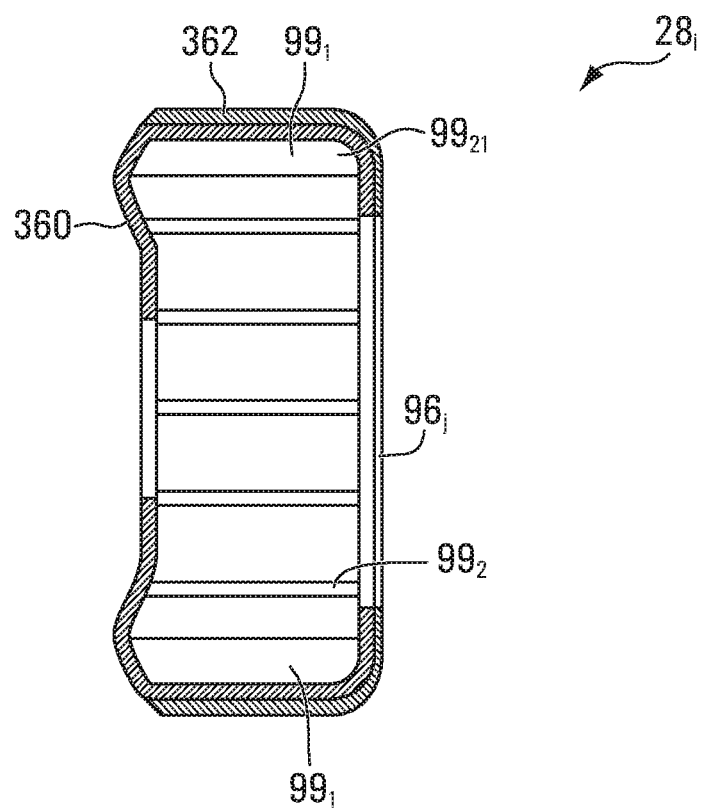

The cooling projections $99_1$, $99_2$ may be configured in various ways in other embodiments. For example, in some embodiments, the cooling projections $99_1$-$99_M$ may have different shapes and/or may be located elsewhere on the mid-roller $28_i$ (e.g., in the radially-extending portion 34 and/or the hub portion 55). For instance, FIGS. 54 and 55 show an embodiment in which the cooling projections $99_1$-$99_M$ are elongated in a direction generally parallel to the axis of rotation of the mid-roller $28_i$. As another example, any number of cooling projections (e.g., a single projection or two or more projections) may be provided in the mid-roller $28_i$ in other embodiments.

In embodiments discussed above, the cooling arrangement of the mid-roller $28_i$ relies exclusively on natural convection for convective heat dissipation. The cooling system can thus be viewed as a natural convection cooling system.

Figure 56:
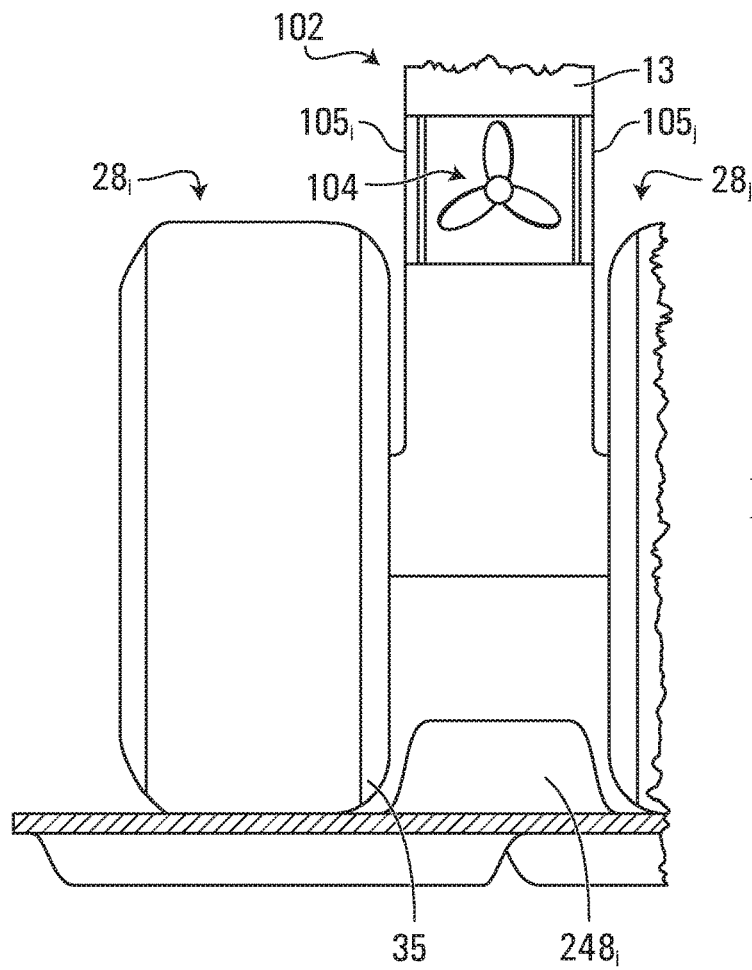
FIGS. 56 to 59 show different examples of a forced convection cooling system of the track assembly in accordance with various embodiments of the invention.

In some embodiments, as shown in FIG. 56, the cooling system of the track assembly $16_i$ may be a forced convection cooling system 102 for cooling the mid-rollers $28_1$-$28_6$. In this embodiment, the forced convection cooling system 102 comprises a fan 104 for inducing airflow past at least one of the mid-rollers $28_1$-$28_6$. More particularly, in this embodiment, the fan 104 is an axial-flow fan and is mounted to a frame 13 which supports the mid-rollers $28_1$-$28_6$ to induce airflow past all of the mid-rollers $28_1$-$28_6$. For instance, the fan 204 may be located, along the longitudinal direction of the track assembly $16_i$, in front or behind the mid-rollers $28_1$-$28_6$. Openings $105_1$-$105_O$ are provided on lateral sides of the frame 13 in order to allow the airflow induced by the fan 104 to reach the mid-rollers $28_1$-$28_6$.

Figure 57:
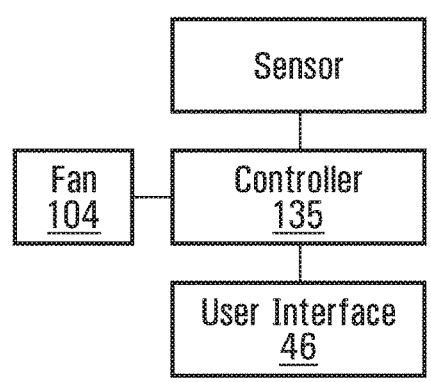

As shown in FIG. 57, in this embodiment, the agricultural vehicle 10 comprises a controller 135 for controlling operation of one or more aspects of the vehicle 10, including the forced convection cooling system 102. More particularly, in this embodiment, the controller 135 is an electronic controller that comprises suitable hardware and/or software (e.g., firmware) configured to implement its functionality. The controller 135 comprises an interface, a processing portion, and a memory portion.

The interface of the controller 135 allows the controller 135 to receive inputs from and release outputs to other components of the vehicle 10 to which the controller 135 is connected (i.e., directly or indirectly connected to), including, in this embodiment, the user interface 46 and various sensors (e.g., a throttle position sensor, a prime mover speed sensor (i.e., a sensor sensing a speed of the prime mover 14), a ground speed sensor (i.e., a sensor sensing a speed of the vehicle 10 on the ground), a temperature sensor to sense temperature of a vehicle component, an ambient temperature sensor, etc.).

The processing portion of the controller 135 comprises one or more processors for performing processing operations that implement functionality of the controller 135. A processor may be a general-purpose processor executing program code stored in the memory portion of the controller 135. Alternatively, a processor of may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion of the controller 135 comprises one or more memories for storing program code executed by the processing portion of the controller 135 and/or data used during operation of the processing portion of the controller 135. A memory may be a semiconductor memory (e.g., read-only memory (ROM) and/or random-access memory (RAM)), a magnetic storage medium, an optical storage medium, and/or any other suitable type of memory.

In this embodiment, the controller 135 controls operation of the forced convection cooling system 102.

For example, in some cases, the controller 135 may selectively activate the fan 104 in response to a command provided by the operator of the agricultural vehicle 10 via the user interface 46.

In other cases, the controller 135 may selectively activate the fan 104 in response to a particular operating condition of the agricultural vehicle 10. This particular operating condition may be defined in terms of one or more of: an outside temperature, a temperature of the mid-roller $28_i$, a temperature of another component of the agricultural vehicle 10; a ground speed of the agricultural vehicle 10; a rotational speed of the mid-roller $28_i$, a speed of the prime mover 14 of the agricultural vehicle 10, etc. In such cases, the controller 135 determines whether the particular operating condition exists based on outputs of one or more sensors and, if so, activates the fan 104. For instance, in some embodiments, the mid-roller $28_i$ may comprise a temperature sensor mounted on a surface of the mid-roller $28_i$ and linked to the controller 135 via a wireless link or a wired link (e.g., passing through the hub 19 with a suitable rotary coupler). When it detects that the temperature of the mid-roller $28_i$ sensed by the temperature sensor reaches a certain threshold, the controller 135 causes the fan 104 to be activated.

The forced convection cooling system 102 may be configured in various other ways in other embodiments.

For example, in some embodiments, the forced convection cooling system 102 may not be connected to a controller such as the controller 135. For instance, in some cases, a dedicated button or other control may be provided to allow the operator of the vehicle 10 to activate the fan 104. In other cases, the fan 104 may continuously operate when the agricultural vehicle 10 is in use.

Figure 58:
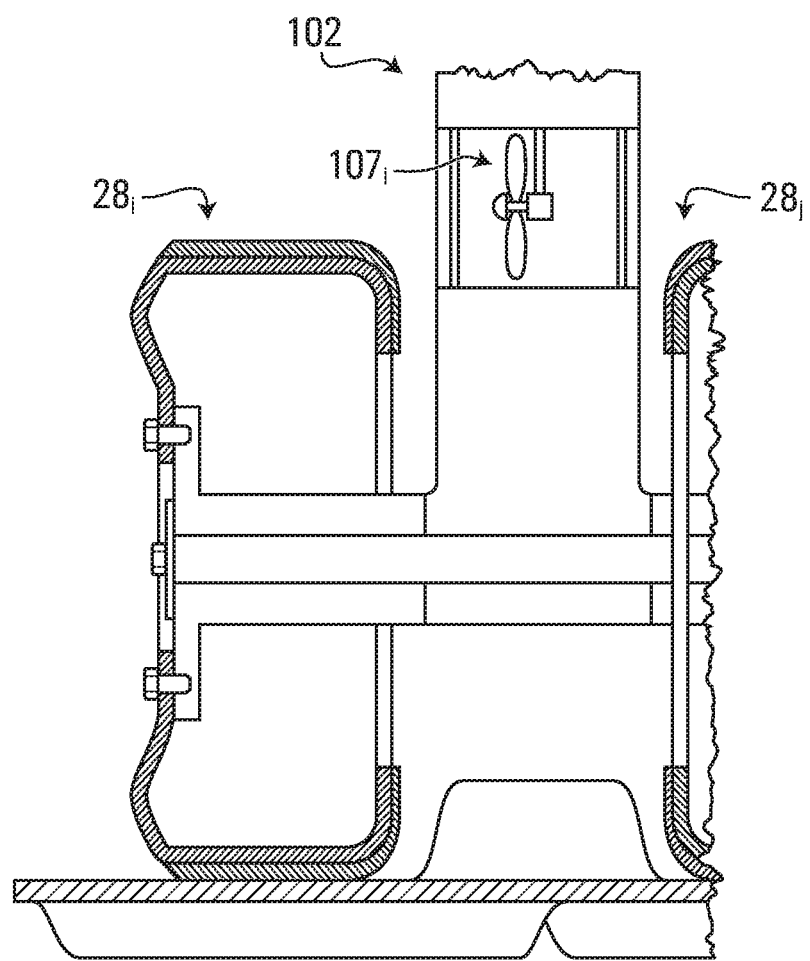

As another example, in some embodiments, the forced convection cooling system 102 may comprise two or more fans. For instance, FIG. 58 shows an embodiment in which the forced convection cooling system 102 comprises a plurality of fans $107_1$-$107_6$ each directed to a respective one of the mid-rollers $28_1$-$28_6$.

Figure 59:
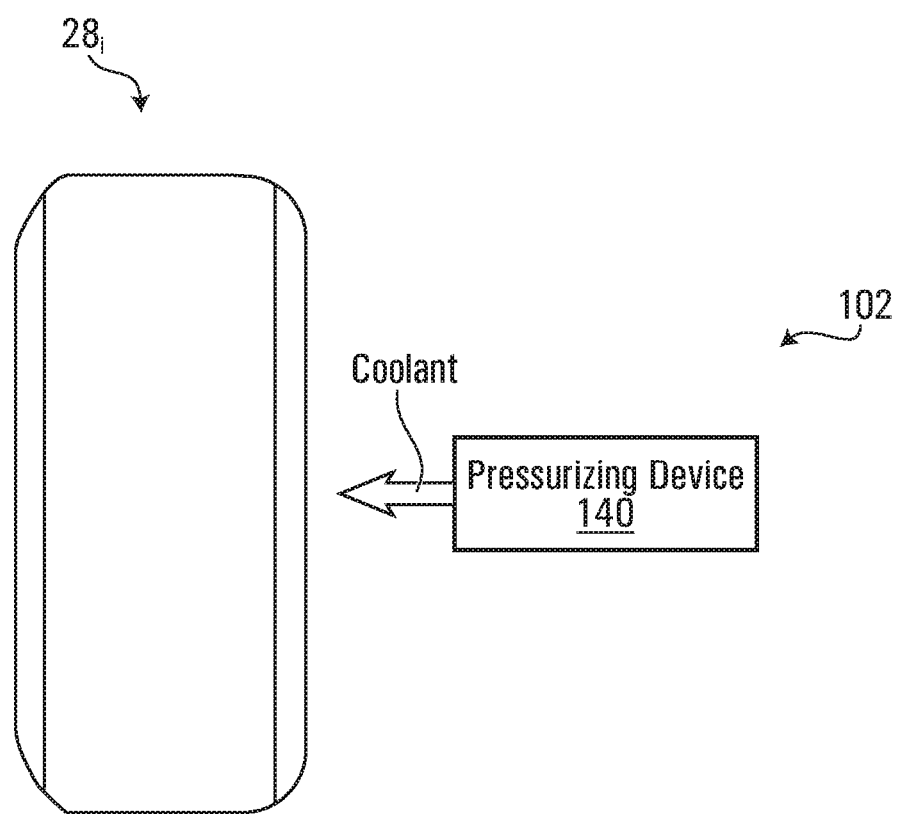

As yet another example, in some embodiments, instead of or in addition to using airflow generated using one or more fans, as shown in FIG. 59, the forced convection cooling system 102 may comprise a pressurizing device 140 to cause flow of a coolant to a mid-roller $28_i$. The coolant may be a gas or a liquid. For instance, in some embodiments, the pressurizing device 140 may include an air compressor to deliver compressed air to the mid-roller $28_i$ via a nozzle or conduit. In such embodiments, the nozzle or conduit may be removable in cases where the vehicle 10 is used in muddy conditions. In other embodiments, the pressuring device 140 may include a pump to cause flow of a liquid coolant in a channel formed in the mid-roller $28_i$ via a pipe connected to the pump and the mid-roller $28_i$.

F. Mid-Roller with Lateral Motion Capability

In some embodiments, a mid-roller $28_i$ may be movable laterally (i.e., movable in the widthwise direction of the track assembly 160 relative to the frame 13 of the track assembly $16_i$ which supports the mid-roller $28_i$. Lateral motion of the mid-roller $28_i$ may be effected in response to a side load on the mid-roller $28_i$ (i.e., a load acting on the mid-roller $28_i$ in the widthwise direction of the track assembly $16_i$). For instance, such a side load may arise when the agricultural vehicle 10 moves on a hill or other sloped terrain or otherwise moves in a way that causes the mid-roller $28_i$ to be pressed against a drive/guide lug $48_i$.

Figure 60:
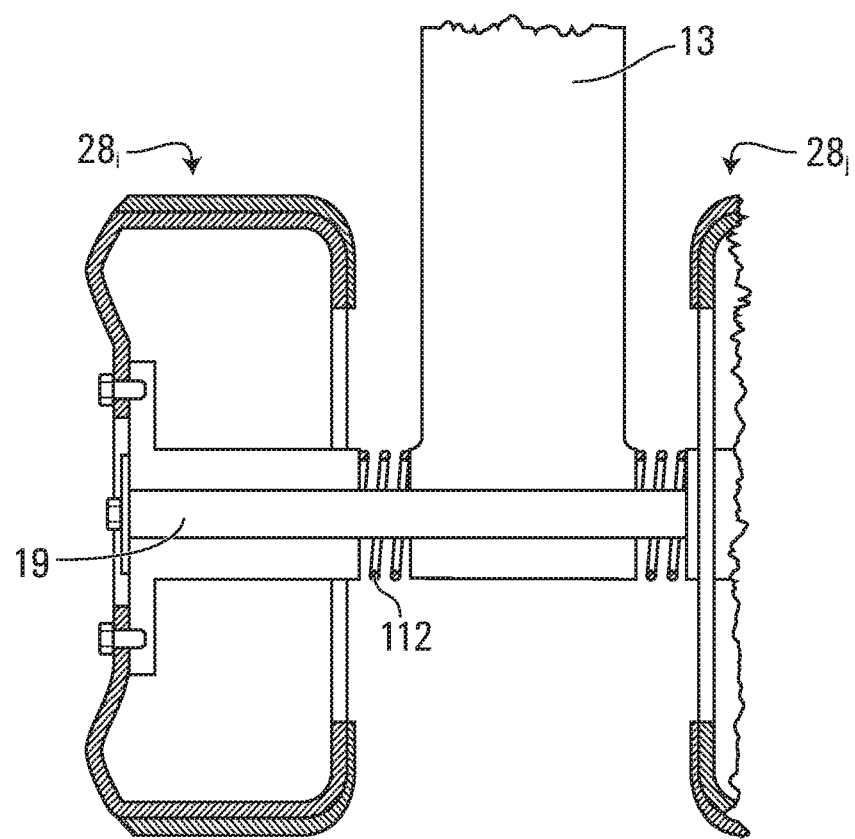
FIG. 60 shows an example of a lateral motion mechanism for a wheel of the track assembly in accordance with an embodiment of the invention.

For example, FIG. 60 shows an embodiment in which the mid-roller $28_i$ is associated with a lateral motion mechanism 110 that allows the mid-roller $28_i$ to move laterally in response to a side load. In this embodiment, the lateral motion mechanism 110 comprises a spring 112 between the hub 19 and the frame 13 which supports the mid-roller $28_i$. The spring 112 may be a coil spring, a leaf spring, a gas spring (e.g., an air spring), or any other elastic object used to store mechanical energy.

When no side load is exerted on the mid-roller $28_i$, the mid-roller $28_i$ is maintained in a first position along the widthwise direction of the track assembly $16_i$. When a side load is exerted on the mid-roller $28_i$, for instance, due to contact with a drive/guide lug $48_i$, the mid-roller $28_i$ moves laterally to a second position along the widthwise direction of the track assembly $16_i$. The spring 112 elastically deforms (in this case, extends) to allow this lateral motion of the mid-roller $28_i$. When the side load stops being exerted on the mid-roller $28_i$, the mid-roller $28_i$ moves laterally back to the first position along the widthwise direction of the track assembly $16_i$ under action of the spring 112.

The lateral motion mechanism 110 may be configured in various other ways in other embodiments. For example, in some embodiments, in addition to or instead of a spring, the lateral motion mechanism 110 may comprise a damper (also sometimes referred to as a "shock absorber"), which may be a fluid-based damper (e.g., a pneumatic damper, a hydraulic damper, etc.), a magnetic damper, or any other object which absorbs or dissipates kinetic energy to decrease oscillations. In some cases, a single device may itself constitute both a spring and a damper (e.g., a hydropneumatic, hydrolastic, or hydragas device). As another example, in some embodiments, the lateral motion mechanism 110 may have no spring and no damper such that it allows lateral motion of the mid-roller $28_i$ without exerting any spring force or damping force (e.g., by simply providing a certain play of the mid-roller $28_i$ relative to the frame 13).

The embodiments considered above in sections A to F discussed various solutions to improve the performance of the mid-rollers $28_1$-$28_6$, of the endless track 22, and/or of the track assembly $16_i$ as a whole. It will be appreciated that two or more of these solutions may be used in combination with one another in some embodiments. Therefore, any feature of any embodiment discussed herein may be combined with any feature of any other embodiment discussed herein in some examples of implementation.

Although it is configured in a certain way in the embodiments considered above, the track assembly $16_i$ may be configured in various other ways in other embodiments. For example, in some embodiments, the track assembly $16_i$ may comprise more or less roller wheels such as the roller wheels $28_1$-$28_6$. As another example, in some embodiments, the track assembly $16_i$ may comprise a front drive wheel (e.g., the idler wheel 26 may be replaced by a drive wheel) instead of or in addition to the drive wheel 24. As yet another example, rather than have a generally triangular configuration, in other embodiments, the track assembly $16_i$ may have various other configurations (e.g., a generally oblong configuration).

While in the embodiments considered above the off-road vehicle 10 is an agricultural vehicle, in other embodiments, the vehicle 10 may be another type of work vehicle such as a construction vehicle (e.g., a loader, a bulldozer, an excavator, an asphalt paver, etc.) for performing construction work, a forestry vehicle (e.g., a feller-buncher, a tree chipper, a knuckleboom loader, etc.) for performing forestry work, or a military vehicle (e.g., a combat engineering vehicle (CEV), etc.) for performing military work, or may be any other type of vehicle operable off paved roads. Although operable off paved roads, the vehicle 10 may also be operable on paved roads in some cases. Also, while in the embodiment considered above the off-road vehicle 10 is driven by a human operator in the vehicle 10, in other embodiments, the vehicle 10 may be an unmanned ground vehicle (e.g., a teleoperated or autonomous unmanned ground vehicle).

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track assembly for traction of a vehicle, the track assembly comprising:
   a track for engaging the ground; and
   a plurality of wheels that includes a drive wheel for driving the track around the wheels;
   wherein the track assembly comprises a temperature sensor configured to sense a temperature of a component of the track assembly.

2. The track assembly of claim 1, wherein the temperature sensor is configured to convey the temperature of the component of the track assembly via a wireless link.

3. The track assembly of claim 1, wherein the temperature sensor is configured to convey the temperature of the component of the track assembly via a wired link.

4. The track assembly of claim 1, wherein the temperature sensor is configured to convey the temperature of the component of the track assembly to a processing device configured to perform an operation related to the vehicle based on the temperature of the component of the track assembly.

5. The track assembly of claim 4, wherein the temperature sensor is configured to convey the temperature of the component of the track assembly to the processing device via a wireless link.

6. The track assembly of claim 4, wherein the temperature sensor is configured to convey the temperature of the component of the track assembly to the processing device via a wired link.

7. The track assembly of claim 4, wherein the operation related to the vehicle includes an operation controlling an aspect of the vehicle based on the temperature of the component of the track assembly.

8. The track assembly of claim 7, wherein the operation controlling the aspect of the vehicle is based on the temperature of the component of the track assembly and a speed of the vehicle.

9. The track assembly of claim 7, comprising a cooling system configured to transfer heat away from at least part of the track assembly, wherein the aspect of the vehicle includes the cooling system.

10. The track assembly of claim 9, wherein the cooling system comprises a fan and the operation controlling the cooling system includes an operation controlling the fan.

11. The track assembly of claim 4, wherein the processing device is configured to perform the operation related to the vehicle when the temperature of the component of the track assembly reaches a threshold.

12. The track assembly of claim 1, comprising a frame supporting respective ones of the wheels, wherein the component of the track assembly is movable relative to the frame as the drive wheel drives the track.

13. The track assembly of claim 12, wherein the component of the track assembly is a given one of the wheels.

14. The track assembly of claim 13, wherein the plurality of wheels includes a plurality of roller wheels rolling on a bottom run of the track, and the given one of the wheels is a given one of the roller wheels.

15. The track assembly of claim 1, comprising a frame supporting respective ones of the wheels, wherein the temperature sensor is movable relative to the frame as the drive wheel drives the track.

16. The track assembly of claim 15, wherein the temperature sensor is part of a given one of the wheels.

17. The track assembly of claim 16, wherein the plurality of wheels includes a plurality of roller wheels rolling on a bottom run of the track, and the given one of the wheels is a given one of the roller wheels.

18. The track assembly of claim 1, wherein the component of the track assembly is a given one of the wheels.

19. The track assembly of claim 18, wherein the plurality of wheels includes a plurality of roller wheels rolling on a bottom run of the track, and the given one of the wheels is a given one of the roller wheels.

20. The track assembly of claim 1, wherein the temperature sensor is part of a given one of the wheels.

21. The track assembly of claim 20, wherein the plurality of wheels includes a plurality of roller wheels rolling on a bottom run of the track, and the given one of the wheels is a given one of the roller wheels.

22. The track assembly of claim 20, wherein the component of the track assembly is the given one of the wheels.

23. A vehicle comprising the track assembly of claim 1.

24. The vehicle of claim 23, wherein the vehicle is an agricultural vehicle.

25. A system for use in respect of a track assembly for traction of a vehicle, the track assembly comprising a track for engaging the ground and a plurality of wheels that includes a drive wheel for driving the track around the wheels, the system comprising:
   a temperature sensor configured to sense a temperature of a component of the track assembly; and
   a processing device configured to perform an operation related to the vehicle based on the temperature of the component of the track assembly.

26. The system of claim 25, wherein the temperature sensor is configured to convey the temperature of the component of the track assembly to the processing device via a wireless link.

27. The system of claim 25, wherein the temperature sensor is configured to convey the temperature of the component of the track assembly to the processing device via a wired link.

28. The system of claim 25, wherein the operation related to the vehicle includes an operation controlling an aspect of the vehicle based on the temperature of the component of the track assembly.

29. The system of claim 28, wherein the operation controlling the aspect of the vehicle is based on the temperature of the component of the track assembly and a speed of the vehicle.

30. The system of claim 28, wherein the track assembly comprises a cooling system configured to transfer heat away from at least part of the track assembly, and the aspect of the vehicle includes the cooling system.

31. The system of claim 30, wherein the cooling system comprises a fan and the operation controlling the cooling system includes an operation controlling the fan.

32. The system of claim 25, wherein the processing device is configured to perform the operation related to the vehicle when the temperature of the component of the track assembly reaches a threshold.

33. The system of claim 25, wherein the track assembly comprises a frame supporting respective ones of the wheels, and the component of the track assembly is movable relative to the frame as the drive wheel drives the track.

34. The system of claim 33, wherein the component of the track assembly is a given one of the wheels.

35. The system of claim 34, wherein the plurality of wheels includes a plurality of roller wheels rolling on a bottom run of the track, and the given one of the wheels is a given one of the roller wheels.

36. The system of claim 25, wherein the track assembly comprises a frame supporting respective ones of the wheels, and the temperature sensor is movable relative to the frame as the drive wheel drives the track.

37. The system of claim 36, wherein the temperature sensor is part of a given one of the wheels.

38. The system of claim 37, wherein the plurality of wheels includes a plurality of roller wheels rolling on a bottom run of the track, and the given one of the wheels is a given one of the roller wheels.

39. The system of claim 25, wherein the component of the track assembly is a given one of the wheels.

40. The system of claim 39, wherein the plurality of wheels includes a plurality of roller wheels rolling on a bottom run of the track, and the given one of the wheels is a given one of the roller wheels.

41. The system of claim 25, wherein the temperature sensor is part of a given one of the wheels.

42. The system of claim 41, wherein the plurality of wheels includes a plurality of roller wheels rolling on a bottom run of the track, and the given one of the wheels is a given one of the roller wheels.

43. The system of claim 41, wherein the component of the track assembly is the given one of the wheels.

44. A vehicle comprising the system of claim 25.

45. The vehicle of claim 44, wherein the vehicle is an agricultural vehicle.

46. A method for execution in respect of a track assembly for traction of a vehicle, the track assembly comprising a track for engaging the ground and a plurality of wheels that includes a drive wheel for driving the track around the wheels, the method comprising:
using a temperature sensor to sense a temperature of a component of the track assembly; and
performing an operation related to the vehicle based on the temperature of the component of the track assembly.

* * * * *